United States Patent
Kwak et al.

(10) Patent No.: US 10,735,072 B2
(45) Date of Patent: Aug. 4, 2020

(54) METHOD AND APPARATUS FOR TRANSMITTING DATA IN WIRELESS COMMUNICATION SYSTEM

(71) Applicant: Samsung Electronics Co., Ltd., Gyeonggi-do (KR)

(72) Inventors: Youngwoo Kwak, Gyeonggi-do (KR); Hoondong Noh, Gyeonggi-do (KR); Cheolkyu Shin, Gyeonggi-do (KR); Taehan Bae, Seoul (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/934,099

(22) Filed: Mar. 23, 2018

(65) Prior Publication Data
US 2018/0287682 A1 Oct. 4, 2018

(30) Foreign Application Priority Data

Mar. 23, 2017 (KR) .................. 10-2017-0037154
Apr. 3, 2017 (KR) .................. 10-2017-0043111

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0456* (2013.01); *H04B 7/0695* (2013.01);
(Continued)

(58) Field of Classification Search
CPC .. H04B 7/0626; H04B 7/0456; H04B 7/0695; H04L 5/005; H04L 5/0057; H04L 5/0023;
(Continued)

(56) References Cited

U.S. PATENT DOCUMENTS

2013/0078913 A1* 3/2013 Lee .................. H04L 5/0007
455/39
2014/0023055 A1* 1/2014 Jeong ................ H04L 5/001
370/336
(Continued)

FOREIGN PATENT DOCUMENTS

EP          2 592 803      5/2013
KR      1020180022071     3/2018
(Continued)

OTHER PUBLICATIONS

U.S. Appl. No. 62/454,617, filed Feb. 3, 2017.*
(Continued)

*Primary Examiner* — Faisal Choudhury
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT), and may be applied to intelligent services based on the 5G communication technology and the IoT-related technology, such as smart home, smart building, smart city, smart car, connected car, health care, digital education, smart retail, security and safety services. The present disclosure describes methods for supporting uplink sub-band precoding for effective data transmission and reception, reporting a failure of channel state measurement of a terminal, and reporting a channel state according to multiple channel state information reference signal (CSI-RS) transmission.

16 Claims, 57 Drawing Sheets

(51) Int. Cl.
*H04W 24/10* (2009.01)
*H04B 7/0456* (2017.01)
*H04W 72/04* (2009.01)

(52) U.S. Cl.
CPC ............ *H04L 5/005* (2013.01); *H04L 5/0057* (2013.01); *H04W 24/10* (2013.01); *H04L 5/0023* (2013.01); *H04L 5/0051* (2013.01); *H04L 5/0091* (2013.01); *H04W 72/042* (2013.01)

(58) Field of Classification Search
CPC .. H04L 5/0091; H04L 5/0051; H04W 72/042; H04W 24/10
USPC .......................................................... 370/329
See application file for complete search history.

(56) References Cited

U.S. PATENT DOCUMENTS

| | | | |
|---|---|---|---|
| 2014/0036809 A1* | 2/2014 | Xu | H04W 52/54 370/329 |
| 2016/0205687 A1* | 7/2016 | Ouchi | H04B 1/713 370/329 |
| 2016/0301515 A1* | 10/2016 | Ouchi | H04L 5/0057 |
| 2017/0006640 A1* | 1/2017 | Dinan | H04W 74/0833 |
| 2017/0026919 A1 | 1/2017 | Takeda et al. | |
| 2017/0064675 A1* | 3/2017 | Kim | H04B 7/068 |
| 2018/0102817 A1* | 4/2018 | Park | H04B 7/04 |
| 2018/0242285 A1 | 8/2018 | Yoo et al. | |
| 2018/0270895 A1* | 9/2018 | Park | H04W 8/18 |
| 2018/0343046 A1* | 11/2018 | Park | H04W 76/27 |
| 2018/0375560 A1 | 12/2018 | Wei | |
| 2019/0190669 A1* | 6/2019 | Park | H04W 56/001 |
| 2019/0207733 A1* | 7/2019 | Tang | H04L 5/005 |
| 2020/0008228 A1* | 1/2020 | Lee | H04L 5/0048 |

FOREIGN PATENT DOCUMENTS

| | | |
|---|---|---|
| WO | WO 2017/026762 | 2/2017 |
| WO | WO 2017/128800 | 8/2017 |

OTHER PUBLICATIONS

International Search Report dated Sep. 20, 2018 issued in counterpart application No. PCT/KR2018/003446, 3 pages.
Samsung, Nokia, CATT, "Agreements for Rel.14 eFD-MIMO up to RAN1#88", R1-1704021, 3GPP TSG RAN WG1 Meeting #88, Feb. 13-17, 2017, 13 pages.
Ericsson, "Beamformed CSI-RS Design with Activation Mechanism", R1-167636, 3GPP TSG-RAN WG1 #86, Aug. 22-26, 2016, 7 pages.
3rd Generation Partnership Project; Technical Specification Group Radio Access Network; Study on New Radio (NR) Access Technology; Physical Layer Aspects (Release 14), 3GPP TR 38.802 V14.0.0, Mar. 2017, 144 pages.
European Search Report dated Nov. 25, 2019 issued in counterpart application No. 18771088.4-1220, 14 pages.

\* cited by examiner

Different beams : aperiodic transmission

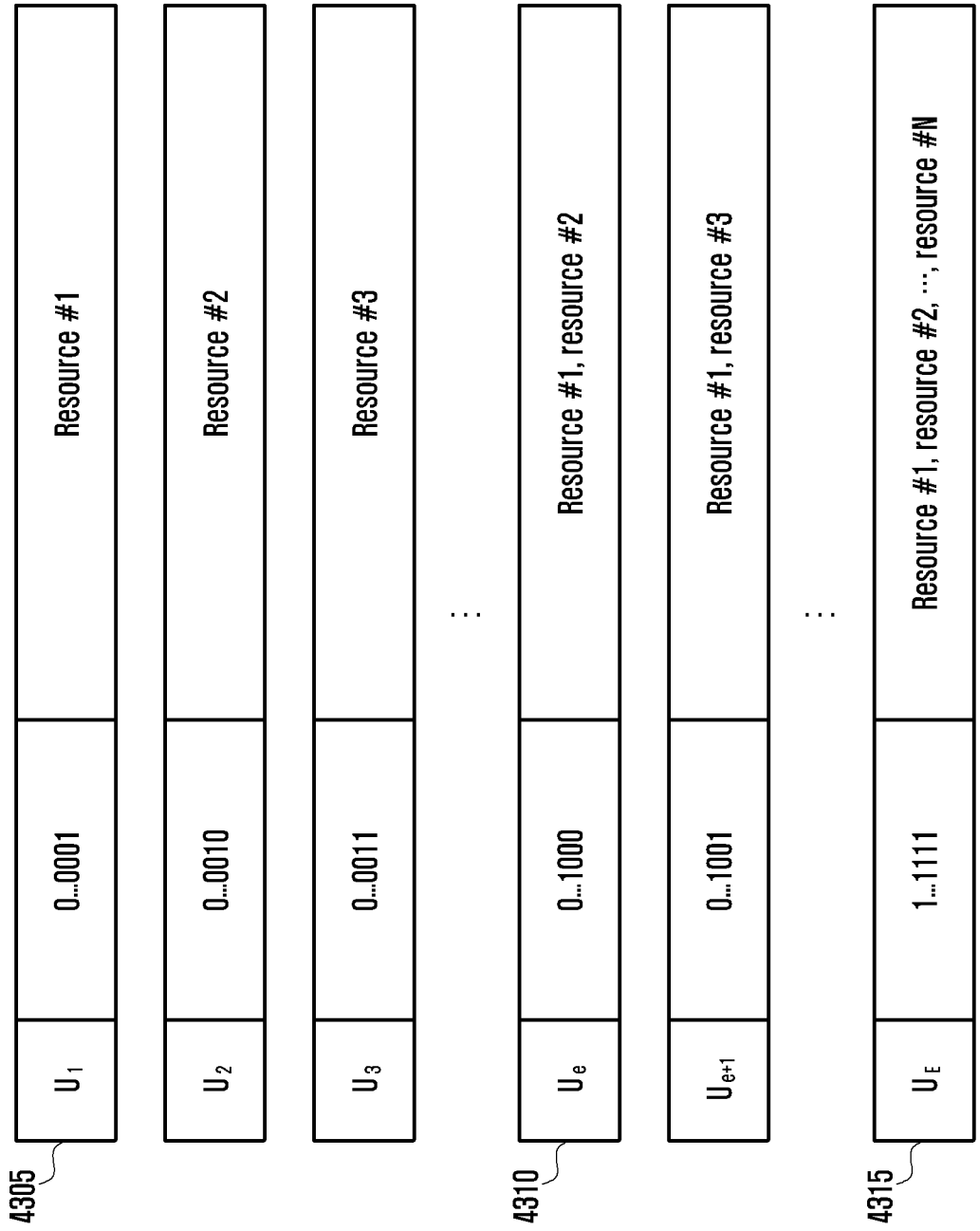

METHOD AND APPARATUS FOR TRANSMITTING DATA IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2017-0037154 filed on Mar. 23, 2017, and 10-2017-0043111 filed on Apr. 3, 2017, in the Korean Intellectual Property Office, the disclosures of which are incorporated by reference herein in their entirety.

BACKGROUND

1. Field

The disclosure relates generally to a wireless communication system, and more particularly to, a method and apparatus for transmitting data and a control signal in a mobile communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Accordingly, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Because the number of transmission antennas of a terminal can increase, a 5G mobile communication system may support subband precoding in an uplink, a high frequency band such as 30 GHz may be supported, and hybrid beamforming is required. In this case, a channel state information reference signal (CSI-RS) transmitted for a channel state report according to a beam switching capability of the terminal may or may not be measured by the terminal.

Since the conventional art does not provide efficient CSI-RS operation in this case, there is a need in the art for a method and apparatus for aperiodic CSI-RS transmission through a plurality of CSI-RS resources and thus a channel state report for an efficient CSI-RS operation.

SUMMARY

The present disclosure is designed to address at least the problems and/or disadvantages described above and to provide at least the advantages described below.

Accordingly, an aspect of the disclosure is to provide a method and apparatus for setting and operating uplink subband precoding.

Another aspect of the present disclosure is to provide a method and apparatus for reporting whether beam quality measurement and channel state information generation are successfully performed according to a beam switching capability of a base station and a terminal when the base station and the terminal support analog, digital, or hybrid beamforming.

Another aspect of the present disclosure is to provide a method and apparatus in which a base station determines a new CSI-RS transmission method which a terminal receives for an efficient system and CSI-RS operation in a mobile communication system.

According to embodiments, a method of processing a control signal in a wireless communication system includes receiving sounding reference signal (SRS) configuration information from a base station, the SRS configuration information configuring a plurality of SRS resources, receiving activation information which indicates an activation of at least one SRS resource of the plurality of SRS resources, the activation information being included in a medium access control element, and receiving SRSs periodically after a predetermined period has elapsed since the activation information is received.

According to embodiments, a method of a base station for a communication system includes transmitting SRS configuration information to a terminal, the SRS configuration information configuring a plurality of SRS resources, transmitting activation information which indicates an activation of at least one SRS resources, the activation information being included in a medium access control element, and transmitting SRSs periodically after a predetermined period has elapsed since the activation information is received.

According to embodiments, a terminal for a communication system includes a transceiver, and a processor coupled with the transceiver and configured to control to receive SRS configuration information from a base station, the SRS configuration information configuring a plurality of SRS resources, receive activation information which indicates an activation of at least one of the plurality of SRS resources, the activation information being included in a medium access control element, and receive SRSs periodically after a predetermined period has elapsed since the activation information is received.

According to embodiments, a base station for a communication system includes a transceiver, and a processor coupled with the transceiver and configured to control to transmit SRS configuration information to a terminal, the SRS configuration information configuring a plurality of SRS resources, transmit activation information which indicates an activation of at least one of the plurality of SRS resources, the activation information being included in a medium access control element, and transmit SRSs periodically after a predetermined period has elapsed since the activation information is received.

BRIEF DESCRIPTION OF THE DRAWINGS

The above and other aspects, features, and advantages of the present disclosure will be more apparent from the following detailed description in conjunction with the accompanying drawings, in which:

FIG. 43 illustrates an example of signaling CSI-RS subgroup setting through radio resource control (RRC) signaling when applying the second method;

DETAILED DESCRIPTION

Figure 1:
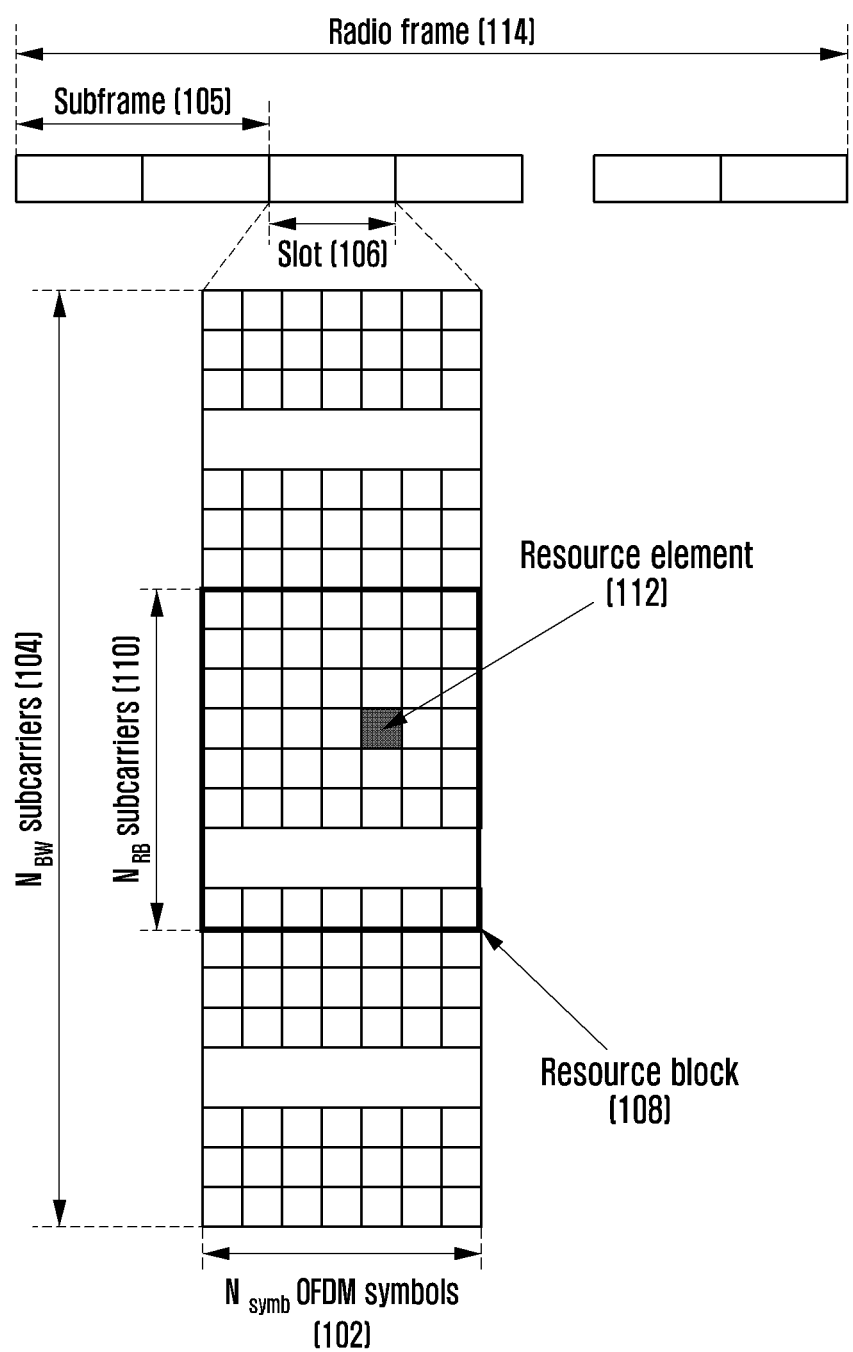
FIG. 1 illustrates a structure of a time-frequency domain, which is a radio resource area to which data or a control channel is transmitted in a downlink of an LTE system, to which the present disclosure is applied.

Hereinafter, embodiments of the present disclosure will be described in detail with reference to the accompanying drawings.

A description of well-known functions and/or configurations will be omitted for the sake of clarity and conciseness.

In the drawings, like reference numerals designate like elements, some constituent elements are shown in an exaggerated or schematic form or are omitted, and a size of each constituent element does not necessarily reflect an actual size. The present disclosure is not limited to the following embodiments, and may be implemented in different forms. The embodiments are provided to enable the entirety and scope of the present disclosure.

Herein, it is to be understood that each flowchart block and combinations of the flowchart may be performed by computer program instructions that may be mounted in a processor of a universal computer, a special computer, or other programmable data processing equipment. The instructions generate a means that performs functions described in the flowchart blocks. In order to implement a function with a specific method, these computer program instructions may be stored at a computer or computer readable memory that can direct a computer or other programmable data processing equipment, and may produce a production item including an instruction indicates that performs a function described the flowchart blocks. A series of operation steps are performed on the computer or other programmable data processing equipment and generate a process executed with the computer, and instructions that direct the computer or other programmable data processing equipment may provide steps for executing functions described in the flowchart blocks.

Each block may represent a portion of a module, segment, or code including at least one executable instruction for executing a specific logical function(s), and functions described in blocks may be performed regardless of order. For example, two consecutively shown blocks may be substantially simultaneously performed or may be performed in reverse order according to a corresponding function.

A term "unit" used in the present embodiment indicates a software or hardware component such as a field programmable gate array (FPGA) or an application specific integrated circuit (ASIC) and performs any function. However, "unit" is not limited to software or hardware. A "unit" may be configured to store at a storage medium that can address and may be configured to reproduce at least one processor. Therefore, "unit" includes, for example, components such as software components, object-oriented software components, class components, and task components, processes, functions, attributes, procedures, subroutines, segments of a program code, drivers, firmware, microcode, circuit, data, database, data structures, tables, arrays, and variables. A function provided within constituent elements and "units" may be performed by coupling the smaller number of constituent elements and "units" or by subdividing the constituent elements and "units" into additional constituent elements and "units". Constituent elements and "units" may be implemented in a manner to reproduce at least one CPU within a device or a security multimedia card.

Embodiments disclosed in this specification and drawings are described as examples to easily describe the present disclosure and to help understanding thereof and do not limit the scope of the present disclosure. Therefore, it should be understood that changes and variations obtained based on the spirit and scope of the present disclosure in addition to embodiments disclosed herein are included in the scope of the present disclosure. Each embodiment may be combined, as needed. For example, portions of embodiment 1-1 and embodiment 1-2 described below may be combined to be operated in a base station and a terminal. The embodiments are described based on an LTE system, but other examples based on the spirit and scope of the embodiment may be applied to other systems such as a time division duplex (TDD) LTE system, or a 5G or NR system.

In the present disclosure, the base station (BS) performs resource allocation of the terminal and may be at least one of an eNode B, a Node B, a BS, a wireless access unit, a base station controller, and a node on a network. The terminal may include a UE, MS, cellular phone, smart phone, computer, and multimedia system that can perform a communication function.

In an embodiment of the present disclosure, an LTE or LTE-A system is described as an example, but the present disclosure can be applied even to other communication systems having a similar technical background or channel form. For example, five-generation mobile communication technology (5G, NR) developed after LTE-A may be included therein. Embodiments of the present disclosure may be applied to other communication system through some variations in a range that does not significantly depart from the scope of the present disclosure.

First Embodiment

A wireless communication system develops from a system that has provided an initial voice-oriented service to, for example, a broadband wireless communication system that provides a high-speed and high-quality packet data service, in a communication standard such as high speed packet access (HSPA), LTE, evolved universal terrestrial radio access (E-UTRA), and LTE-advanced (LTE-A) of 3GPP or high rate packet data (HRPD), ultra mobile broadband (UMB) of 3GPP2, and 802.16e of IEEE. A communications standard of 5G or new radio (NR) is being developed in a 5G wireless communication system.

In an LTE system as a typical example of the broadband wireless communication system, a downlink (DL) adopts an orthogonal frequency division multiplexing (OFDM) method, and an uplink (UL) adopts a single carrier frequency division multiple access (SC-FDMA). The UL indicates a wireless link in which a user equipment (UE) or a mobile station (MS) transmits data or a control signal to an eNode B or a base station (BS), and the DL indicates a radio link in which the BS transmits data or a control signals to the UE. The foregoing multiple access method enables each user's data or control information to distinguish by allocating and operating time-frequency resources such that time-frequency resources to load and send data or control information for each user do not overlap with each other, i.e., such that orthogonality is achieved.

When a decoding failure occurs in initial transmission, the LTE system adapts a hybrid automatic repeat request (HARQ) method of retransmitting the data in a physical layer. When the receiver does not accurately decode data, the receiver transmits negative acknowledgement (NACK) notifying a decoding failure to the transmitter and thus the HARQ method allows the transmitter to retransmit the data at a physical layer. The receiver combines data retransmitted by the transmitter with data in which decoding is previously failed to enhance a data reception performance. When the receiver accurately decodes data, the receiver may transmit acknowledgement (ACK) notifying successful decoding to the transmitter to enable the transmitter to transmit new data.

FIG. 1 illustrates a structure of a time-frequency domain, which is a radio resource area to which data or a control channel is transmitted in a DL of an LTE system, to which the present disclosure is applied.

In FIG. 1, the horizontal axis represents a time domain and the vertical axis represents a frequency domain. A minimum transmitting unit in the time domain is an OFDM symbol, the $N_{symb}$ number of OFDM symbols 102 constitutes one slot 106, and two slots constitute one subframe 105. A length of the slot is 0.5 milliseconds (ms), and a length of the subframe is 1.0 ms. The radio frame 114 is a time domain interval configured with 10 subframes. A minimum transmitting unit in the frequency domain is a subcarrier, and a bandwidth of an entire system transmission band is configured with total $N_{BW}$ (104) subcarriers.

A basic unit of resources in the time-frequency domain is a resource element (RE) 112 and may be represented with an OFDM symbol index and a subcarrier index. An RB or a physical resource block PRB 108 is defined to the $N_{symb}$ (102) number of contiguous OFDM symbols in the time domain and the $N_{RB}$ (110) number of contiguous subcarriers in the frequency domain. Therefore, one RB 108 is configured with the $N_{symb} \times N_{XRB}$ number of REs 112. In general, a minimum transmitting unit of data is the RB unit, and in the LTE system, $N_{symb}=7$, $N_{RB}=12$, and $N_{BW}$ is proportional to a bandwidth of a system transmission band.

A data rate increases in proportional to the number of RBs scheduled to the UE. The LTE system defines and operates six transmission bandwidths. In a frequency division duplexing (FDD) system that divides and operates a DL and a UL by a frequency, a DL transmission bandwidth and a UL bandwidth may be different. The channel bandwidth represents a radio frequency (RF) bandwidth corresponding to a system transmission bandwidth. Table 1 below illustrates a correspondence relationship of a system bandwidth and a channel bandwidth defined in the LTE system. For example, in an LTE system having a 10 MHz channel bandwidth, a transmission bandwidth is configured with 50 RBs.

TABLE 1

| | Channel bandwidth $BW_{channel}$ [megahertz (MHz)] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

DL control information is transmitted within the first N number of OFDM symbols within the subframe. In general, N={1, 2, 3}; therefore, the N value is changed in each subframe according to an amount of control information to transmit to the current subframe. The control information includes a control channel transmission segment indicator representing whether the control information is transmitted over several OFDM symbols, scheduling information about DL data or UL data, and a HARQ ACK/NACK signal.

In the LTE system, scheduling information about DL data or UL data is transmitted from the base station to the terminal through DCI defined to several formats and a determined DCI format is applied and operated according to scheduling information (UL grant) about UL data or scheduling information (DL grant) about DL data, compact DCI having control information of a small magnitude, DCI for power control, and whether spatial multiplexing using multiple antennas is applied. For example, DCI format 1, which is scheduling control information (DL grant) about DL data, is configured to include at least the following control information.

Resource allocation type 0/1 flag: notify whether a resource allocation scheme is type 0 or type 1. Type 0 applies a bitmap scheme to allocate a resource in a resource block group (RBG) unit. In the LTE system, a basic unit of scheduling is an RB represented with time and frequency domain resources, and the RBG is configured with a plurality of RBs to be a basic unit of scheduling in a type 0 method. Type 1 allocates a specific RB within the RBG;

Resource block allocation: notify an RB allocated to data transmission. A resource representing according to a system bandwidth and a resource allocation scheme is determined;

modulation and coding scheme (MCS): notify a size of a transport block (TB), which is data to transmit and a modulation scheme used for data transmission;

HARQ process number: notify the process number of a HARQ;

New data indicator: notify whether initial transmission or retransmission of a HARQ;

Redundancy version: notify redundancy version of a HARQ; and transmit power control (TPC) command for a physical uplink control channel (PUCCH): notify a transmission power control command for a PUCCH, which is a UL control channel.

The DCI is transmitted through a physical downlink control channel (PDCCH) or an enhanced PDCCH (EPDCCH), which is a DL physical control channel via a channel coding and modulation process. Hereinafter, PDCCH or EPDCCH transmission may be mixed with DCI transmission on the PDCCH or EPDCCH.

In general, the DCI is scrambled with a specific radio network temporary identifier (RNTI) (or a terminal identifier) independently to each terminal, cyclic redundancy check (CRC) is added to the DCI, channel coding is performed, and the DCI is configured and transmitted with each independent PDCCH. In a time domain, the PDCCH is mapped and transmitted for the control channel transmission period. A frequency domain mapping position of the PDCCH is determined by an identifier (ID) of each terminal and is spread in an entire system transmission band.

DL data is transmitted through a physical DL shared channel (PDSCH), which is a DL data transmission physical channel that is transmitted after the control channel transmission segment, and DCI transmitted through the PDCCH notifies a specific mapping position in the frequency domain and scheduling information, such as a modulation method.

The base station notifies a modulation method applied to the PDSCH to transmit to the terminal and a transport block size (TBS) of data to transmit through an MCS configured with 5 bits among control information constituting the DCI. The TBS corresponds to a previous size in which a channel coding for error correction is applied to a TB of data to be transmitted by the base station.

A modulation method supporting in the LTE system is quadrature phase shift keying (QPSK), 16 QAM, and 64QAM, and each modulation order (Qm) corresponds to 2, 4, and 6. That is, in QPSK modulation, two bits may be transmitted per symbol, in 16 QAM modulation, 4 bits may be transmitted per symbol, and in 64QAM modulation, 6 bits may be transmitted per symbol.

Figure 2:
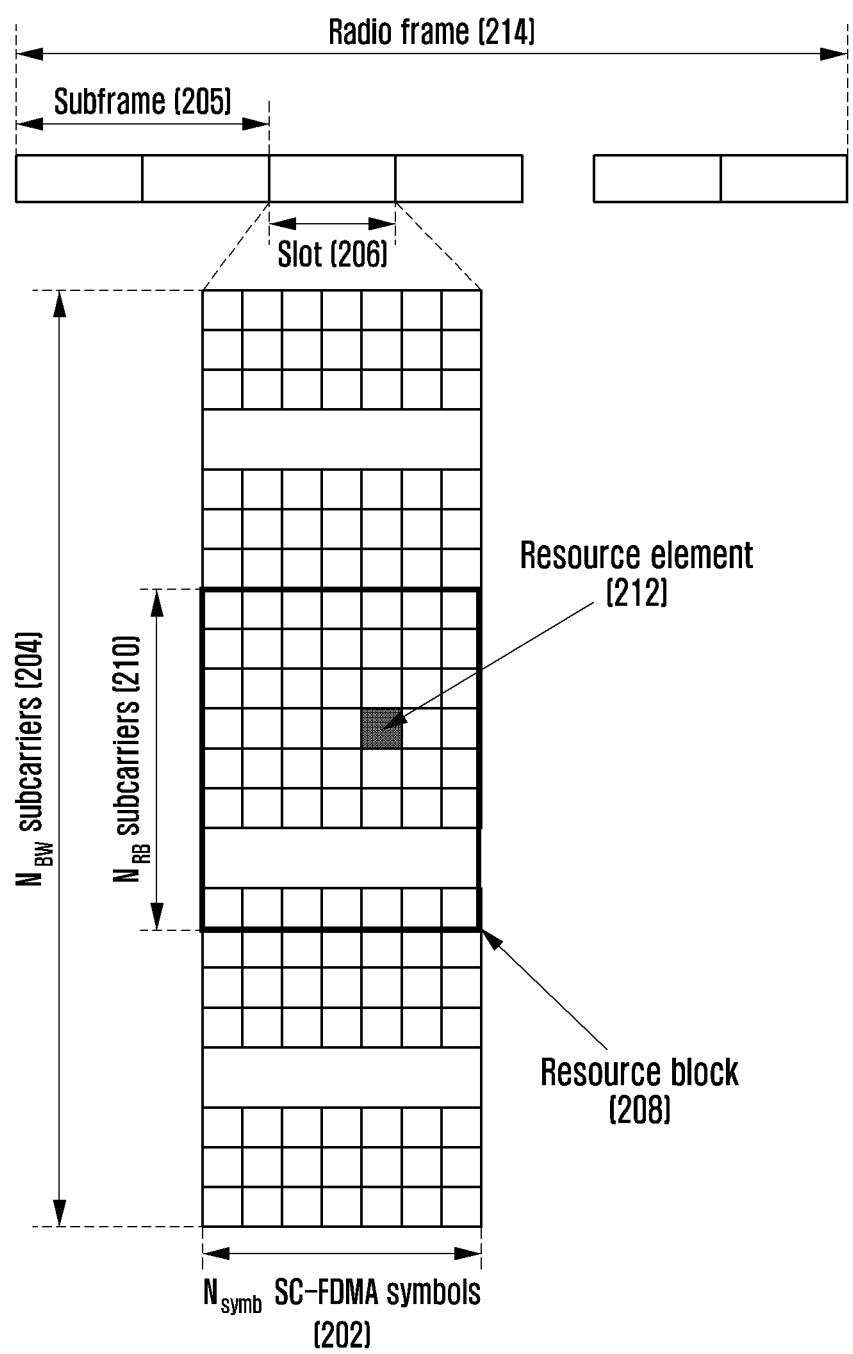
FIG. 2 illustrates a structure of a time-frequency domain, which is a radio resource area to which data or a control channel is transmitted in an uplink of LTE and LTE-A systems, to which the present disclosure is applied.

FIG. 2 illustrates a structure of a time-frequency domain, which is a radio resource area to which data or a control channel is transmitted in a UL of LTE and LTE-A systems, to which the present disclosure is applied.

In FIG. 2, a horizontal axis represents a time domain, and a vertical axis represents a frequency domain. A minimum transmitting unit in the time domain is an SC-FDMA symbol 202, and the $N_{symb}$ number of SC-FDMA symbols constitutes one slot 206. Two slots constitute one subframe 205. A minimum transmitting unit in the frequency domain is a subcarrier, and an entire system transmission band 204 is configured with the total $N_{BW}$ number of subcarriers having a value in proportion to the system transmission band.

A basic unit of resources in the time-frequency domain is an RE 212 and may be defined to an SC-FDMA symbol index and a subcarrier index. An RB 208 is defined to the $N_{symb}$ number of contiguous SC-FDMA symbols in the time domain and the $N_{RB}$ number of contiguous subcarriers 210 in the frequency domain. Therefore, one RB is configured with the $N_{symb} \times N x_{RB}$ number of REs. In general, a minimum transmitting unit of data or control information is an RB unit. A PUCCH is mapped to a frequency domain corresponding to one RB to be transmitted for one subframe.

In an LTE system, a timing relationship of a PUCCH or a PUSCH, which are UL physical channels that transmit HARQ ACK/NACK corresponding to a PDSCH, which is a physical channel for DL data transmission or an EPDDCH or a PDCCH including semi-persistent scheduling release (SPS release) is defined. For example, in an LTE system operating with FDD, HARQ ACK/NACK corresponding to a PDCCH or an EPDCCH including SPS release or a PDSCH transmitted from an n-4 th subframe is transmitted to a PUCCH or PUSCH in an n-th subframe.

DL HARQ in LTE system adopts an asynchronous HARQ method in which a data retransmission point is not fixed. That is, when initial transmission data transmitted by the base station receives HARQ NACK feedback from the terminal, the base station freely determines a transmission time point of data retransmission by a scheduling operation. The terminal buffers data determined to an error as a decoding result of received data for an HARQ operation and performs combining with next retransmission data.

When the terminal receives a PDSCH including DL data transmitted from the base station at a subframe n, the terminal transmits UL control information including HARQ ACK or NACK of DL data at a subframe n+k to the base station through a PUCCH or a PUSCH. In this case, the k is differently defined according to FDD or TDD and a subframe configuration of the LTE system. For example, in the FDD LTE system, k is fixed to 4. In the TDD LTE system, k may be changed according to a subframe configuration and the subframe number.

In the LTE system, unlike DL HARQ, the UL HARQ adopts a synchronous HARQ method to which a data transmission time point is fixed. That is, a UL/DL timing relationship of a physical UL shared channel (PUSCH), which is a physical channel for UL data transmission, a PDCCH, which is a preceding DL control channel, and a physical hybrid indicator channel (PHICH), which is a physical channel that transmits DL HARQ ACK/NACK corresponding to the PUSCH is fixed by the following rule.

When the UE receives a PHICH that transmits DL HARQ ACK/NACK or a PDCCH including UL scheduling control information transmitted from the base station in a subframe n, the UE transmits UL data corresponding to the control information at a subframe n+k through the PUSCH. In this case, k is differently defined according to FDD or TDD and a configuration of the LTE system. For example, in the FDD LTE system, k is fixed to 4. In the TDD LTE system, k may be changed according to a subframe configuration and the subframe number.

When the UE receives a PHICH carrying DL HARQ ACK/NACK from the base station at a subframe i, the PHICH corresponds to a PUSCH transmitted by the terminal at a subframe i-k. In this case, k is differently defined according to an FDD or TDD and a configuration of the LTE system. For example, in the FDD LTE system, k is fixed to 4. In the TDD LTE system, k may be changed according to a subframe configuration and the subframe number.

Although the wireless communication system has been described based on the LTE system, the present disclosure is not limited thereto, and may be applied to various wireless communication systems such as NR and 5G.

Figure 3:
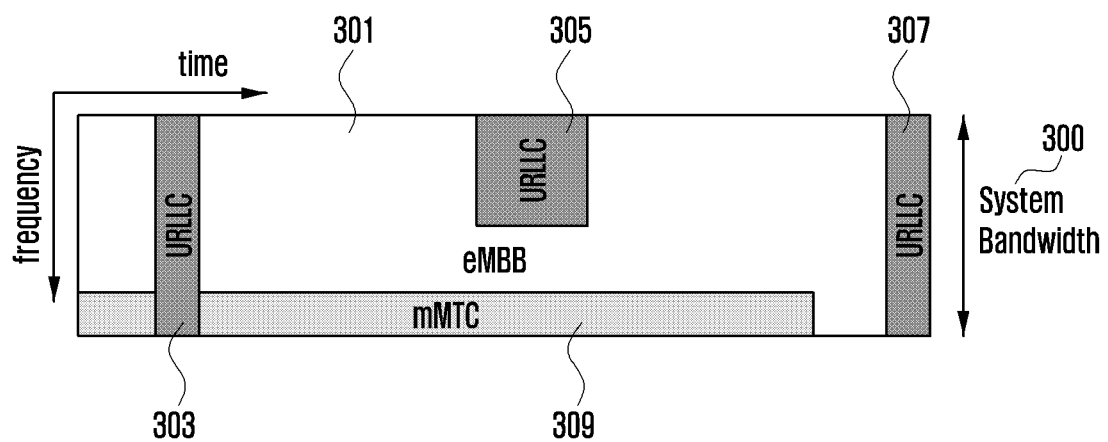
FIGS. 3 and 4 illustrate an example in which data for enhanced mobile broadband (eMBB), ultra-reliable low latency communications (URLLC), and massive machine-type communications (mMTC), which are services considered in a 5G or NR system are allocated in a frequency-time resource, to which the present disclosure is applied.

FIG. 3 illustrates a shape in which data for eMBB, URLLC, and mMTC are allocated in an entire system frequency band 300, to which the present disclosure is applied While an eMBB 301 and an mMTC 309 are allocated and transmitted in a specific frequency range, when URLLC data 303, 305, and 307 occurs and transmission is required, an example is shown in which the transmitter empties a portion in which the eMBB 301 and the mMTC 309 are already allocated and transmits the URLLC data 303, 305, and 307.

Since a short delay time is paramount in the URLLC, URLLC data may be allocated 303, 305, and 307 and transmitted to a portion of the resource 301 to which the eMBB is allocated. In a resource in which the eMBB is allocated, when the URLLC is additionally allocated and transmitted, in an overlapping time-frequency resource, eMBB data may not be transmitted, and therefore a transmission performance of the eMBB data may be compromised. That is, in the above case, an eMBB data transmission failure may occur due to URLLC allocation.

Figure 4:
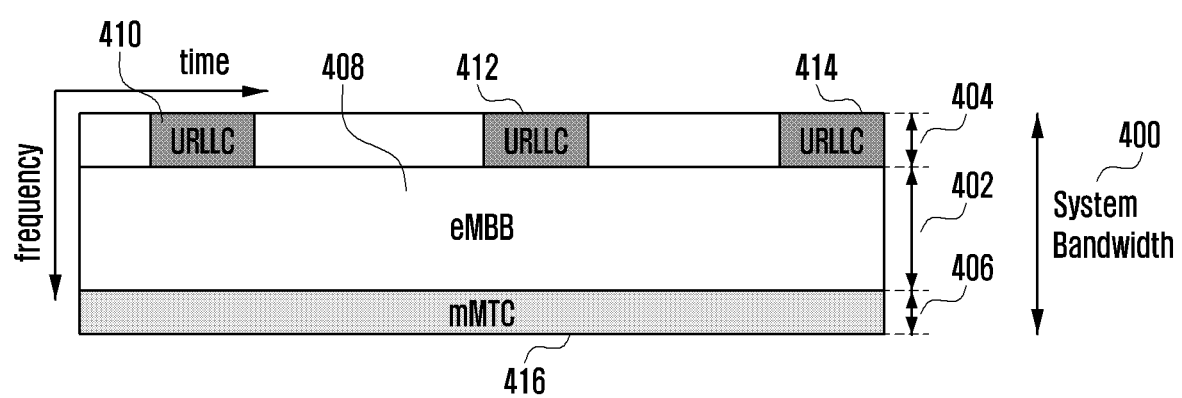

FIG. 4 is a service eMBB, URLLC, for mMTC data contemplated 5G or NR frequency systems, and illustrates an example of allocation in a time resource, to which the present disclosure is applied.

In FIG. 4, an entire system frequency band 400 is divided into each of subbands 402, 404, and 406 which may be used for transmitting a service and data. The subband may be previously divided and signaled to a higher level to the terminal, or the base station may randomly divide the subband and provide a service to the terminal without information of the subband. In FIG. 4, subband 402 illustrates an example used for eMBB data transmission 408, subband 404 illustrates an example used for URLLC data transmission 410, 412, and 414, and subband 416 illustrates an example used for mMTC data transmission 416. In FIGS. 3 and 4, a length of a transmission time interval (TTI) used for URLLC transmission may be less than a TTI length used for eMBB or mMTC transmission.

Figure 5:
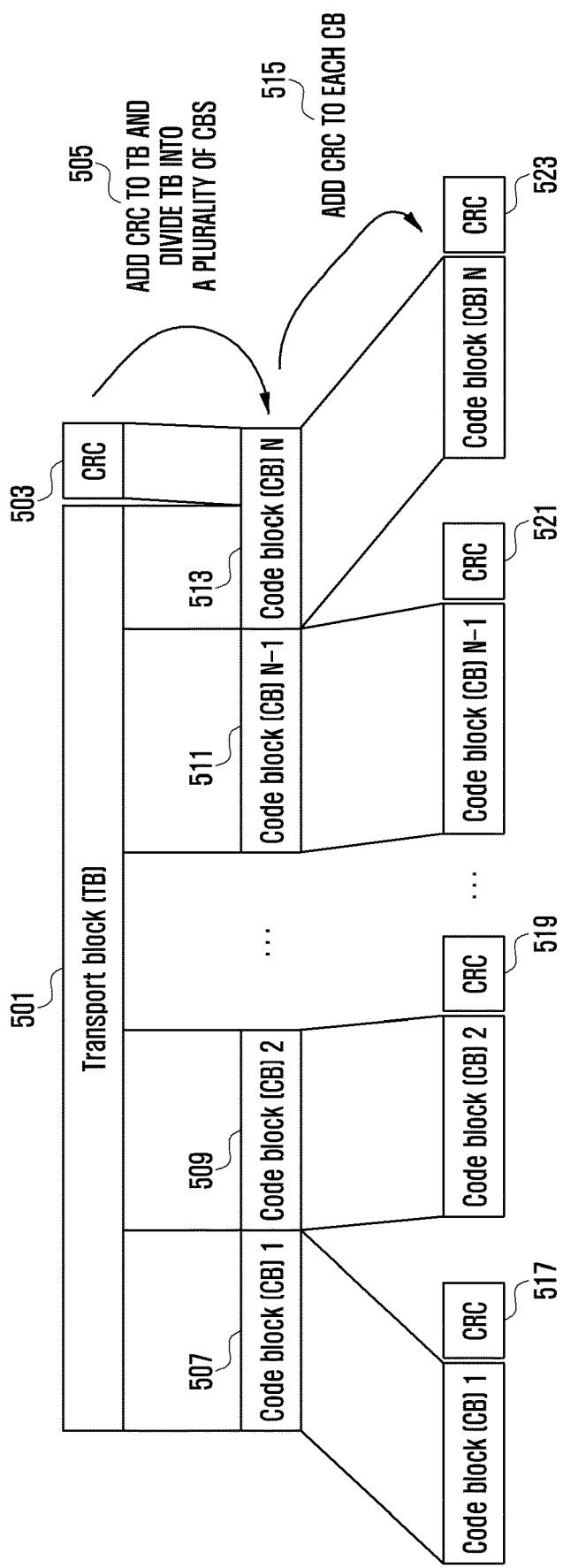
FIG. 5 illustrates an example of codeblock segmentation in an LTE or LTE-A system, to which the present disclosure is applied.

FIG. 5 illustrates an example of codeblock segmentation in an LTE or LTE-A system, to which the present disclosure is applied.

Figure 6:
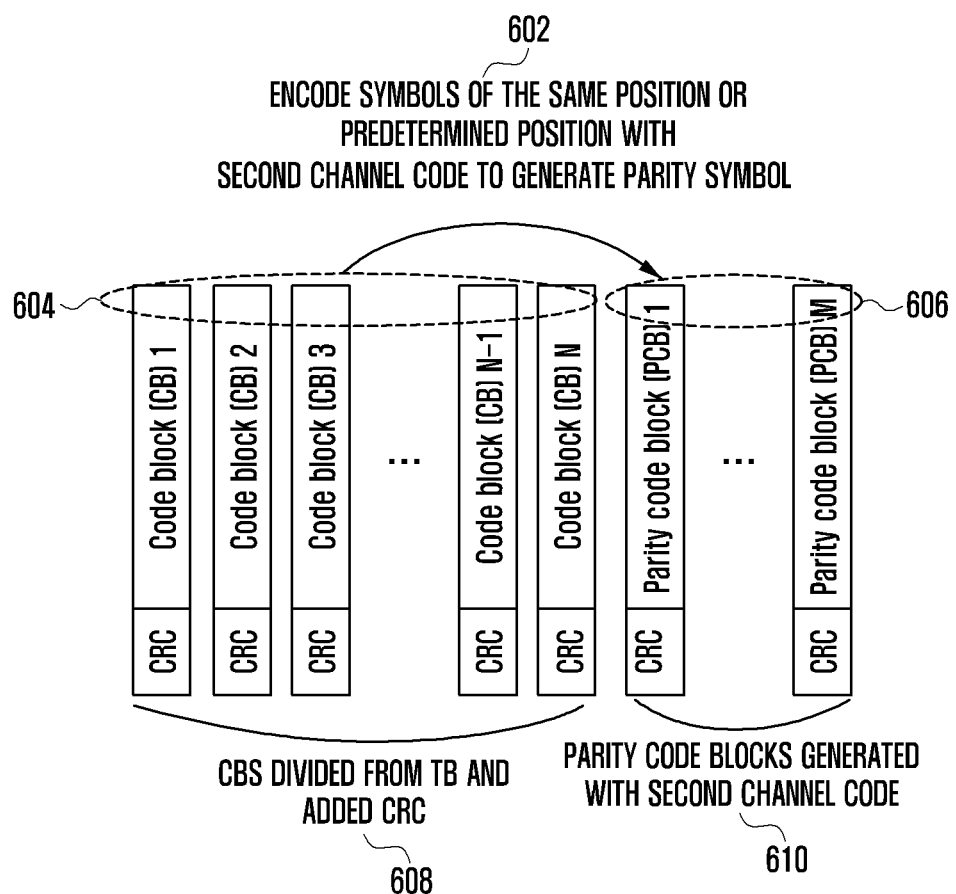
FIG. 6 illustrates an example of an outer code in an NR system, to which the present disclosure is applied.

FIG. 6 illustrates an example of an outer code in an NR system, to which the present disclosure is applied.

An eMBB service described hereinafter is referred to as a first type service, and data for eMBB are referred to as first type data. The first type service or the first type data IS not limited to an eMBB but may require high speed data transmission or performing broadband transmission. A URLLC service is referred to as a second type service, and data for an URLLC IS referred to as second type data. The second type service or the second type data are not limited to an URLLC and may correspond to even when a low delay time is required or when high reliable transmission is required. An mMTC service is referred to as a third type service, and data for mMTC is referred to as third type data. The third type service or the third type data are not limited to mMTC and may correspond to requiring low speed, wide coverage, or low power.

A structure of a physical channel using on each type basis in order to transmit the three services or data may be different. For example, a length of a TTI, an allocation unit of a frequency resource, a structure of a control channel, and a mapping method of data may be different.

Although three services and three types of data has been described, more types of services and data thereof may exist, to which a description of the present disclosure may be applied.

In the present disclosure, a term of a physical channel and a signal in a conventional LTE or LTE-A system may be used for describing a disclosed method and apparatus. However, a description of the present disclosure may be applied to a wireless communication system other than the LTE and LTE-A system, and may be applied to FDD and TDD systems.

Hereinafter, physical layer signaling transfers a signal from the base station to the terminal using a DL control channel of a physical layer or from the terminal to a base station using a UL control channel of a physical layer and may be referred to as L1 signaling or PHY signaling.

Higher signaling or higher layer signaling transfers a signal from the base station to the terminal using a DL data channel of a physical layer or from the terminal to the base station using a UL data channel of a physical layer and may be referred to as RRC signaling, L2 signaling, packet data convergence protocol (PDCP) signaling, or MAC CE.

Herein, TPMI indicates a transmit precoding matrix indicator or information and may be represented similarly with beamforming vector information and beam direction information.

UL DCI or UL-related DCI indicates physical layer control signaling (L1 control signaling) including information necessary for UL transmission, such as UL resource configuration information and resource configuration type information, UL power control information, cyclic shift or an orthogonal cover code (OCC) of a UL reference signal, a channel state information (CSI) request, SRS request, MCS information on a codeword basis, and UL precoding information field information such as a UL grant.

It is assumed that dynamic beamforming or semi-dynamic beamforming is supported to perform UL transmission in various scenarios.

In a wireless communication system such as LTE and LTE-A, upon performing UL transmission, the base station estimates a UL channel through an SRS and determines precoding information and an MCS that the terminal is to use, and so notifies the terminal. The terminal receives the precoding information and MCS information through DCI and thus performs UL transmission. In this case, a capacity of the UL DCI is limited due to insufficient coverage securement and the UL DCI insufficiently transmits information. Therefore, current wireless communication systems support only wideband precoding through single precoding information notification.

The wideband precoding has low precoding accuracy, compared with subband precoding, and a difference of UL transmission efficiency between the wideband precoding and the subband precoding increases in proportion to the number of transmission antennas of the terminal. Unlike a current wireless communication system assuming maximum four terminal transmission antennas, in a future 5G wireless communication system, an antenna form factor is improved and RF technology is developed due to a high frequency carrier. Thus, it is highly likely that a terminal may use at least four transmission antennas. Therefore, demand increases in an NR wireless communication system for a subband precoding support. However, as described above, a performance of such subband precoding is optimized when supporting the number of transmitting antennas of many terminals or when supporting many transmitting precoding. Accordingly, the present disclosure provides a condition and instructing method for operating corresponding subband precoding.

Figure 7:
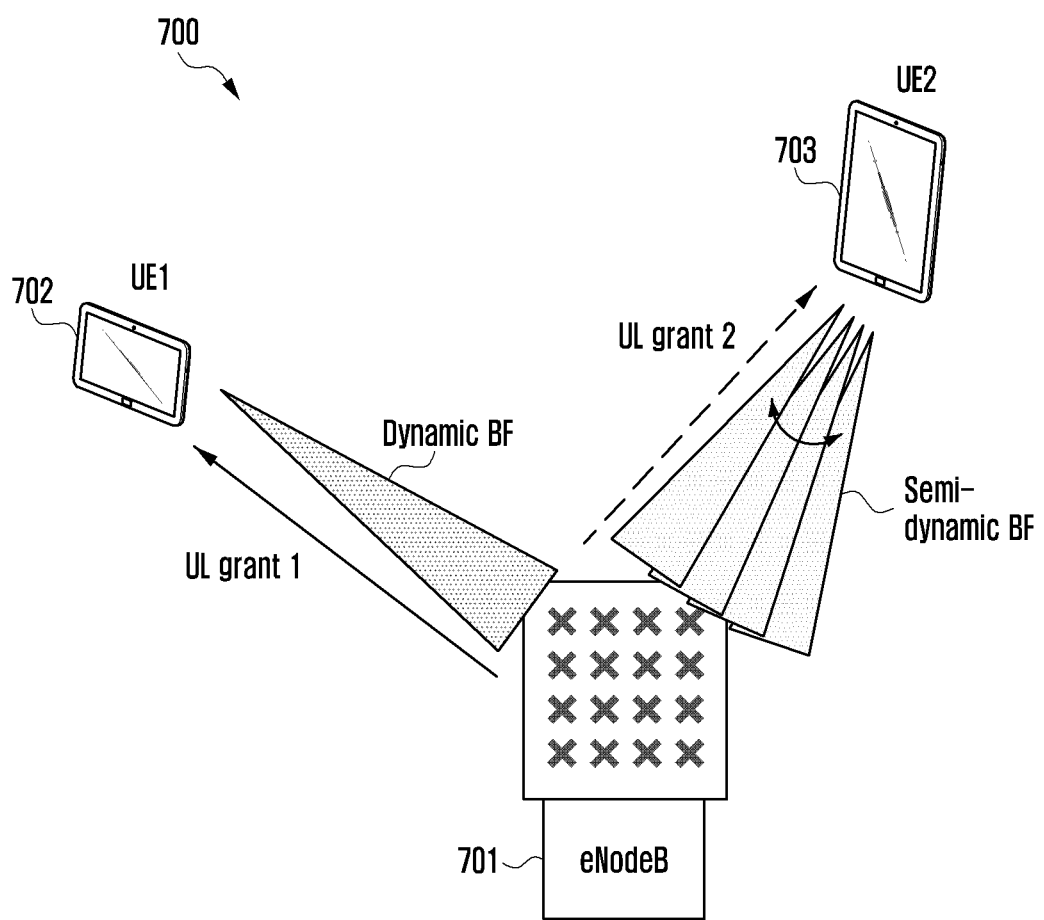
FIG. 7 illustrates an example of uplink transmission through dynamic beamforming and semi-dynamic beamforming, according to an embodiment.

FIG. 7 illustrates an example of UL transmission through dynamic beamforming and semi-dynamic beamforming, according to an embodiment.

Dynamic beamforming is appropriate when accurate UL channel state information is available, such as when a moving speed of the terminal is low, inter-cell separation is well performed, or inter-cell interference management is excellent. In this case, UE 1 702 may perform UL transmission using a beam having a narrow beam width based on accurate UL channel information. The base station 701 notifies TPMI to the terminal through UL DCI, such as a UL grant. The UE receives the TPMI signaling and transmits UL data to the BS using a precoder or a beamforming (BF) vector (or/and matrix) instructed by the TPMI.

Codebook-based MIMO transmission for supporting dynamic beamforming may be operated by UL DCI including a precoding information (PMI) (determined according to a rank indicator (RI) when the RI exists) field which indicates a precoding matrix used for UL transmission allocated to the corresponding terminal. The precoding matrix indicates one direction in an allocated full band in wideband precoding information, but may indicate one direction for each subband in subband precoding information. In this case, a precoding vector specified by the subband precoding information may be limited to be included in a precoding vector group specified by the wideband precoding information, thereby reducing a signaling burden on the subband precoding information.

Semi-dynamic beamforming is appropriate when UL channel state information is inaccurate, such as when a moving speed of the terminal is high, inter-cell separation is not well performed, or inter-cell interference management is insufficient. In this case, UE 2 703 may perform UL transmission using a beam group consisting of multi-directional beams based on schematic UL channel direction information. The base station 701 notifies TPMI to the terminal through the UL grant. The UE receives the TPMI signaling and transmits UL data to the base station using a subset of precoders indicated by the TPMI or a subset of beamforming vectors (and/or a matrix).

Codebook-based MIMO transmission for supporting the semi-dynamic beamforming may be operated by UL DCI including a PMI (determined according to a corresponding RI when an RI exists) field which indicates a group of precoding vectors used in UL transmission allocated to the terminal. The precoding vector group information is used in the same manner in an entire UL band allocated to wideband information. The terminal may apply precoder cycling according to a predetermined pattern to beams included in a notified precoding vector group.

Figure 8:
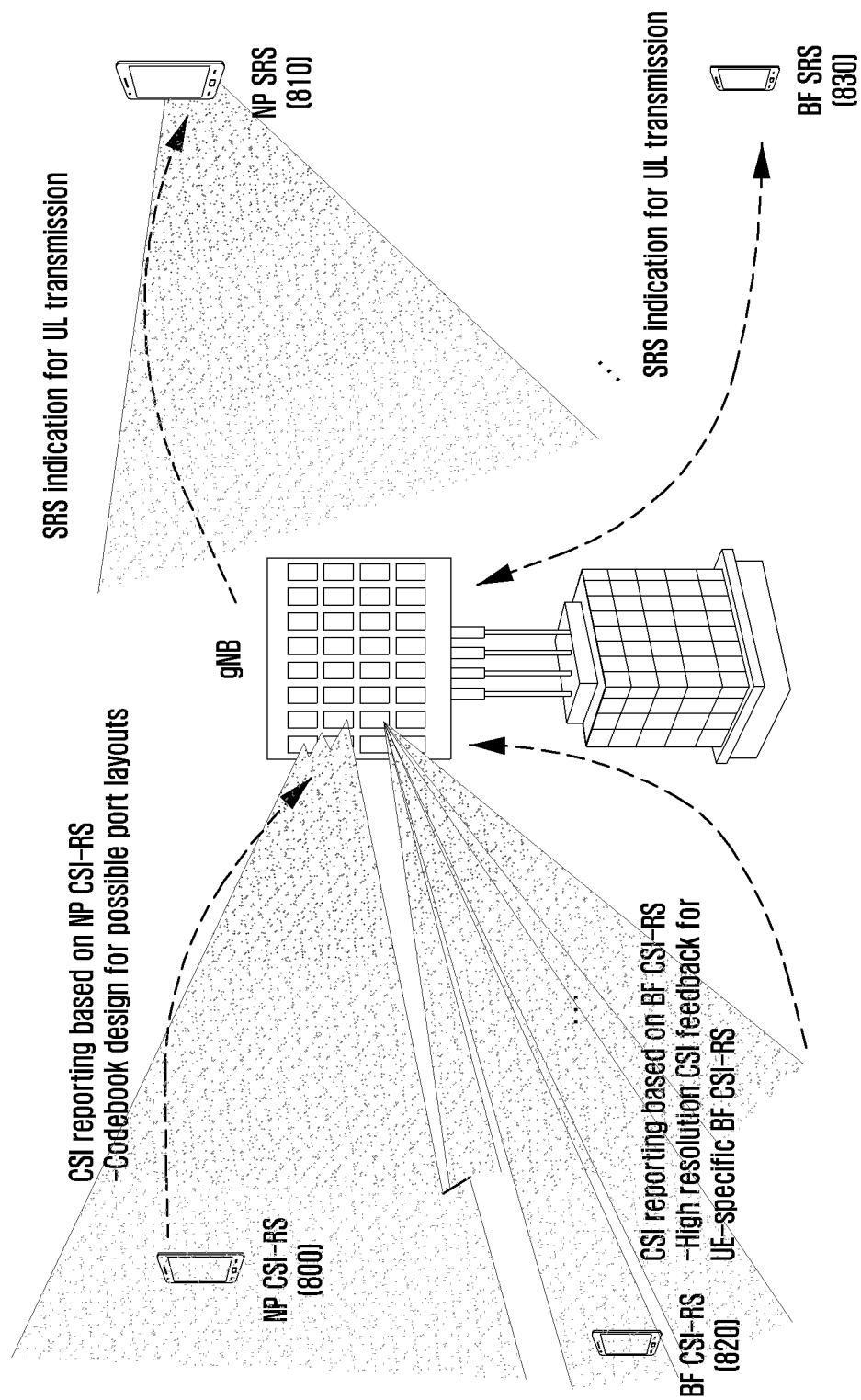
FIG. 8 illustrates an example in which a terminal and a base station transmit a reference signal in order to obtain channel state information necessary for uplink transmission in an NR system, according to an embodiment.

FIG. 8 illustrates an example in which a terminal and a base station transmit a reference signal in order to obtain channel state information necessary for UL transmission in an NR system, according to an embodiment.

A method of supporting multiple antennas supported by the NR system of transmitting a CSI-RS beam of a cell unit or a beam sector, which is a large area may be changed according to whether using a non-precoded CSI-RS (NP CSI-RS) 800 that beamforms using precoding feedback of a terminal or a beamformed CSI-RS (BF CSI-RS) 820 in which a CSI-RS overhead is reduced by applying beamforming to the antenna. In the NP CSI-RS, in order to support many antenna ports, setting of a plurality of unit resources may be used, and in the BF CSI-RS, by setting a plurality of CSI-RS resources instead of unit resource setting, the terminal may select one or a plurality of resources to report channel state information.

Similarly, even when the UE selects an SRS, by setting a plurality of SRS resources and an NP SRS 810 that supports many antennas in a single SRS resource to the terminal, a BF SRS 830 is available using information of one or a plurality of SRS resources. By using the SRS resource set by the base station, the terminal may transmit the SRS and the base station may receive the SRS, instruct the terminal of an optimum transmitting beam required for the base station and the terminal, and find a reception beam optimized to the base station. When reciprocity or beam determination of the channel corresponds in the UL and the DL, a UL beam may be selected using the NP CSI-RS 800 and the BF CSI-RS 820.

A precoding vector group or a beam group in the UL may be defined through the following two methods.

The first method is a beam group definition method based on a hierarchical PMI. For example, the PMI indicating one code point may configure with two or more sub-PMIs. When it is assumed that the PMI is configured with two sub-PMIs, a first PMI may indicate one of beam group indexes including the specific number of precoding vectors, and a second PMI may indicate one of indexes of a precoding vector included in the beam group. For example, a UL codebook configured with a beam group G including the M number of terminal transmitting antennas and the B number of discrete Fourier transform (DFT) precoding vectors $v_k$ based on an oversampling factor of O may be defined by Equation (1), as follows.

$$v_k = \frac{1}{\sqrt{M}} \times [1 \; e^{j\frac{2\pi k}{OM}} \; e^{j\frac{4\pi k}{OM}} \; \ldots \; e^{j\frac{2\pi(M-1)k}{OM}}]^T \quad (1)$$

$$G_i = [v_{Ai} \; v_{mod(Ai+1,OM)} \; \ldots \; v_{mod(Ai+B-2,OM)} \; v_{mod(Ai+B-1,OM)}]$$

where A is a beam skipping factor and indicates a gap (beam unit) between beam groups. In Equation (1), a first PMI i indicates an index of a beam group, and a single precoding vector may be designated by a second PMI having a payload of $\lceil \log_2 B \rceil$.

The second method is a beam or beam group definition method based on a PMI of a single structure. For example, one PMI may be understood as an indicator of a single beam or of a beam group according to higher layer or physical layer signaling. For example, a UL codebook configured with the M number of terminal transmitting antennas, an i-th DFT precoding vector $v_i$ based on an oversampling factor of O, and a beam groups $G_i$ including the B number of DFT precoding vectors may be defined to Equation (2), as follows.

$$v_i = \frac{1}{\sqrt{M}} \times [1 \; e^{j\frac{2\pi i}{OM}} \; e^{j\frac{4\pi i}{OM}} \; \ldots \; e^{j\frac{2\pi(M-1)i}{OM}}]^T \quad (2)$$

$$G_i = [v_i \; v_{mod(i+1,OM)} \; \ldots \; v_{mod(i+B-2,OM)} \; v_{mod(i+B-1,OM)}]$$

In Equation (2), an i-th PMI indicates $v_i$ when the higher layer or physical layer signaling instructs dynamic beamforming or wideband precoding. However, when the higher layer or physical layer signaling instructs semi-dynamic beamforming or subband precoding, an i-th PMI indicates G.

Table 2 below describes a TPMI analysis method when dynamic or semi-dynamic beamforming transmission or wideband or subband precoding is designated by higher signaling. Table 3 below describes a TPMI analysis method when dynamic or semi-dynamic beamforming transmission or wideband or subband precoding is designated by physical layer signaling

TABLE 2

PMI table for embodiment 1

| PMI value i | Precoder or precoder group | |
|---|---|---|
| | BeamformingScheme = 'Dynamic' | BeamformingScheme = 'Semi-dynamic' |
| 0 | $v_0$ | $G_0$ |
| 1 | $v_1$ | $G_1$ |
| 2 | $v_2$ | $G_2$ |
| ... | ... | ... |
| OM − 1 | $v_{OM-1}$ | $G_{OM-1}$ |

TABLE 3

PMI table for embodiment 2

| PMI value i | Interpretation | |
|---|---|---|
| | Beamforming scheme | Precoder or precoder group |
| 0 | Dynamic | Precoder $v_0$ |
| 1 | Dynamic | Precoder $v_1$ |
| 2 | Dynamic | Precoder $v_2$ |
| ... | ... | ... |
| OM − 1 | Dynamic | Precoder $v_{OM-1}$ |
| OM | Semi-dynamic | Precoder group $G_0$ |
| OM + 1 | Semi-dynamic | Precoder group $G_1$ |
| OM + 2 | Semi-dynamic | Precoder group $G_2$ |
| ... | ... | ... |
| 20M − 1 | Semi-dynamic | Precoder group $G_{OM-1}$ |

In Equations (1) and (2), by assuming that the transmitting antennas of the terminal are configured with a one-dimensional antenna array, a codebook configured with a one-dimensional DFT vector is assumed, but when the transmission antennas of the terminal are configured with a two-dimensional antenna array, a UL codebook of different forms may be used. For example, when a transmitting antenna array of the terminal includes $M_1$ number of antenna ports in a first dimension and $M_2$ number of antenna ports in a second dimension, the transmitting antenna array may define a precoding vector $v_{m_1,m_2}$, and a beam group such as the following Equation (3) through a pair of indexes $m_1$ and $m_2$.

$$v_{m_1,m_2} = \frac{1}{\sqrt{M_1 M_2}} \times [1 \; e^{j\frac{2\pi m_1}{O_1 M_1}} \; e^{j\frac{4\pi m_1}{O_1 M_1}} \; ... \; e^{j\frac{2\pi(M_1-1)m_1}{O_1 M_1}}]^T \otimes \qquad (3)$$

$$[1 \; e^{j\frac{2\pi m_2}{O_2 M_2}} \; e^{j\frac{4\pi m_2}{O_2 M_2}} \; ... \; e^{j\frac{2\pi(M_2-1)m_2}{O_2 M_2}}]^T = v_{m_1} \otimes v_{m_2}$$

$$G_{m_1,m_2} = G_{m_1} \otimes G_{m_2}$$

$$G_{m_i} = [v_{m_i} \; v_{mod(m_i+1, O_i M_i)} \; ... \; v_{mod(m_i+B_i-2, O_i M_i)} \; v_{mod(m_i+B_i-1, O_i M_i)}]$$

In Equations (1), (2), and (3), it is assumed that all transmission antennas of the terminal have the same polarization, but when three transmission antennas of the terminal are configured with a dual-polarized array, the UL codebook examples may be changed accordingly. For example, when the transmitting antenna of the terminal is a one-dimensional array configured with the total 2M number of antenna ports of the M number on each polarization basis, a rank 1 precoding vector $v_{i,k}$ and a beam group $G_m$ such as in the following Equation (4) may be defined.

$$v_{i,k} = \frac{1}{\sqrt{2M}} \times \begin{bmatrix} d_i \\ \phi_k d_i \end{bmatrix} \qquad (4)$$

$$d_i = [1 \; e^{j\frac{2\pi i}{OM}} \; e^{j\frac{4\pi i}{OM}} \; ... \; e^{j\frac{2\pi(M-1)i}{OM}}]^T, \phi_k = e^{j2\pi k/K}$$

$$G_m = [v_m \; v_{mod(m+1, OM)} \; ... \; v_{mod(m+B-2, OM)} \; v_{mod(m+B-1, OM)}],$$

$$m = (K-1)i + k$$

In Equation (4), K indicates a co-phasing quantization level.

In another example, when the transmission antenna of the terminal is a two-dimensional array configured with total 2 $M_1 M_2$ antenna ports of $M_1 M_2$ on each polarization basis, a rank 1 precoding vector $v_{m_1,m_2,k}$ such as in the following Equation (5) may be defined, where $M_1$ and $M_2$ are the number of terminal transmission antenna ports on a polarization basis included in a first dimension and a second dimension, respectively. The beam group may be configured similarly to Equation (3) based on $V_{m_1,m_2,k}$ of Equation (5).

$$v_{m_1,m_2,k} = \frac{1}{\sqrt{2M_1 M_2}} \times \begin{bmatrix} d_{m_1} \otimes d_{m_2} \\ e^{\phi_k} d_{m_1} \otimes d_{m_2} \end{bmatrix} \qquad (5)$$

$$d_{m_1} = [1 \; e^{j\frac{2\pi m_1}{O_1 M_1}} \; e^{j\frac{4\pi m_1}{O_1 M_1}} \; ... \; e^{j\frac{2\pi(M_1-1)m_1}{O_1 M_1}}]^T$$

$$d_{m_2} = [1 \; e^{j\frac{2\pi m_2}{O_2 M_2}} \; e^{j\frac{4\pi m_2}{O_2 M_2}} \; ... \; e^{j\frac{2\pi(M_2-1)m_2}{O_2 M_2}}]^T$$

The dynamic or semi-dynamic beamforming or wideband and subband precoding signaling example, i.e., Tables 2 and 3, may be easily applied to the codebook examples.

A description has been made based on a rank 1 codebook indicating a single direction, but in implementation, the present disclosure is not limited thereto and may be equally applied to a codebook of rank 2 or more indicating two or more directions.

The examples assume when one TPMI is included in a UL DCI, and the terminal, having received this may apply UL precoding of one beam group or one beam direction to an entire UL band allocated thereto.

Figure 9:
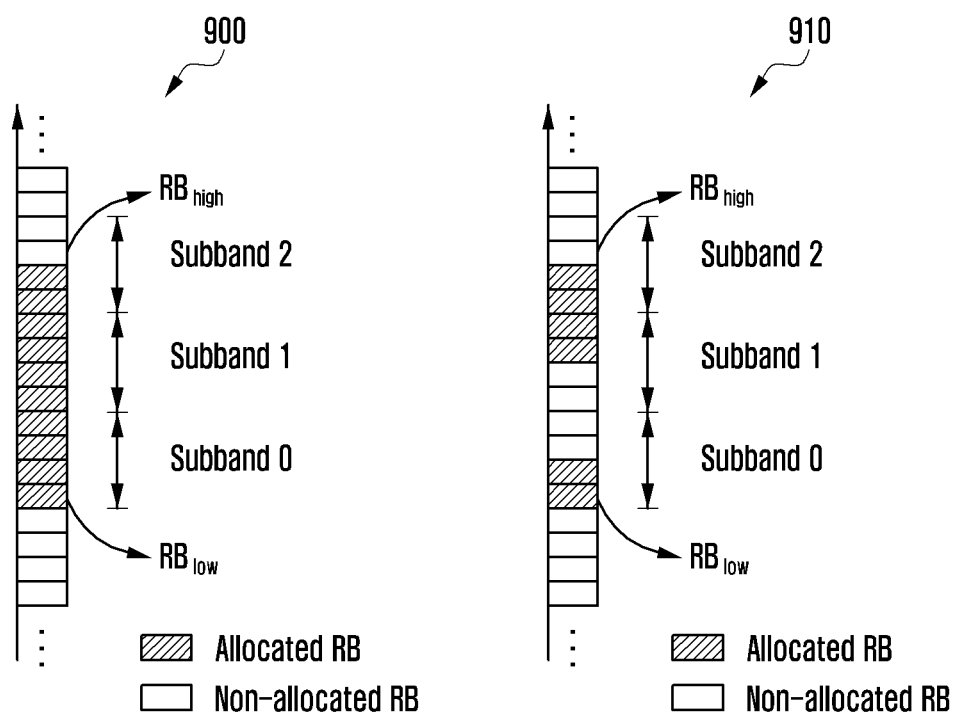
FIG. 9 illustrates an example of resource allocation and subband precoding application for uplink transmission, to which the present disclosure is applied.

FIG. 9 illustrates an example of resource allocation and subband precoding application for UL transmission, to which the present disclosure is applied. For example, for subband precoding, the base station may include and transmit the $N_{PMI}$ number of TPMIs including precoding information of a plurality (e.g., the $N_{PMI}$ number) of subbands in the UL DCI. The $N_{PMI}$ value may be determined by the number ($RA_{RB}$) of UL resources (RBs) allocated to the terminal, the number ($P_{SUBBAND}$) of RBs constituting the subband, and a UL resource allocation method, as provided in Equation (6) below.

When allocating contiguous RBs, as in 900 of FIG. 9, 910 illustrates a UL resource when allocating the clustered RBs. In FIG. 9, it is assumed that $P_{SUBBAND}=4$. In FIG. 9, when a resource is allocated as configured with one cluster, as shown in 900, the number of necessary subbands may be calculated by Equation (6) by $RA_{RB}$ and $P_{SUBBAND}$. A cluster indicates a set of the contiguously allocated UL RBs.

$$N_{PMI} = \left\lceil \frac{RA_{RB}}{P_{SUBBAND}} \right\rceil. \qquad (6)$$

However, when a resource configured with at least one cluster is allocated, as in 910, a calculation of Equation (6) may not be accurate, and in this case, $N_{PMI}$ may be calculated based on a method of Equations (7) and (8), provided below. Equation (7) calculates $N_{PMI}$ based on a lowest index $RB_{low}$ and a highest index $RB_{high}$ among the allocated RBs. Equation (8) calculates $N_{PMI}$ based on the number of contiguous NRBs allocated on each cluster basis. In Equation (8), $RA_{RBS,n}$ is the number of contiguous RBs allocated to the n-th cluster, and N is the number of clusters allocated to the terminal.

$$N_{PMI} = \left\lceil \frac{RB_{high} - RB_{low} + 1}{P_{SUBBAND}} \right\rceil \quad (7)$$

$$N_{PMI} = \left\lceil \frac{RA_{RB,1}}{P_{SUBBAND}} \right\rceil + \ldots + \left\lceil \frac{RA_{RB,N}}{P_{SUBBAND}} \right\rceil \quad (8)$$

When one UL PMI is configured with the T number of bits for UL subband precoding, the $N_{PMI}T$ bits of TPMI payload transmission may be required, which indicates that when several subbands and several bits of codebook are used, several tens of bits or more are required in TPMI signaling, which is burdensome in transmitting to the UL DCI. Thus, it is necessary to define a new UL subband precoding method for reducing such a UL DCI burden. In UL transmission, when defining an environment that supports subband precoding, UL DCI coverage of a terminal having few transmission and reception antennas can be improved, and by supporting subband precoding to a terminal having many transmission and reception antennas, UL transmission performance and an overall system performance of the terminal can also be improved.

Embodiment 1-1

The terminal may be instructed to one or the plurality of SRS resources set in advance to an RRC from the base station to the terminal in order to determine precoding applied to UL subband precoding. The number of SRS resources in which such a base station instructs the terminal may vary according to whether the terminal supports subband precoding.

Figure 10:
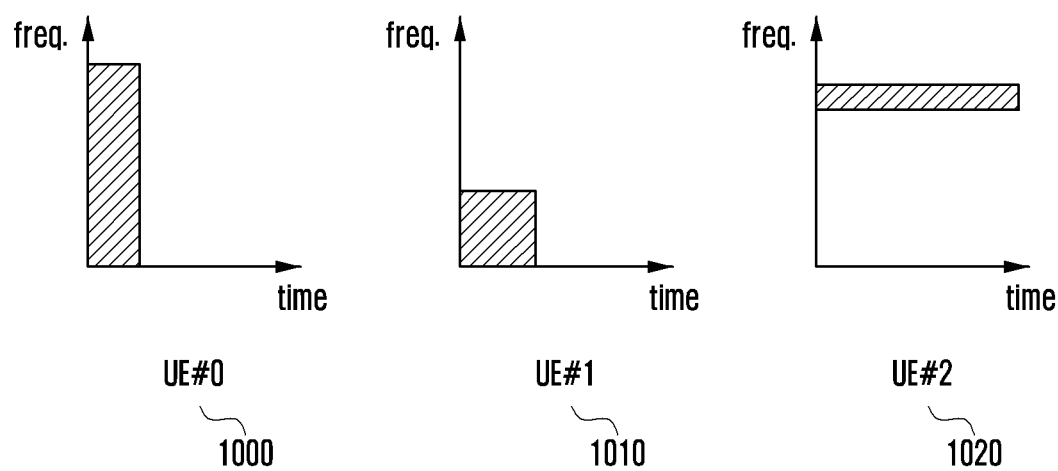
FIG. 10 illustrates an example of time and frequency resources in which a plurality of terminals use for transmitting uplink data, according to an embodiment.

FIG. 10 illustrates an example of the time and frequency resources used for a plurality of terminals to transmit UL data, according to an embodiment.

As shown in FIG. 10, UL transmission resource allocation is changed according to a channel state of the terminal. In particular, in a UL, transmission power is limited due to battery characteristics of the terminal and hardware limitations. Therefore, consideration of resource allocation characteristics different from a DL is required. In 1000, UE #0 having a good channel state may transmit UL data using a wide frequency band and a short time, since data may be well transmitted with only transmission power of the terminal with a good channel state between the terminal and the base station.

UE #1 in 1010 transmits data using an increased time and a somewhat restricted frequency band, due to a relatively poor channel state compared to UE #0 in 1000. In a UL, as shown in FIG. 10, by reducing a transmission band and increasing a transmission time, a power spectral density of a frequency may be increased. Transmission power of the terminal is limited within a particular time, but when the same power is used repeatedly several times, improved coverage of terminal transmission data is obtained. When a channel state between the terminal and the base station is very poor, a resource may be allocated to transmit in a very narrow band for a long time, as shown in 1020.

As shown in FIG. 10, because characteristics of UL transmission are different in each terminal, precoding related information necessary when the terminal performs a transmission may be different in each band. Therefore, as described above, when the terminal applies full-band precoding, the base station instructs one SRS, and when the terminal supports subband precoding, by instructing SRS resources of the same number as that of a bandwidth part, which is the subband number or a set of subbands, the base station may support the terminal to perform UL transmission and the terminal may determine whether a codebook used when the terminal transmits should use several antenna port based codebooks through the instructed SRS resource and how a codebook subset restriction of the codebook is set.

In order to efficiently use the SRS resources upon performing the instruction, the base station may activate in advance some of the SRS resources set through a higher layer such as the RRC and instruct only some of the activated resource through the DCI. In particular, in a higher frequency band, a data beam of the terminal reduces due to reduction of an antenna form factor, thus requiring the support of a large number of beams and the support of the number of the SRS resources. In this case, by activating and deactivating such SRS resources, optimization of a resource corresponding to a position of the terminal and an optimal beam group can be performed. An actual transmitting method of the SRS IS as follows.

SRS resource setting and triggering method 1: this method may previously set a plurality of aperiodical SRS resources, activate a portion of the preset resource, and trigger some of the activated resources.

SRS resource setting and triggering method 2: this method may previously set a plurality of aperiodical SRS resources and periodically transmit the CSI-RS resource until corresponding CSI-RS resource transmission is deactivated according to activation.

SRS resource setting and triggering method 1 previously sets a plurality of aperiodic SRS resources, activates a portion of the preset resource, and triggers a portion of the activated resource. For activation of such a resource, the base station may transmit an activation signal using a MAC CE signal. The terminal, having received the activation signal may perform the SRS transmission until a DCI trigger of the base station for the SRS resource transmission is transferred.

SRS resource setting and triggering method 2 sets in advance a plurality of semi-persistent SRS resources and periodically transmits the SRS resources until SRS resource transmission is deactivated according to activation. For activation of resources, the base station may transmit an activation signal using a MAC CE signal, may activate or deactivate candidate resources through the MAC CE signal, and may perform actual activation or deactivation through the DCI for some of activated candidate resources through the MAC CE signal.

Figure 11:
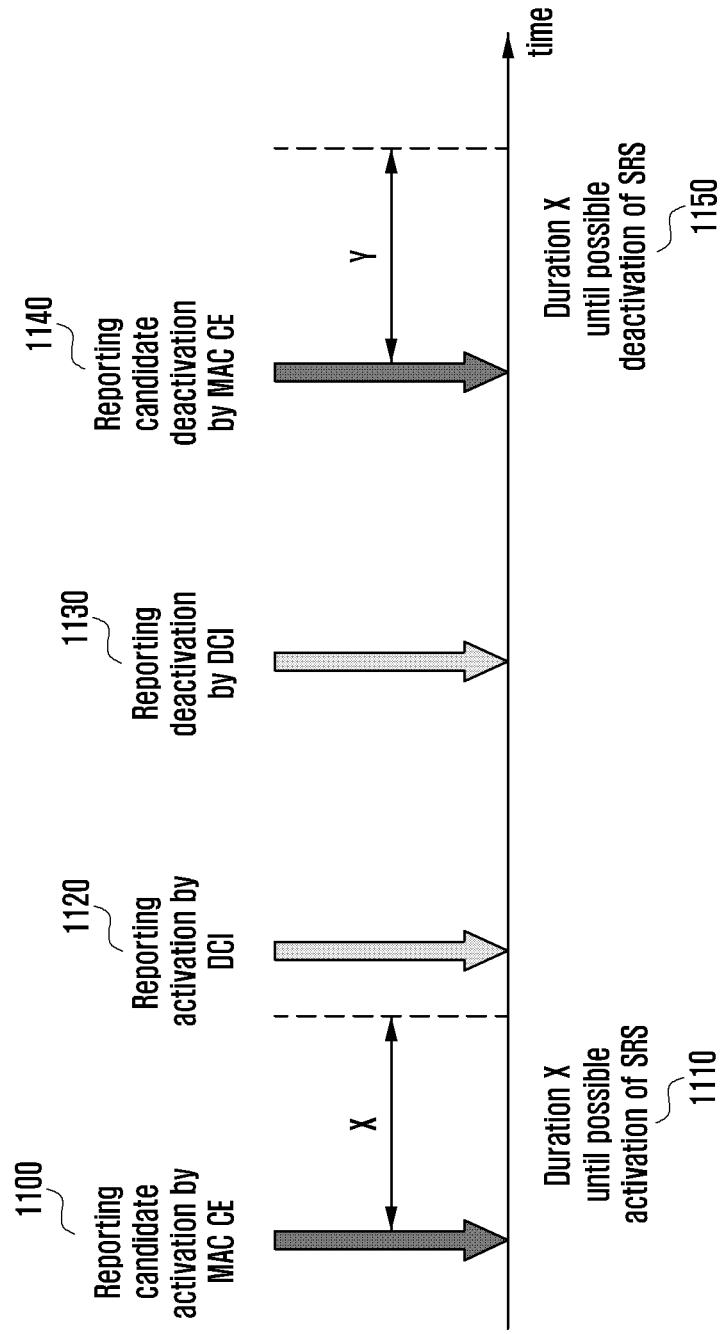
FIG. 11 illustrates an actual activation operation through downlink control information (DCI) and sounding reference signal (SRS) candidate resource activation through the medium access control (MAC) control element (CE), according to an embodiment.

FIG. 11 illustrates an actual activation operation through DCI and SRS candidate resource activation through the foregoing MAC CE, according to an embodiment. In FIG. 11, the base station activates candidate resources through the MAC CE at step 1100. Until the terminal receives the signal and is activated, a time X is required at step 1110. Thereafter, the terminal receives a DCI that activates a report resource from the base station at step 1120. Thereafter, the terminal receives a DCI that deactivates a report resource at step 1130 and receives a MAC CE that deactivates a report candidate resource at step 1140. A time Y is required at step 1150 until actual deactivation is performed after the terminal receives the signal.

In this case, detailed information of the SRS necessary for the SRS transmission, an SRS transmission band, transmission period and slot, subframe, or mini-slot offset may be set. The antenna port number or cyclic shift and transmission comb for Zadoff-Chu sequence transmission may be transmitted for each SRS group.

In this case, the number of a plurality of preset SRS antenna ports may be set to be the same or the number of one antenna port may be set. Unlike the base station supporting relatively many antennas, such as 16 or 32 ports, the terminal can only have a limited number of antennas because of a form factor thereof. Therefore, there is negligible necessity to differently set the number of the antennas. By equally setting the number of antenna ports of all SRS resources, complexity can be reduced in which the number of antenna ports supporting in subband precoding changes for each resource and a UL DCI overhead can be reduced using the same wideband TPMI.

Embodiment 1-2

As described above, when the terminal performs UL transmission, if reversibility or beam determination of a channel corresponds, the terminal supports UL data transmission with reference to a CSI-RS used for DL data transmission. In this case, the CSI-RS may be transferred to the terminal using the following methods.

CSI-RS instruction Method 1 for UL transmission: a method of instructing a CSI-RS for UL data transmission through the DCI.

CSI-RS instruction Method 2 for UL transmission: a method of instructing a CSI-RS for UL data transmission through the RRC or MAC CE.

CSI-RS instruction Method 3 for UL transmission: a method of indirectly instructing a CSI-RS for UL data transmission through the instructed SRS resource.

CSI-RS instruction Method 1 for UL transmission instructs through the DCI. As the base station has a field that instructs a CSI-RS resource in a UL DCI that allocates data transmission to the terminal, the terminal may accurately determine channel information through the CSI-RS. A CSI-RS resource may be transferred for the full-band precoding support. Even if subband precoding is supported, a CSI-RS may be transferred for channel determination, and a plurality of CSI-RSs may be transferred upon subband precoding.

CSI-RS instruction Method 2 for UL transmission instructs through the RRC or MAC CE. When dynamically transferring a CSI-RS instruction, as in Method 1, application of the CSI-RS may be performed quickly and flexibly, but a DCI overhead increases. In order to minimize this overhead, by instructing a CSI-RS resource per terminal or per cell through the RRC or MAC CE, the base station may assist UL transmission.

CSI-RS instruction Method 3 for UL transmission indirectly instructs through an instructed SRS resource. In this case, a CSI-RS resource may be set through an RRC or MAC CE per SRS resource or per SRS resource set, or a CSI-RS resource set per SRS resource may be activated and deactivated. A basic activation and deactivation operation is performed and may be similar to or the same as the SRS activation and deactivation operation described in Embodiment 1-1. Therefore, when an SRS resource is instructed for UL data transmission to the terminal, the terminal may determine channel state information through the CSI-RS resource previously set or previously activated to the SRS resource and support data transmission.

Embodiment 1-3

The base station may instruct the terminal using the following methods in order to determine whether the terminal uses subband precoding.

Subband precoding use instruction Method 1: the base station instructs whether to use subband precoding through the DCI.

Subband precoding use instruction Method 2: the base station instructs whether to use subband precoding through the RRC or MAC CE.

Subband precoding use instruction Method 3: the base station instructs whether to use precoding through the number of antenna ports of the instructed SRS resource.

Subband precoding use instruction Method 4: the base station instructs whether to use precoding through the number of SRS resources set to the terminal.

Subband precoding use instruction Method 1 instructs through the DCI. When the base station schedules UL data transmission to the terminal, as described above, the base station may transfer information such as a TRI, wideband TPMI, and resource allocation to the UL DCI, and may instruct to the terminal whether to use subband precoding using 1 bit. For example, in 0, the base station may instruct to use full-band precoding, and in 1, the base station may instruct to use subband precoding.

When the terminal receives an instruction of subband precoding using 1 bit, the terminal may determine preset information, such as subband TPMI information within the same DCI or of a second DCI (in this case, the DCI including wideband TPMI and 1 bit instruction may be referred to as a first DCI) or preset subband TPMI information through the MAC CE or the RRC. In this case, when the terminal receiver receives a subband TPMI through the MAC CE or the RRC, subband TPMI information may be set based on an SRS resource that may be instructed to the terminal or set to the terminal, and the terminal may determine a subband TPMI through the 1 bit information and the instructed SRS resource.

Subband precoding use instruction method 2 instructs by the RRC or MAC CE. As the base station previously sets whether to use subband precoding to the terminal through the RRC or MAC CE, the terminal may determine whether the subband precoding is used. In this case, as an amount of information of the UL DCI is reduced in which the base station transmits to the terminal, coverage of the UL DCI can be ensured.

Subband precoding use instruction method 3 instructs whether to use subband precoding through the number of antenna ports of the instructed SRS resource. As described above, when the number of transmission antennas of the terminal is fully secured, performance improvement of UL subband precoding is large. Therefore, when the number of antenna ports of the SRS resource instructed to the terminal is small, the terminal does not support subband precoding, and when the number of antenna ports is more than the number of specific antenna ports, the terminal may support subband precoding. For example, when the number of SRS ports instructed to the terminal is greater than 2 or 4, the terminal may use subband precoding. When the number of ports of all SRS resources is equally set or has one value, the terminal may determine whether UL subband precoding is performed through the number of SRS antenna ports previously set through the RRC or MAC CE instead of the UL DCI of the base station.

Subband precoding use instruction method 4 instructs by the number of SRS resources set to the terminal. As described in FIG. 9, as a method of supporting a terminal having many transmitting antennas, one or a small number of SRS resources may supports many antenna ports, but many SRS resources may be used when using the small number of antenna ports. Therefore, when the number of resources is more than the specific number, the terminal may use subband precoding. For example, when two or more SRS resources are set to the terminal, the terminal may use subband precoding. Alternatively, when three or more SRS resources are set or four or more SRS resources are set to the terminal, the terminal may use subband precoding.

The subband precoding use instruction method may be used with a plurality of combinations. For example, when the instruction methods 3 and 4 are simultaneously satisfied (when the number of the antenna ports of instructed and/or preset SRS resources the number of preset SRS resources is greater than the predetermined number), subband precoding may be used. When the instruction methods 1 and 3 are simultaneously satisfied (when subband precoding is set for use with the RRC and when the number of antenna ports of the instructed and/or preset SRS resources is greater than the predetermined number), subband precoding may be used. In another example, when all of the instruction Methods 1, 3 and 4 are satisfied, subband precoding may be used.

The instruction method may be used only when using the CP-OFDM when the terminal transfers UL data. In DFT-S OFDM, subband precoding cannot be applied in a characteristic of the waveform. Therefore, in the DFT-S OFDM, full-band precoding is always assumed, and subband precoding may be applied only to CP-OFDM. Such a method may be changed according to a rank in which the terminal transmits data. At present, in the NR system, because the DFT-S OFDM is only used in rank 1 transmission, full-band precoding is assumed in rank 1, and subband precoding may be applied in only CP-OFDM.

Embodiment 1-4

When the base station supports a subband TPMI to the terminal, subband TPMI may be transferred using the following methods.

Subband TPMI transfer Method 1: a subband TPMI may be transferred using a subband TPMI payload corresponding to the instructed number of SRS resources.

Subband TPMI transfer Method 2: a subband TPMI may be transferred using a subband TPMI payload corresponding to the maximum number of SRS resources.

Subband TPMI transfer Method 1 transfers a subband TPMI using a subband TPMI payload corresponding to the instructed number of SRS resources. A size of such a subband TPMI may interlock with an SRS resource having the largest number of antenna ports among SRS resources set to the terminal. In general, as the number of antenna ports increases, a beam width supported by the corresponding antenna reduces and thus a higher signal interference to noise ratio (SINR) may be ensured, but a relatively large number of TPMIs is required. Therefore, the number of bits of subband TPMI may vary according to the instructed SRS resource, and the method enables minimization of DCI coverage waste using an optimum overhead DCI. Because the amount of blind decoding may increase according to a DCI size, the method may be more appropriate to subband TPMI transmission through a second DCI decoding after determining whether a subband TPMI exists through a first UL DCI.

Subband TPMI transfer Method 2 transfers a subband TPMI using a subband TPMI payload corresponding to the maximum number of SRS resources. In order for the terminal to receive the DCI, the terminal should know in advance a payload size of the DCI. In general, as the number of antenna ports increases, a beam width supported by the corresponding antenna reduces and thus a higher SINR may be ensured, but a relatively large number of TPMIs are required. Therefore, when TPMI bits are matched based on a SRS resource having the largest antenna number, a DCI size is unchanged and an additional blind decoding burden to the terminal may be reduced. As described in embodiment 1-1, when all SRS resources have one or the same number of antenna port, the corresponding TPMI may be transferred to correspond to the number of subband TPMIs required by the antenna port.

Subband TPMI described in embodiment 1-4 may be transferred through the DCI, second DCI, MAC CE, RRC, and PDSCH.

Embodiment 1-5

According to the above embodiments, the base station sets at least one SRS resource to the terminal for UL transmission. When two or more SRS resources are set to the terminal through higher layer signaling, the base station may instruct an SRS resource(s) to be used for UL transmission to the terminal through the DCI. When the at least one preset SRS resource is configured with the different numbers of SRS antenna ports, the TPMI payload may vary according to the number of SRS antenna ports and thus the following methods may be used for specifying the TPMI through the DCI.

TPMI transfer Method 1: The TPMI may be transferred using a TPMI payload corresponding to the SRS port number of the instructed SRS resource.

TPMI transfer Method 2: The TPMI may be transferred using a TPMI payload corresponding to an SRS resource having the largest number of SRS ports among the preset SRS resources.

TPMI transfer method 1 transfers a TPMI using a TPMI payload corresponding to the number of SRS antenna ports of the instructed SRS resource. In general, as the number of antenna ports increases, a beam width supported by the antenna decreases and thus a higher SINR can be secured, but a relatively large number of TPMIs is required. Therefore, the number of bits of subband TPMI may vary according to the instructed SRS resource, and the method enables minimization of DCI coverage waste using an optimal DCI overhead. This method may be more suitable for subband TPMI transmission through a second DCI decoding after the terminal determines existence of subband TPMI through a first UL DCI because the amount of blind decoding may increase according to a DCI size.

TPMI transfer Method 2 transmits a TPMI using a TPMI payload corresponding to a SRS resource having the largest number of SRS antenna ports among the preset SRS resources. In order for the terminal to receive the DCI, the terminal should know in advance a payload size of the corresponding DCI. In general, as the number of antenna ports increases, a beam width supported by the antenna decreases and thus a higher SINR can be secured, but a relatively large number of TPMIs is required. Therefore, when the TPMI bits are allocated based on a SRS resource having the highest number of antennas, a DCI size is unchanged, and an additional blind decoding burden may be reduced to the terminal. As described in embodiment 1-1, when all SRS resources have one or the same number of antenna ports, the corresponding TPMI may be transferred according to the number of subband TPMIs required in the corresponding antenna port. In this example, when the number of TPMI bits according to the instructed SRS resource is less than a maximum TPMI payload, the remaining bits are padded by a determined value such as '0 . . . 0'.

Figure 12:
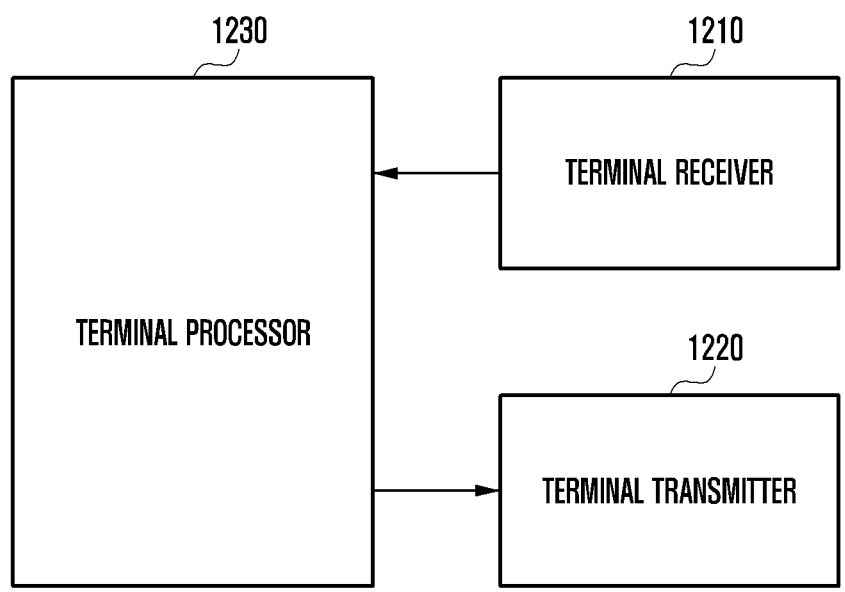
FIG. 12 illustrates an internal structure of a terminal according to an embodiment.
Figure 13:
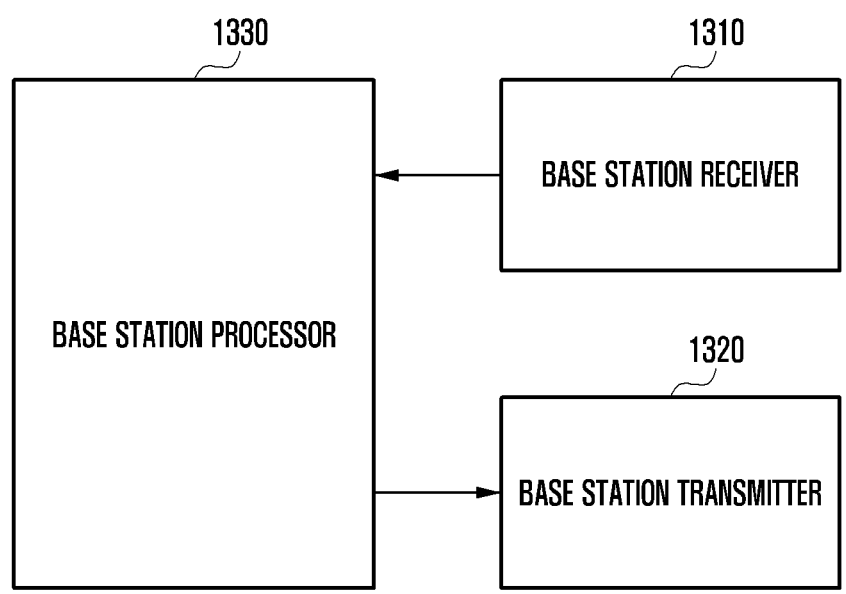
FIG. 13 illustrates an internal structure of a base station according to an embodiment.

To perform embodiment 1-1 to embodiment 1-4, each of a transmitter, receiver, and processor of the terminal and the base station operates as shown in FIGS. 12 and 13.

FIG. 12 illustrates an internal structure of a terminal according to an embodiment. As shown in FIG. 12, the terminal of the present disclosure may include a terminal receiver 1210, terminal transmitter 1220, and terminal processor 1230. The terminal receiver 1210 and the terminal transmitter 1220 may be referred to as a transceiver, which may transmit and receive a signal to and from the base station. The signal may include control information and data, and thus the transceiver may include an RF transmitter for up-converting and amplifying a frequency of a signal to be transmitted and an RF receiver for low noise amplifying a received signal and down-converting a frequency thereof. The transceiver may receive a signal through a radio channel and output the signal to the terminal processor 1230 and transmit a signal output from the terminal processor 1230 through the radio channel. The terminal processor 1230 may control a series of processes to enable the terminal to operate according to the foregoing embodiments of the present disclosure.

FIG. 13 illustrates an internal structure of a base station according to an embodiment. As shown in FIG. 13, the base station of the present disclosure may include a base station receiver 1310, base station transmitter 1320, and base station processor 1330. The base station receiver 1310 and the base station transmitter 1320 may be referred to as a transceiver, which may transmit and receive a signal to and from a terminal. The signal may include control information and data, and thus, the transceiver may include a RF transmitter for up-converting and amplifying a frequency of a signal to be transmitted and an RF receiver for low noise amplifying a received signal and down-converting a frequency of the signal. The transceiver may receive a signal through a radio channel, output the signal to the base station processor 1330, and transmit the signal output from the base station processor 1330 through a radio channel. The base station processor 1330 may control a series of processes to enable the base station to operate according to the foregoing embodiments of the present disclosure.

The each embodiment may be operated with combined, as needed. For example, portions of an embodiment 1-1 and an embodiment 1-2 of the present disclosure may be combined to be operated in a base station and a terminal.

Second Embodiment

Figure 14:
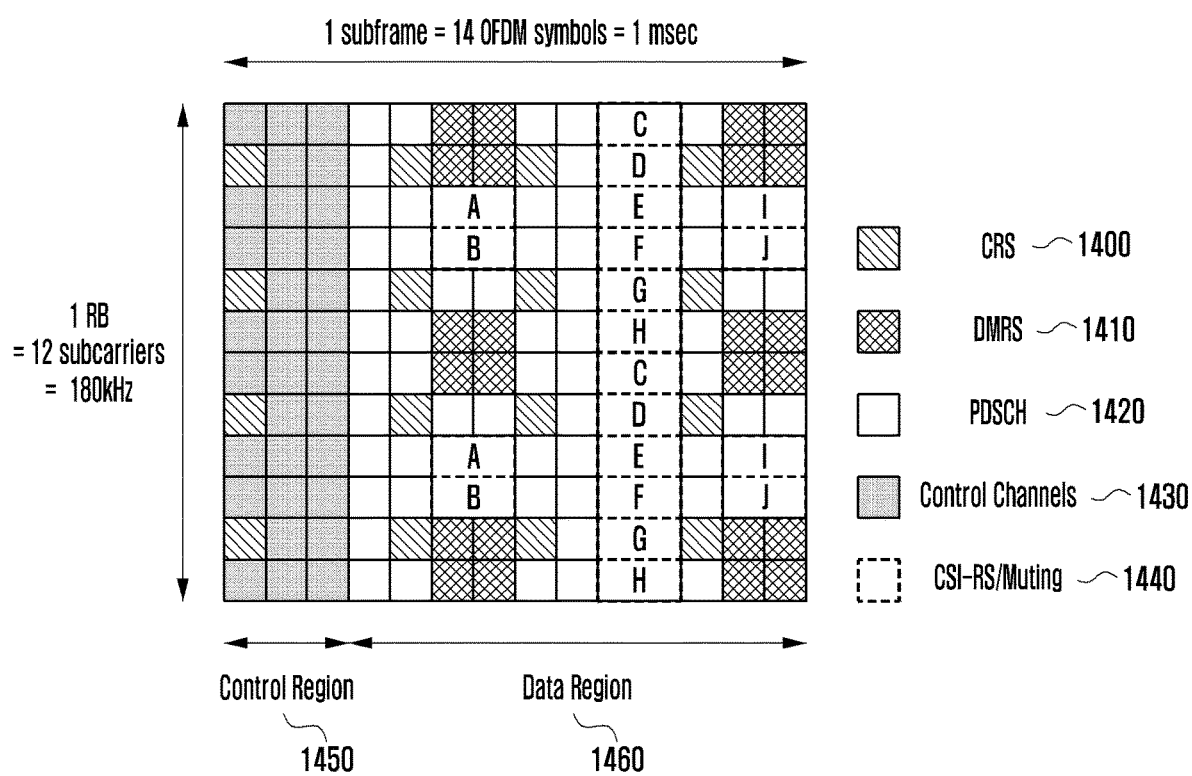
FIG. 14 illustrates a radio resource of 1 subframe and 1 resource block (RB), which are a minimum unit that may be scheduled with a downlink in LTE and LTE-A systems, according to an embodiment.

FIG. 14 illustrates a radio resource of 1 subframe and 1 RB, which are a minimum unit that may be scheduled with a DL in LTE and LTE-A systems, according to an embodiment.

The radio resource of FIG. 14 is formed with one subframe on a time axis and with one RB on a frequency axis. Such a wireless resource is formed with 12 subcarriers in a frequency domain and is formed with 14 OFDM symbols in a time domain to have total 168 intrinsic frequencies and time positions. In the LTE and LTE-A systems, respective intrinsic frequencies and time positions of FIG. 14 are referred to as an RE.

As a radio resource shown in FIG. 14, a plurality of different types of signals may be transmitted as follows.

1. Cell specific RS (CRS) 1400: a reference signal periodically transmitted for all terminals belonging to a single cell and may be commonly used by a plurality of terminals.

2. Demodulation reference signal (DMRS) 1410: a reference signal transmitted for a specific terminal only when transmitting data to the corresponding terminal, and formed with total eight DMRS ports. In the LTE-A system, port 7 to port 14 correspond to the DMRS port and maintain orthogonality to avoid interference using code division multiplexing (CDM) or frequency division multiplexing (FDM).

3. PDSCH 1420: a data channel transmitted to a DL, used by the base station in order to transmit traffic to the terminal, and transmitted using an RE in which a reference signal is not transmitted in a data region 1460.

4. CSI-RS 1440: a reference signal transmitted for terminals belonging to a single cell and is used for measuring a channel state. A plurality of CSI-RSs may be transmitted to one cell.

5. Other control channels (Physical Hybrid-ARQ Indicator Channel (PHICH), Physical Control Format Indicator Channel (PCFICH), PDCCH) 1430: a channel in which the terminal provides control information necessary for receiving a PDSCH or transmits ACK/NACK for operating HARQ for data transmission of a UL. Control channels are transmitted on control region 1450.

In the LTE-A system, in addition to the signal, muting may be set so that the CSI-RS transmitted by other base station may be received to the terminals of the cell without interference. The muting may be applied at a position in which the CSI-RS may be transmitted, and a terminal generally skips the wireless resource and receives a traffic signal. In the LTE-A system, muting may be referred to as a zero-power CSI-RS., since muting is applied to a position of a CSI-RS in view of a characteristic thereof and transmission power is not transmitted.

In FIG. 14, the CSI-RS may be transmitted using a portion of positions represented with A, B, C, D, E, F, G, H, I, and J according to the number of antennas that transmit the CSI-RS, and muting may be transmitted using a portion of positions represented with A, B, C, D, E, F, G, H, I, and J. Particularly, the CSI-RS may be transmitted to two, four, and eight REs according to the number of transmitting antennas ports. When the number of antenna ports is 2, as shown in FIG. 14, the CSI-RS is transmitted to a half of a specific pattern, when the number of antenna ports is 4, the CSI-RS is transmitted to the entirety of a specified pattern, and when the number of antenna ports is 8, the CSI-RS is transmitted using two patterns. However, muting is always formed in a single pattern unit. That is, muting may be applied to a plurality of patterns, but when a position of the muting is not overlapped with that of the CSI-RS, muting cannot be applied only to a portion of a single pattern. However, when a position of the CSI-RS is overlapped with the muting position, muting may be applied only to a portion of a single pattern.

When the CSI-RS for two antenna ports is transmitted, the CSI-RS transmits a signal of each antenna port in two REs connected to a time axis, and a signal of each antenna port is distinguished by orthogonal codes. When the CSI-RS for four antenna ports is transmitted, a signal of two antenna ports is transmitted with the same method by further using two REs in the CSI-RS for two antenna ports. When the CSI-RS for eight antenna ports is transmitted, a signal is transmitted. In the CSI-RS that support 12 and 16 antenna ports, three CSI-RS transmission positions of existing four antenna ports or two CSI-RS transmission positions for eight antenna ports are combined.

The terminal may receive allocation of a CSI-IM (or interference measurement resources (IMR)) together with a CSI-RS, and a resource of the CSI-IM has the same resource structure and position as that of the CSI-RS that supports 4 ports. The CSI-IM enables a terminal that receives data from at least one base station to accurately measure interference from adjacent base stations. For example, when a neighboring base station wants to measure an amount of interference when transmitting data and an amount of interference when not transmitting data, the base station constitutes the CSI-RS and two CSI-IM resources, and one CSI-IM enables the neighboring base station to always transmit a signal and the other CSI-IM enables the neighboring base station to infrequently transmit a signal and thus an interference amount of the neighboring base station can be effectively measured.

Table 4 illustrates an RRC field constituting a CSI-RS configuration.

TABLE 4

| CSI-RS config | CSI-IM config | CQI report config | Etc |
| --- | --- | --- | --- |
| No. antenna ports | Resource config | Periodic | $P_C$ |
| Resource config | Time and frequency | Mode, resource, | Codebook subset |
| Time and frequency | position in a subframe | periodicity, offset . . . | restriction |
| position in a subframe | Subframe config | Aperiodic | |
| Subframe config | Periodicity and subframe | Mode . . . | |
| Periodicity and subframe | offset | PMI/RI report | |
| offset | | RI reference CSI | |
| Qcl-CRS-info (QCL | | process | |
| Type B) | | SubframePattern | |
| CRS information for CoMP | | | |

Setting for performing a channel state report based on a periodic CSI-RS within a CSI process may be classified into four, as shown in Table 4. A CSI-RS config sets a frequency and time position of a CSI-RS RE. The number of ports of the corresponding CSI-RS is set through setting of the number of the antennas. A resource config sets an RE position within the RB, and a subframe config sets a period and offset of the subframe. Tables 5 and 6, provided below, describe Resource config and Subframe config setting currently supporting in LTE.

TABLE 5

| | | Number of CSI reference signals configured | | | | | |
| --- | --- | --- | --- | --- | --- | --- | --- |
| | CSI reference | 1 or 2 | | 4 | | 8 | |
| | signal configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |

TABLE 5-continued

| CSI reference signal configuration | Number of CSI reference signals configured | | | | | |
|---|---|---|---|---|---|---|
| | 1 or 2 | | 4 | | 8 | |
| | (k', l') | $n_s \bmod 2$ | (k', l') | $n_s \bmod 2$ | (k', l') | $n_s \bmod 2$ |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

TABLE 7

| Number of aggregated CSI-RS ports | Number of aggregated CSI-RS ports per polarization | Available 2D antenna array geometry, (N₁, N₂) (1D configurations were omitted) | | | | Impact on 2D RS and feedback design |
|---|---|---|---|---|---|---|
| 18 | 9 | (3, 3) | — | — | — | Low |
| 20 | 10 | (2, 5) | (5, 2) | — | — | Med |
| 22 | 11 | — | — | — | — | — |
| 24 | 12 | (2, 6) | (3, 4) | (4, 3) | (6, 2) | High |
| 26 | 13 | — | — | — | — | — |
| 28 | 14 | (2, 7) | (7, 2) | — | — | Med |
| 30 | 15 | (3, 5) | (5, 3) | — | — | Med |
| 32 | 16 | (2, 8) | (4, 4) | (8, 2) | — | High |

The terminal may determine a frequency, time position, period, and offset through Tables 5 and 6. Quasi co-location (QCL)-CRS-info is to set quasi co-location information for CoMP. A CSI-IM config is to set a frequency and a time position of a CSI-IM for measuring interference. Because the CSI-IM is always set based on four ports, setting of the number of antenna ports is not required, and the resource config and the subframe config are set in the same manner as the CSI-RS.

The channel quality indicator (CQI) report config exists to set the manner in which to perform a channel state report using the CSI process. The settings include periodical channel state report, aperiodic channel state report, PMI/RI report, RI reference CSI process, and subframe pattern settings. A Pc indicates a power ratio between a PDSCH necessary when the terminal generates a channel state report and a CSI-RS RE and codebook subset restriction that sets to use in which codebook.

As described above, an FD-MIMO base station should configure a reference signal resource for measuring a channel of eight or more antennas and transmit the reference signal to the terminal, in which case the number of reference signals may be different according to a base station antenna configuration and a measurement type. For example, in LTE-A release 13, {1, 2, 4, 8, 12, 16}-port CSI-RS may be set by assuming full port mapping which indicates that all transmission and reception units (TXRUs) have a dedicated CSI-RS port for channel estimation.

As described above, after LTE-A release 14, there is a high possibility that 16 or more TXRUs may be introduced. A shape of a supportable antenna array will largely increase, compared with release 13, which indicates that the various number of TXRUs should be able to be supported in LTE-A release 14. Table 7 below is an available two-dimensional antenna array structure list according to the number of CSI-RS ports in a full port mapping situation.

In Table 7, {18, 20, 22, 24, 26, 28, 30, 32}-port CSI-RS was considered, and in a polarized antenna structure, when considering that two different polarized antennas may exist at the same position, different AP positions of the {9, 10, 11, 12, 13, 14, 15, 16} number may be considered. The number $N_1$ of different AP positions in a first dimension (horizontal or vertical direction) and the number $N_2$ of different AP positions in a second dimension (horizontal or vertical direction) may represent a shape of a two-dimensional rectangular or square antenna array, and a possible combination in the respective ports is the same as $(N_1, N_2)$ of Table 7, which indicates that various antenna array shapes may exist according to the number of CSI-RS ports.

In a cellular system, in order to measure a DL channel state, the base station should transmit a reference signal to the terminal. In a 3GPP LTE-A system, the terminal measures a channel state between the base station and itself using a CSI-RS or a CRS transmitted by the base station. Several factors should be considered in terms of channel state, and the channel state includes an amount of interference in a DL, including interfering signals and thermal noise generated by antennas belonging to a neighboring base station. Thus, it is important that the terminal determines a channel state of the DL.

For example, when a base station having one transmission antenna transmits a signal to a terminal having one receiving antenna, the terminal should determine energy per symbol that may be received in the DL using a reference signal received from the base station and an amount of interference to be simultaneously received at a segment of receiving the symbol, and determine an energy ratio per symbol to an amount of interference (Es/Io). The determined Es/Io is converted to a data transmission speed or a value equivalent to the data transmission speed and is notified to the base station in a CQI. Thus, the Es/Io enables the base station to determine a data transfer rate to perform data transmission to the terminal in a DL.

In an LTE-A system, the terminal feeds back information about a channel state of the DL to the base station and enables to use the information for DL scheduling of the base station. That is, the terminal measures a reference signal transmitted by the base station to the DL and feeds back information extracted from the reference signal to the base station in a form defined in LTE and LTE-A in following three cases.

Rank indicator (RI): the number of spatial layers in which the terminal may receive in a current channel state.

Precoder matrix indicator (PMI): an indicator of a precoding matrix in which the terminal prefers in a current channel state.

CQI: a maximum data rate in which the terminal may receive in a current channel state. The CQI may be replaced with an SINR that may be used similarly to the maximum data rate, a maximum error correction code rate, a modulation method, and data efficiency per frequency.

The RI, PMI, and CQI have related meanings. For example, a precoding matrix supported by LTE and LTE-A is defined differently on a rank basis. Therefore, even if a PMI value when the RI has a value of 1 is the same as a PMI value when the RI has a value of 2, the PMI value is differently analyzed. Even when the terminal determines the CQI, it is assumed that a rank value and a PMI value in which the terminal notifies the base station are applied to the base station. That is, when the terminal notifies the base station of RI_X, PMI_Y, and CQI_Z, it indicates that when a rank is RI_X and precoding is PMI_Y, the terminal may receive a data rate corresponding to CQI_Z. Therefore, when the terminal calculates the CQI, a transmission method to use in the base station is assumed, and optimal performance is obtained when actual transmission is performed with the transmission method.

Figure 15:
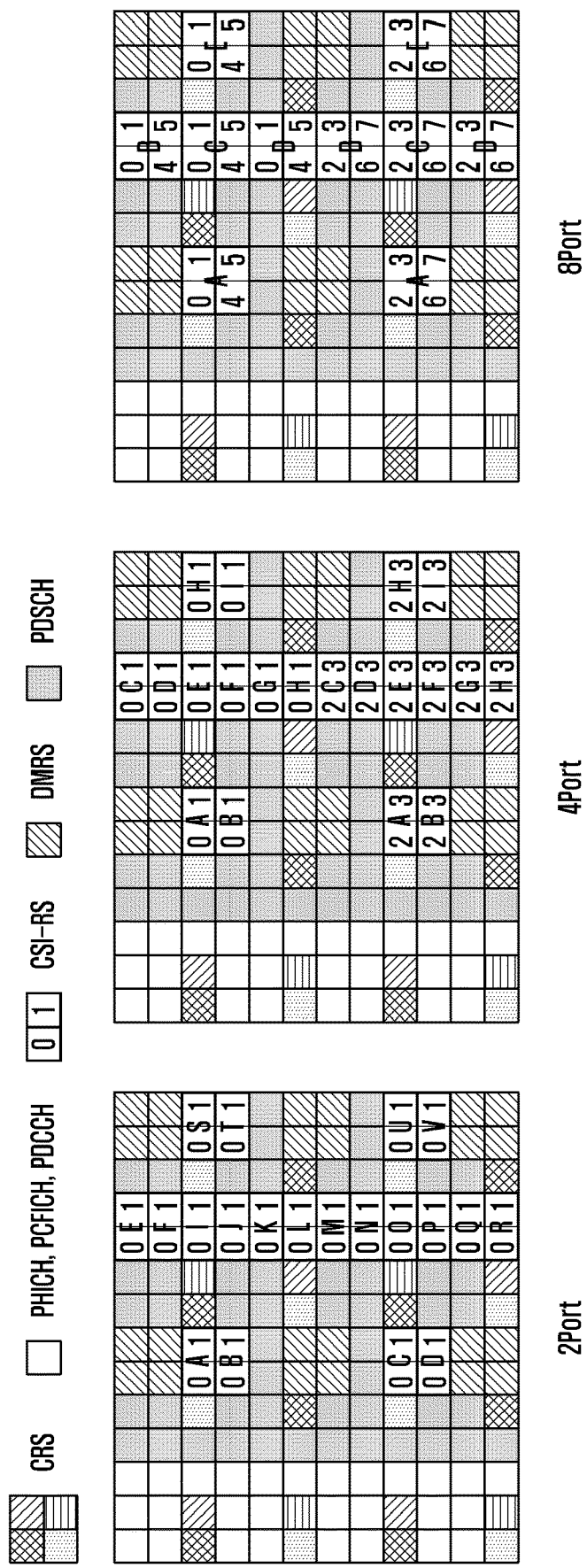
FIG. 15 illustrates 2, 4, and 8 antenna port CSI transmission in an LTE-A system, according to an embodiment.

FIG. 15 illustrates 2, 4, and 8 antenna port CSI transmission in an LTE-A system, according to an embodiment.

In order to generate and report the channel information, a base station having a large scale antenna should configure a reference signal resource for measuring channels of eight or more antennas and transmit the reference signal resource to the terminal. As shown in FIG. 15, an available CSI-RS resource may use maximum 48 REs, and maximum eight CSI-RSs may be set per current CSI process.

Therefore, a new CSI-RS setting method is required to support an FD-MIMO system that may operate based on eight or more CSI-RS ports. For example, in LTE-A release 13, one, two, four, eight, twelve or sixteen CSI-RS ports may be set to one CSI process. Specifically, {1, 2, 4, 8}-port CSI-RS follow a conventional mapping rule, a 12-port CSI-RS is configured with aggregation of three 4-port CSI-RS patterns, and a 16-port CSI-RS is configured with aggregation of two 8-port CSI-RS patterns.

For 12 and 16-port CSI-RS, LTE-A release 13 supports CDM-2 or CDM-4 using an orthogonal cover code (OCC) of a length 2 or 4. For full power utilization of CDM-2 based 12 and 16-port CSI-RS, power boosting of maximum 9 dB is required, compared with a PDSCH, which indicates that high performance hardware is required, compared with a conventional case for full power utilization when operating the CDM-2 based 12 and 16-port CSI-RSs. In release 13, CDM-4 based 12 and 16-port CSI-RSs were introduced in consideration of this, and full power utilization is conventionally available through 6 decibel (dB) power boosting. In release 14, a CSI-RS based on CDM-8 was introduced for the CSI-RS to 32-port.

Figure 16:
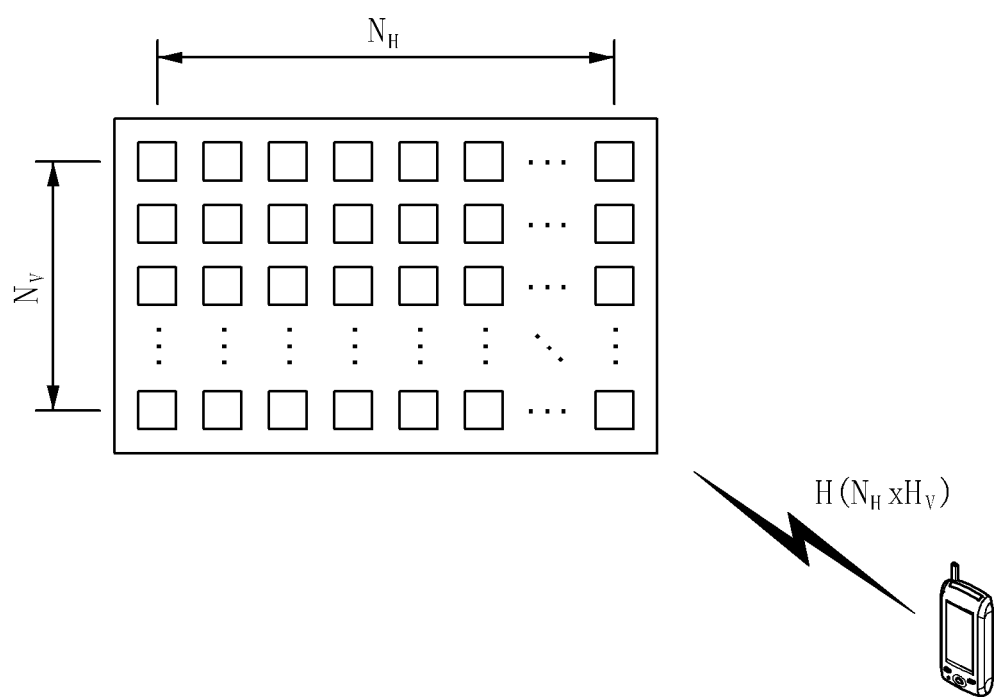
FIG. 16 illustrates a communication system to which the present disclosure is applied.

FIG. 16 illustrates a communication system to which the present disclosure is applied.

As described above, a reference signal is used for assisting demodulation and decoding of a data symbol received by measuring a channel state between the base station and the user, such as intensity and distortion of a channel, intensity of interference, and Gaussian noise in a wireless mobile communication system. Another use of a reference signal enables the receiver to determine a status of a radio channel between the receiver and the transmitter by measuring receiving intensity in which a reference signal transmitted by the transmitter with ensured transmission is received via a radio channel with measurement of a radio channel state. A state of the radio channel determined in this manner is used for determining a data rate in which the receiver is to request to the transmitter.

However, in a general mobile communication system, because radio resources such as time, frequency and transmission power are limited, when many radio resources are allocated to a reference signal, there are fewer radio resources that can allocate to a data signal. Therefore, radio resources allocated to the reference signal should be appropriately determined in consideration of system throughput. In particular, when a MIMO that performs transmission and reception using a plurality of antennas is applied, it is vital to allocate and measure a reference signal.

NR MIMO supports the number of many antennas such as 1024 and supports a high frequency band such as 30 GHz. Wireless communication using such a millimeter wave represents high linearity and a high path loss in a characteristic of a corresponding band. To overcome this, hybrid beamforming is required in which analog beamforming based on an RF and an antenna and digital precoding based digital beamforming are combined. Upon beam switching of the terminal, the CSI-RS transmitted for a channel state report can or cannot be measured according to a beam switching capability of the terminal. The NR supports a wide system bandwidth, compared with LTE, and a band supported by one terminal may be a band different from such a system band, and even in a band supported by the terminal, transmission of the RS may be changed to a full-band or a subband. When the terminal has an insufficient RF switching capability in such a band switching situation, the CSI-RS transmitted for a channel state report cannot be also measured. Therefore, in the present disclosure, a method is described in which the terminal efficiently transfers a measurement unavailable status to the base station in such a measurement unavailable situation.

Figure 17:
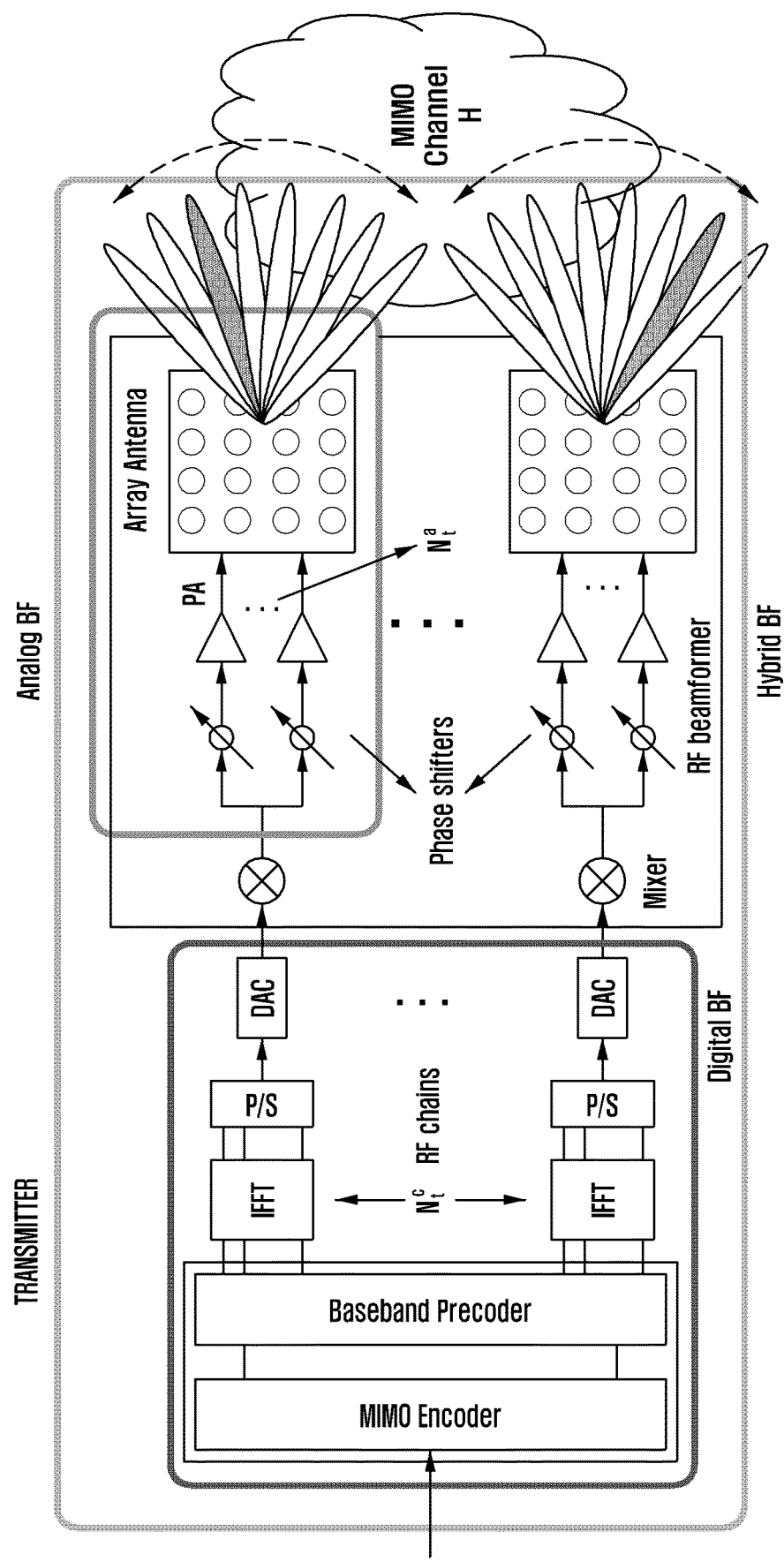
FIG. 17 illustrates a hybrid beamforming system, according to an embodiment.

FIG. 17 illustrates a hybrid beamforming system, according to an embodiment.

In FIG. 17, the base station and the terminal include an RF chain and a phase shifter for digital beamforming and analog beamforming. An analog beamforming method at the transmitting side focuses a signal in a specific direction by changing a phase of a signal transmitted by each antenna through a phase shifter using a plurality of antennas. For this reason, an array antenna having a plurality of combined antenna elements is used. When such transmission beamforming is used, a wave arrival distance of the signal may be increased and the signal is minimally transmitted in other directions other than the intended direction, thereby reducing interference to another user.

Similarly, the reception side can perform reception beamforming using a receiving array antenna, which also blocks an interference signal by increasing sensitivity of a receiving signal from the corresponding direction and eliminating a signal from a direction other than a particular direction from the receiving signal by focusing reception of radio waves in a particular direction.

As a transmission frequency increases, a wavelength of radio waves is decreased. For example, when an antenna is configured with a half wavelength interval, an array antenna may be configured with more antenna elements within the same area. Therefore, because a communication system operating in a high frequency band can obtain a relatively higher antenna gain, compared with using beamforming technique in a low frequency band, it is advantageous to apply a beamforming technique.

In such a beamforming technology, in order to obtain a higher antenna gain, hybrid beamforming is used and is a combination of digital precoding used for achieving a high data rate effect in a conventional multiple antenna system and analog beamforming techniques. When a beam is formed through analog beamforming and when at least one analog beam is formed, by applying and transmitting digital precoding similar to that applied in a conventional multi-antenna in a baseband, a signal having higher reliability can be received or a higher system capacity can be expected. In the present disclosure, when the base station and the terminal support analog, digital, or hybrid beamforming, there is described a method in which the base station and the terminal measure a quality of a beam according to a beam switching ability of the base station, and the terminal reports quality information of beams and uses the quality information of beams.

When applying beamforming, it is of utmost importance to select a beam direction optimized to the base station and the terminal. To do so, the base station and the terminal may support beam sweeping using a plurality of time and frequency resources.

Figure 18:
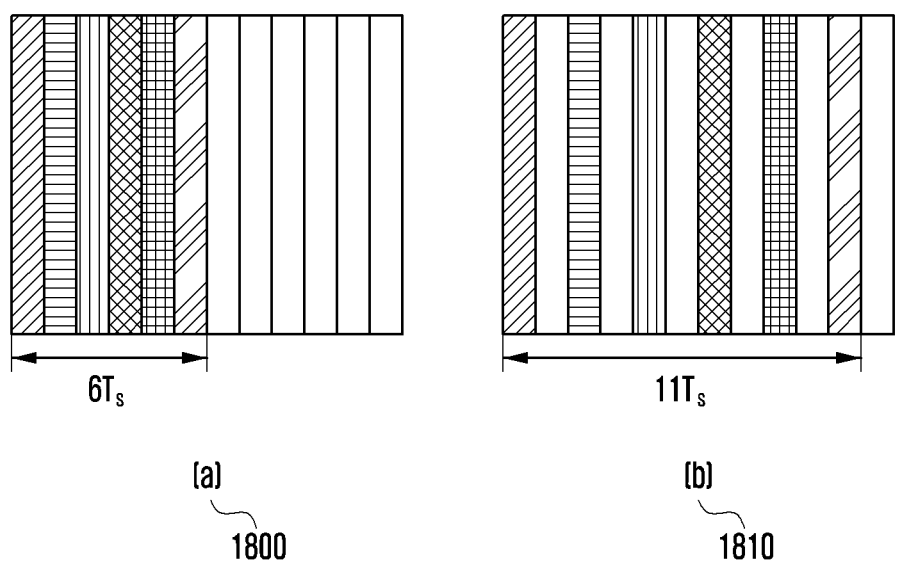
FIG. 18 illustrates a beam sweeping operation of a terminal and a base station in a time resource, according to an embodiment.

FIG. 18 illustrates the beam sweeping operation of the terminal and a base station in a time resource, according to an embodiment.

In FIG. 18, for beam selection of the terminal or the base station, the terminal or the base station transmits a reference signal using other beams in a time resource. In this case, the base station or the terminal, having received such a reference signal may measure a quality of the reference signal based on CSI, reference signals received power (RSRP), and reference signals received quality (RSRQ) of the reference signal and select one or a plurality of transmission or reception beams according to a corresponding result. In FIG. 18, transmitting a reference signal based on other beams through other time resources is described, but this may be equally applied to frequency and code resources.

In resource allocation for such beam sweeping, a time consumed in beam sweeping should be also considered. In (a) 1800 of FIG. 18, six contiguous symbols were allocated to sweep the six beams, whereby a time of 6 Ts is consumed (when one symbol length is assumed to a Ts). However, in (b) 1810 of FIG. 18, a time of 11 Ts is consumed to sweep the same beam, and thus a time required for beam selection is extended, causing decreased efficiency.

When performing beam sweeping for such analog, digital, and hybrid beamforming, all of a characteristic of the beamforming and a beam switching capability of the terminal and the base station should be considered. In analog beam, a characteristic of a hardware-based phase shifter should be considered. Because an analog beam uses a hardware-based phase shifter, other analog beams cannot be transmitted at one frequency band. Therefore, other time resources should be considered for beam sweeping. In order to support other beam measurement at other time resources, a structure of an OFDM symbol should also be considered.

Figure 19:
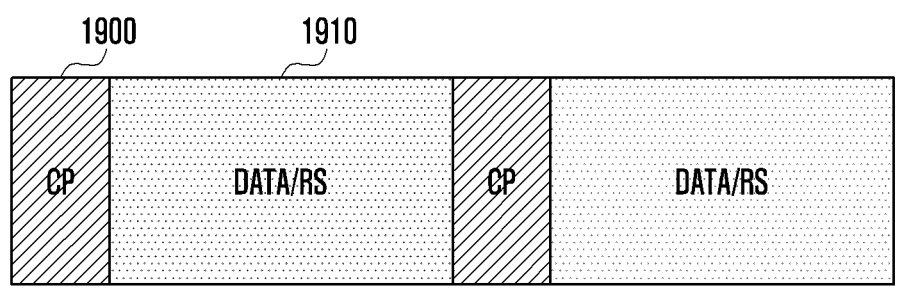
FIG. 19 illustrates a structure of an OFDM symbol, according to an embodiment.

FIG. 19 illustrates a structure of an OFDM symbol RSRP and RSRQ, according to an embodiment.

In FIG. 19, the OFDM symbol is divided into a cyclic prefix (CP) portion 1900 for preventing interference between OFDM symbols and a data/RS portion 1910 in which data and a reference signal are transmitted. An actual reference signal should be transmitted in the data/RS segment and thus a phase shift operation of a phase shifter of the base station or the terminal should be performed within a CP length of the OFDM symbol. However, such a phase shift operation may be different in each terminal according to a structure of the phase shifter implemented in the terminal, and thus, a beam sweeping operation support in continued symbols on a symbol basis may be different on a terminal basis. In addition to the phase shift switching capability of such a terminal, an OFDM symbol structure according to numerology in which the base station and the terminal support should also be considered. Table 8 below illustrates a CP length according to subcarrier spacing.

TABLE 8

| Subcarrier spacing (kHz) | CP length (us) |
|---|---|
| 15 | 4.7 |
| 30 | 2.35 |
| 60 | 1.17 |
| 120 | 0.585 |
| 240 | 0.293 |
| 480 | 0.146 |

As shown in Table 8, a CP length reduces in inverse proportion to increased subcarrier spacing. Therefore, a time reduces in which the terminal and the base station can switch a beam through phase shift of an RF circuit. For example, when beam switching of the terminal is available within 400 nanoseconds (ns), in Table 8, if subcarrier spacing is 15, 30, 60, and 120 kHz, beam switching is available through continued symbols, but in subcarrier spacing of 240 and 480 kHz, a beam cannot be switched using continued symbols.

Therefore, by selecting and allocating or measuring other beams according to a beam switching capability of the terminal and the base station, the present disclosure enables the terminal and the base station to perform beam sweeping according to a beam switching capability of the terminal and base station. In the present disclosure, the resource is described based on a time resource (OFDM symbol), but may include a frequency and a code division resource. In the foregoing description, only a beam switching capability according to a time required by a phase shift of the terminal is included, but various beam switching capability with such as a beam switching capability for digital precoding and hybrid beamforming and considering a plurality of panels may be together considered. In the foregoing description, a beam switching capability in continued resources is illustrated, but the resource is not necessarily always continuous, and may be included all cases in which the terminal cannot process the difference between the corresponding time periods, frequencies, or code division resources with a switching capability.

When a transmitter for transmitting a reference signal for beam sweeping does not have information about a beam switching capability of a receiver or when there exists a terminal that supports beam switching in an allocated resource and a terminal that does not support beam switching in an allocated resource, the receiver measures a reference signal in a measureable range, and a beam that did not measure in a transmitting time or a resource may be measured later.

Figure 20:
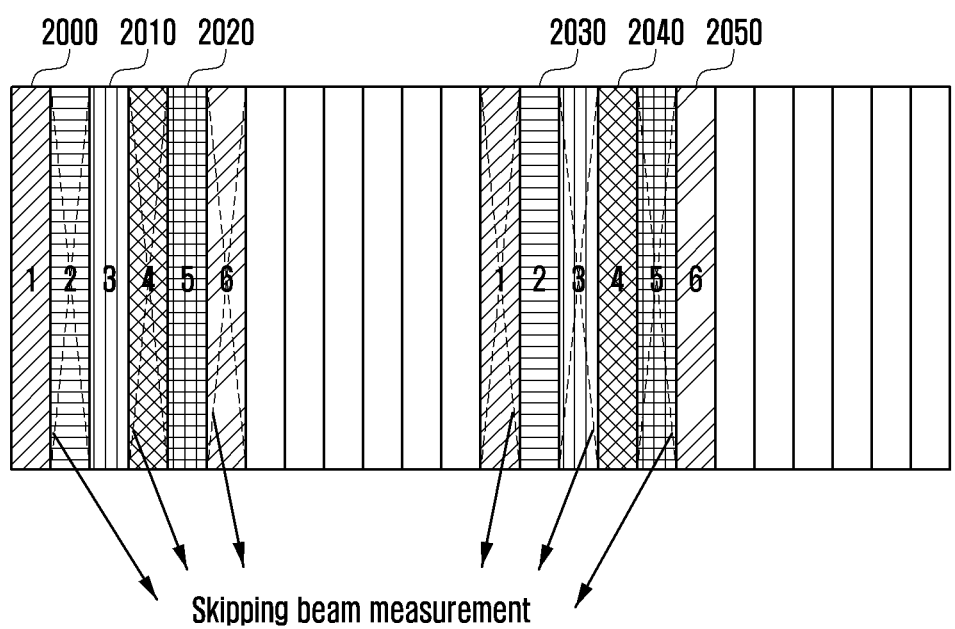
FIG. 20 illustrates an operation of a terminal and a base station according to an embodiment.

FIG. 20 illustrates an operation of a terminal and a base station according to an embodiment.

It is assumed that the receiver has received allocation of a reference signal for beam sweeping, as in 1800 of FIG. 18. In this case, a beam switching capability of the terminal may not support beam switching in an allocated resource. When all terminals share the condition, the base station may allocate a reference signal for beam sweeping to the terminal, as in 1810 of FIG. 18, but when a particular terminal can perform beam sweeping under a reference signal of 1800 of FIG. 18, reference signal allocation based on continued resources, such as 1800 of FIG. 18 usefully enables efficient use of resources such as a time required for beam sweeping. However, in a specific terminal, because measurement is not possible in the allocated resource, such as 1800 of FIG. 18, a method for measuring all beams based on the reference signal allocation is required.

In FIG. 20, it is assumed that for beam switching of the terminal, one OFDM symbol is available in a guard segment. In FIG. 20, because the terminal cannot measure all of given OFDM symbols 1, 2, 3, 4, 5 and 6, the terminal should select and measure an allocated reference signal. Therefore, in a first measurement period, the terminal measures a reference signal of 1, 3, and 5 symbols 2000, 2010, and 2020 among allocated reference signals, and measures and determines a beam quality.

When the reference signal is periodically transmitted in a time resource, the terminal may exclude the already measured symbols 1, 3, and 5 at a second measurement time, measure a reference signal of 2, 4, and 6 symbols 2030, 2040, and 2050 that are not measured, and measure and determine a beam quality. Therefore, by dividing and implementing such beam sweeping over several times, beam sweeping corresponding to a beam switching capability of the terminal and the base station can be performed. Although it is described that one OFDM symbol is required for beam switching, an amount of resources required for the beam switching may be changed and frequency and code resources may also be considered.

However, the operation is available only when the base station periodically or semi-persistently allocates a reference signal such that the terminal measures the reference signal at next reception, even if the terminal does not receive the reference signal, and the terminal cannot perform a subsequent reception operation even if a reference signal is periodically or semi-persistently allocated, when measurement restriction is set or assumed in which reference signal transmission of a specific time point and reference signal transmission of a previous point are not equally assumed.

Figure 21:
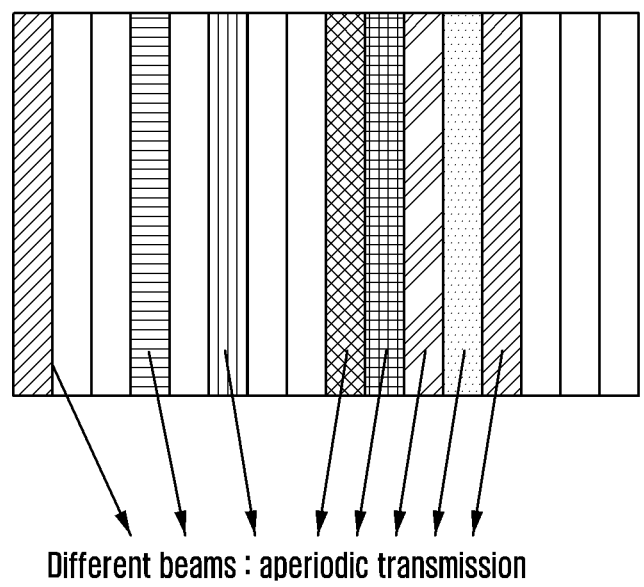
FIG. 21 illustrates an example of when a reference signal having the same characteristic is not transmitted, according to an embodiment.

FIG. 21 illustrates an example of when a reference signal having the same characteristic is not transmitted, according to an embodiment.

As shown in FIG. 21, when a single beam is not received, it may be not possible to receive the beam again, and thus it is necessary to notify the base station that the beam was not properly received. Moreover, because a low quality of the beam and no reception of the beam are different, when a quality of the beam is low, the corresponding beam should not be used for actual data transmission, but when the corresponding beam is not received, the beam may be an optimal beam and thus a signal is required in which the terminal notifies the base station that reception and channel state information could not be generated in transmission of the reference signal. An operation of notifying the base station that it is not possible to generate channel state information is available through the following methods.

Method 1 indicates that reception of a reference signal and generation of channel information is not possible: the terminal transmits through a direct UL control information (UCI) signal that reception of a reference signal and generation of channel information is not possible.

Method 2 indicates that reception of a reference signal and generation of channel information is not possible: the terminal transmits a particular bit promised in a channel state report that reception of a reference signal and generation of channel information is not possible.

Method 3 indicates that reception of a reference signal and generation of channel information is not possible: the terminal transmits by not transmitting channel state report information that is not measured that reception of a reference signal and generation of channel information is not possible.

Method 1 indicates that reception of a reference signal and generation of channel information is not possible transmits through a direct UCI signal that reception of a reference signal and generation of channel information is not possible. For example, by separately placing a 1 bit signal in a UL control signal (in the LTE system, PUCCH format 2, 2a, 3, etc.) in which channel state information is transmitted to the base station, the terminal may notify the base station that the reference signal is not correctly received or that channel state information is not accurately generated.

A plurality of bits may be used for a plurality of channel state information processes (e.g., CSI process of the LTE system) and a plurality of cells (e.g., carrier aggregation (CA) in the LTE system), and may be aligned in order of a channel state information report ID, measurement setting ID, and cell ID of the standard. For example, most significant bit (MSB) notifies whether measurement having an ID of the low number is received and least significant bit (LSB) notifies whether measurement having an ID of the high number is received.

In another example, the terminal may determine a CSI-RS resource having an optimum channel state through RSRP, RSRQ, CQI, etc., and the base station may transmit such a CSI-RS resource in a form of a CSI-RS resource indicator (CRI). In this case, in order to report the CRI, a plurality of resources should be set, and particular resources may not be measured or channel state information may not be appropriately generated. Accordingly, the terminal may notify the base station of resources that are not appropriately measured among CSI-RS resources set for the CRI on a CRI basis.

In this case, resources that are not measured among preset CSI-RS resources may be processed as follows.

Measurement unavailable CSI-RS resource processing method 1 for CRI report: The terminal selects a CRI based on most recently generated channel state report, RSRP, or RSRQ for the measurement unavailable CSI-RS resource when selecting the CRI.

Measurement unavailable CSI-RS resource processing method 2 for CRI report: The terminal does not include a CSI-RS resource that is not measured or in which channel state information is not generated when selecting the CRI and selects a CRI based on a CSI-RS resource in which channel state information is generated.

In the measurement unavailable CSI-RS resource processing method 1 for CRI report, the terminal selects a CRI based on the most recently generated channel condition report, RSRP, or RSRQ for the CSI-RS resource upon selecting a CRI report. Even if the CSI-RS resource is not measured, a CSI can be approximately selected with reference to the most recent measurement results of the resource, and thus a CRI can be more accurately selected. Such a method is more advantageous when precoding having the same or similar characteristics is applied to the resource even in aperiodic CSI-RS transmission.

The measurement unavailable CSI-RS resource processing method 2 for CRI report does not include a CSI-RS resource in which the terminal is not measured or in which channel state information is not generated when selecting a CRI and of selecting a CRI based on a CSI-RS resource in which channel state information is generated. When the CSI-RS resource is not measured, precoding applied to the CSI-RS resource may have completely different characteristics from precoding in previous transmission, and an error may occur in CRI selection when previous information of the resource is included. To prevent such an error, a CSI-RS resource that is not measured or in which channel state information is not generated may be excluded when selecting a CRI.

Upon reporting channel state information, when the terminal selects some ports of the CSI-RS resource and reports the channel state information to the base station, the terminal may represent a CSI-RS port that fails in measurement or in channel state information generation in addition to the channel state information.

The base station may enable the terminal to report an indicator notifying a CSI-RS measurement unavailable resource processing method through RRC or MAC CE setting. For example, in a low band such as 2 GHz and 4 GHz, such a problem may occur more infrequently and thus effectiveness of the report may be low. Therefore, by enabling turn on and off of such report setting, the terminal may perform the report according to needs of the base station. It is possible to set the report to be performed or not performed according to a frequency band used by the base station. For example, when an access frequency of the terminal is 6 GHz or less, the terminal does not report the indicator, and when an access frequency of the terminal exceeds 6 GHz, the terminal reports the indicator. Even if a synchronizing signal of the system supports a plurality of sync signal transmissions or beam transmissions, it is also possible to set to indirectly report the indicator.

An indicator used for the measurement unavailable CSI-RS resource processing method 1 for CRI report may be expressed with various names, such as a measurement failure indicator, RF failure indicator, beam measurement failure indicator, valid CSI indicator, valid CSI-RS resource indicator, and valid CSI-RS port indicator.

The measurement unavailable CSI-RS resource processing method 2 for CRI report indicates that reference signal and channel information generation is unavailable by transmitting a specific bit promised in the channel state report. The terminal transfers information such as a CRI, rank indicator (RI), and CQI to the base station through channel state information. By fixing or transmitting a part or the entirety of the channel state information with specific bits, the terminal may notify the base station that reference signal measurement and channel state report generation such as cell measurement setting, channel state report setting, and reference signal setting is not accurately performed.

For example, in CRI or RI information, the bit is minimal and vast resources are consumed for information transmission, but in PMI or CQI, in order to transmit the information, minimal resources are consumed and many bits are used, such that a report may be performed using one of those values. For example, when the PMI is 0, when the CQI is 0, or when both the PMI and CQI are 0, a failed measurement of the reference signal or generation of a channel state report is indicated. The measurement failure and generation failure of the channel state report may be indicated without use of additional uplink control information (UCI) overhead.

The measurement unavailable CSI-RS resource processing method 3 does not perform a channel state report for a reference signal resource, cell, CSI process, measurement setting, and channel state report setting failed in channel state measurement or report generation. An operation in which the terminal measures a reference signal first transmitted when measuring a beam and measures a reference signal transmitted later is a natural operation, and thus the base station may assume that the terminal has measured a channel state according to the number of channel state reports reported by the terminal, measurement order of previously set or transmitted reference signals, or reference signal measurement priority order. Therefore, a reference signal that is not measured by the terminal or that does not generate channel state information may be determined indirectly through the number of reports.

A reference signal measurement priority may be set for the operation. For example, when a reference signal requiring different beams at the same time is set, a single reference signal having a high priority may be measured. The following are methods of setting such a priority.

Reference signal measurement priority setting Method 1: determine through a priority previously set to a standard;

Reference signal measurement priority setting Method 2: determine through a priority in which the base station transmits through setting; and Reference signal measurement priority setting Method 3: determine a priority through a transmitted time.

In reference signal measurement priority setting Method 1, the terminal determines through a priority previously set to a standard. For example, the terminal may indirectly determine a measuring priority of the reference signal through a cell ID, CSI-RS ID, or a CSI-RS type (Type I, Type II, non-precoded, beamformed) set to the terminal in the standard to generate measurement and channel state information and use the measurement and channel state information for a channel state report.

In reference signal measurement priority setting Method 2, the terminal determines a priority through a priority in which the base station transmits through a RRC configuration. Indirect priority setting may reduce a signaling overhead, but restricts the degree of freedom of setting. Therefore, it is possible to set such a priority through the RRC or MAC CE.

In reference signal measurement prioritization Method 3, for the terminal determines a priority through a transmitted time. As described above, the terminal measure a reference signal first transmitted, and a reference signal transmitted later may not be measured or channel state information may not be generated. Therefore, it may be determined that a reference signal transmitted within a slot k (or subframe or mini-slot) from a time n in which the reference signal is transmitted has a low measuring priority. In this case, the terminal may transmit such k as UE capability information to the base station, which may assume UE capability to actual k or may enable the terminal to set an integer having a value greater than k.

It is assumed that the transmitter and the receiver are a base station and a terminal, respectively, but in a UL, the transmitter and the receiver may be a terminal and a base station. In consideration of a side link, both the transmitter and the receiver may be a terminal.

Figure 22:
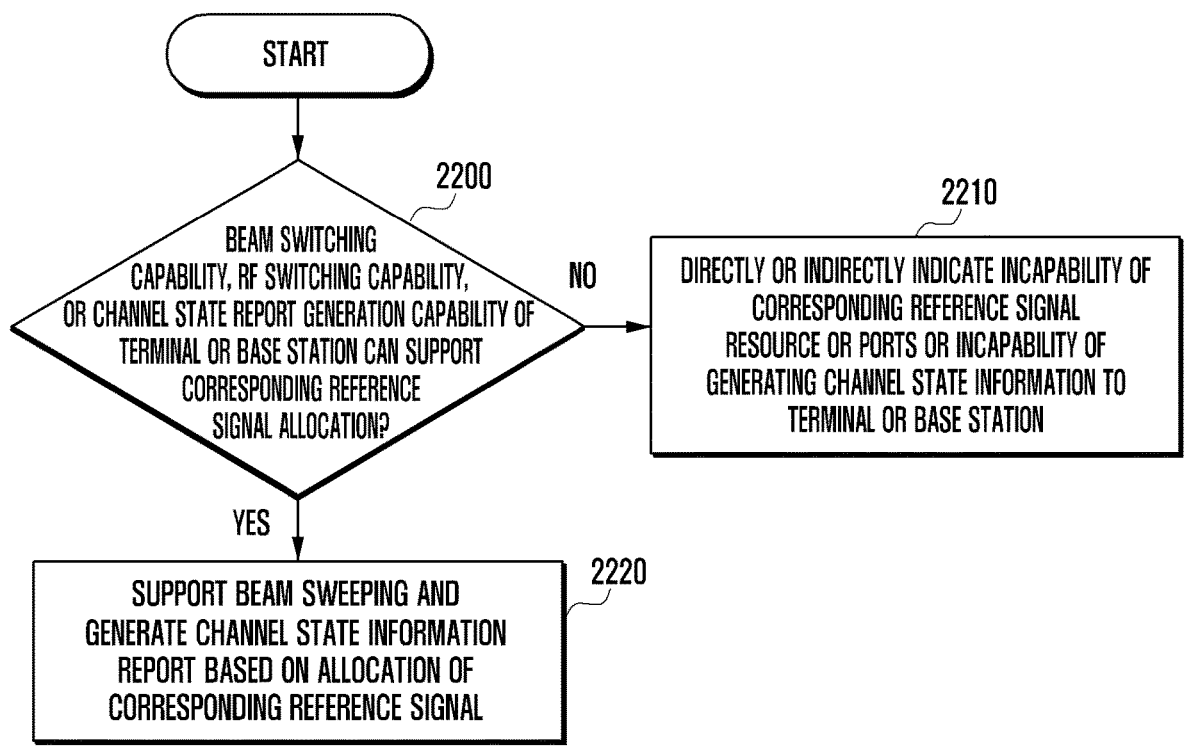
FIG. 22 illustrates a method of a terminal and a base station according to an embodiment.

FIG. 22 illustrates a method of a terminal and a base station according to an embodiment.

In FIG. 22, the terminal or the base station determines whether a beam switching capability of the terminal or the base station can support corresponding reference signal allocation in an entire reference signal pool used for beam sweeping at step 2200. In this case, for such determination, an OFDM symbol structure and a CP length, subcarrier spacing, a beam switching time in which the terminal or the base station can support through a phase shifter, and a precoding supportable unit may be considered. At step 2220, when the terminal or the base station can support a corresponding reference signal, the terminal or the base station performs beam sweeping using the entire reference signal pool, and when the terminal or the base station cannot support a corresponding reference signal, the terminal or the base station measures only a signal that can be measured among the entire reference signal pool or allocates only a signal that can be measured among the entire reference signal pool as a reference signal to support the corresponding beam sweeping operation at step 2210.

Figure 23:
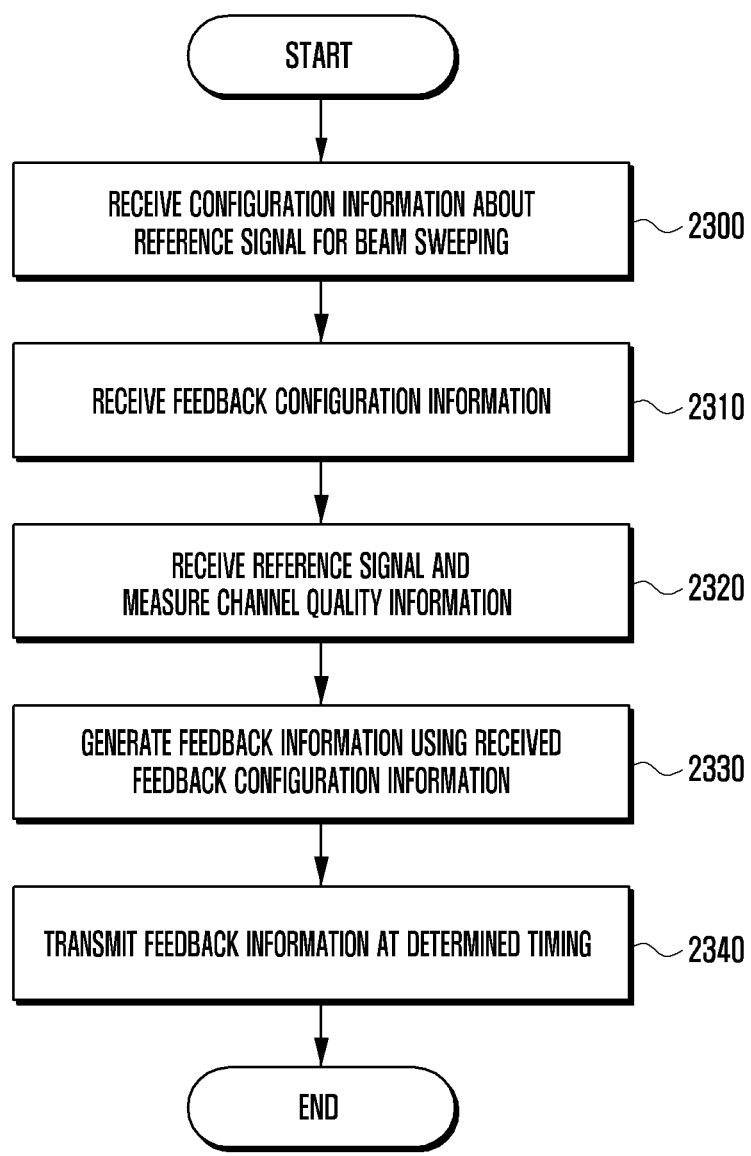
FIG. 23 illustrates a method of a terminal according to an embodiment.

FIG. 23 illustrates a method of a terminal according to an embodiment.

In FIG. 23, the terminal receives configuration information about a reference signal (CSI-RS, Mobility RS, Synchronization Signal, etc.) configuration for beam sweeping at step 2300. The terminal may determine at least one of the number of ports of each reference signal, N1 and N2, which are the number of antennas on a dimension basis, O1 and O2, which are an oversampling factor on a dimension basis, one subframe config for transmitting a plurality of reference signals, a plurality of resource configs for setting a position, codebook subset restriction related information, report related information, CSI-process index, and transmission power information based on the received configuration information. Thereafter, the terminal may configure one feedback configuration information based on at least one reference signal position at step 2310. PMI, and/or CQI period and offset, RI period and offset, whether wideband and/or subband, and submode may be set to the corresponding information.

When the terminal receives a reference signal based on the information at step 2320, the terminal estimates a channel between a base station antenna and a reception antenna of the terminal based on the reference signal, and generates feedback information (rank, PMI and CQI or RSRP, RSRQ, etc.) using the received feedback configuration based on the estimated channel or the signal reception quality at step 2330. The terminal transmits the feedback information to the base station at a determined feedback timing according to a feedback configuration of the base station to complete a feedback generation and reporting process at step 2340.

Figure 24:
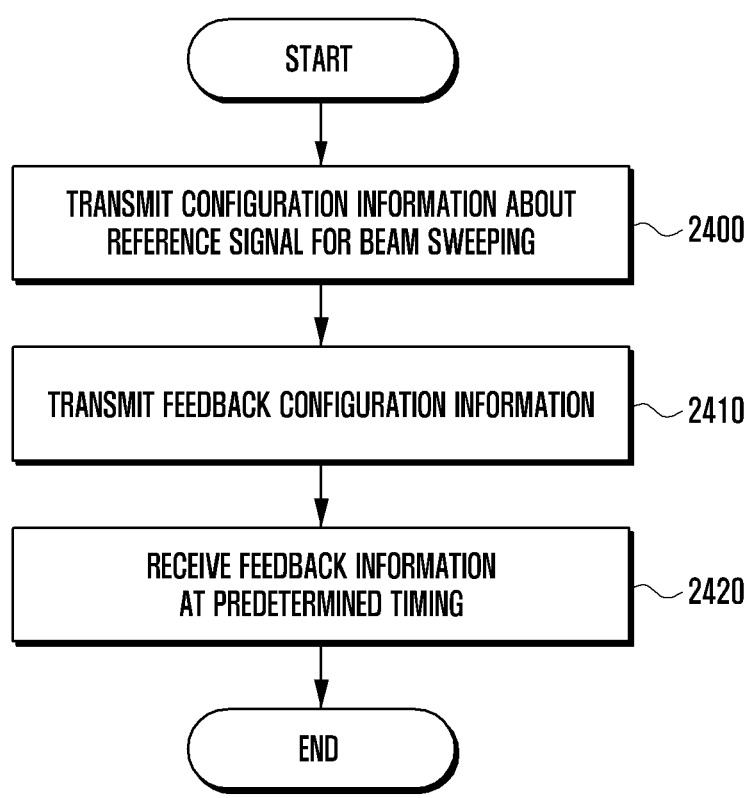
FIG. 24 illustrates a method of a base station according to an embodiment.

FIG. 24 illustrates an operation procedure of a base station according to an embodiment.

In FIG. 24, the base station transmits configuration information about a reference signal (CSI-RS, Mobility RS, Synchronization Signal, and so on) for beam sweeping to the terminal at step 2400. The setting information may include at least one of the number of ports of each reference signal, N1 and N2, which are the number of antennas on a dimension basis, a plurality of resource configs for setting one subframe config and position for transmitting O1, O2, and a reference signal, which are an oversampling factor on a dimension basis, codebook subset restriction related information, CSI report related information, a CSI-process index, and transmission power information. The base station transmits feedback configuration information based on at least one reference signal to the terminal at step 2410.

A PMI/CQI period and offset, RI period and offset, whether a wideband/subband is set, and a submode may be set to corresponding information, and the base station transmits a configured reference signal to the terminal, which estimates a channel on an antenna port basis, generates a PMI, RI, CQI, and RSRP corresponding thereto, and transmits the PMI, RI, CQI, and RSRP to the base station. Accordingly, the base station receives feedback information from the terminal at a determined timing at step 2420 and uses the feedback information to determine a channel state between the terminal and the base station.

Figure 25:
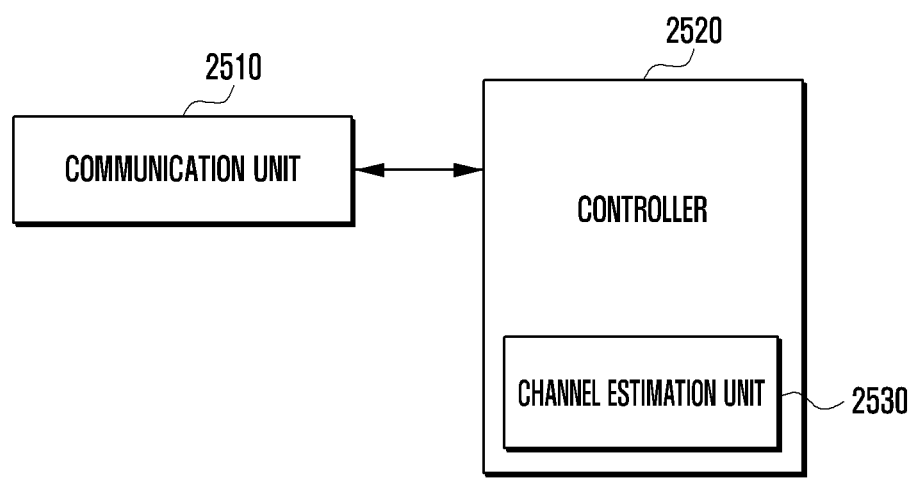
FIG. 25 illustrates an internal structure of a terminal according to an embodiment.

FIG. 25 illustrates the internal structure of a terminal according to an embodiment.

In FIG. 25, the terminal includes a communication unit 2510 and a controller 2520. The communication unit 2510 performs a function of transmitting or receiving data from the base station, and may transmit feedback information to the base station under the control of the controller 2520, which controls a state and operation of all components constituting the terminal. Specifically, the controller 2520 generates feedback information according to information allocated from the base station, and controls the communication unit 2510 to feed back the generated channel information to the base station according to timing information allocated from the base station. For this reason, the controller 2520 may include a channel estimation unit 2530.

The channel estimation unit 2530 determines required feedback information through the reference signal and the feedback allocation information received from the base station and estimates the channel using the reference signal received based on the feedback information. The channel estimation unit 2530 decodes the PDSCH by applying a precoding resource block group (PRG) size corresponding to the PDSCH transmission and mapping of a reference signal to which a precoder is applied to a rank and a DMRS port based on the DCI transmitted by the base station.

In FIG. 25, the terminal includes the communication unit 2510 and the controller 2520, but the present disclosure is not limited thereto and may further include various configurations according to a function performed by the terminal. For example, the terminal may further include a display unit that displays a current status thereof, an input unit that inputs a signal such as function execution by a user, and a storage unit that stores data generated in the terminal. Further in FIG. 25, the channel estimation unit 2530 is included in the controller 2520, but the present disclosure is not limited thereto. The controller 2520 may control the communication unit 2510 to receive setting information of each of at least one reference signal from the base station, and to measure at least one reference signal and to receive the feedback configuration information for generating feedback information according to the measurement result from the base station.

The controller 2520 may measure at least one reference signal received through the communication unit 2510, generate feedback information according to the feedback configuration information, control the communication unit 2510 to transmit the generated feedback information at feedback timing according to feedback configuration information to the base station, receive a reference signal (CSI-RS, Mobility RS, Synchronization Signal, etc.) from the base station, generate feedback information based on the received reference signal, and transmit the generated feedback information to the base station. In this case, the controller 2520 may select a precoding matrix, beam index, antenna port, and resource index according to the information of the base station.

Figure 26:
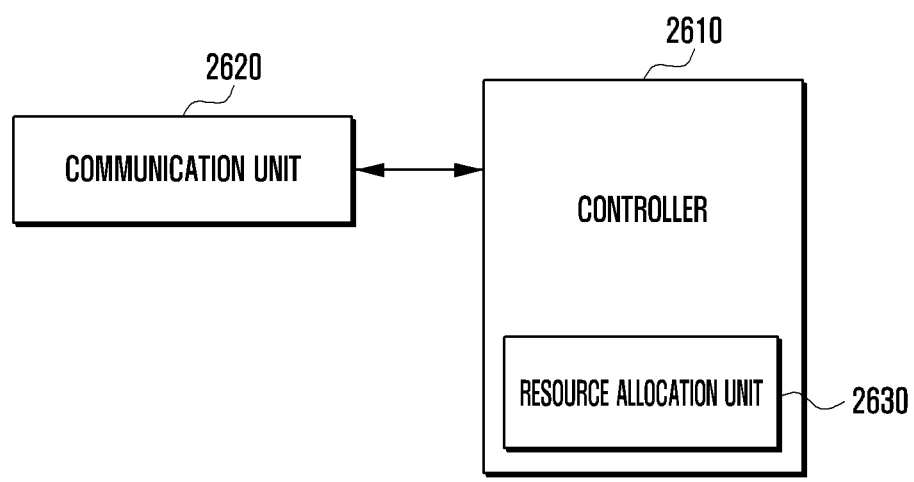
FIG. 26 illustrates an internal structure of a base station according to an embodiment.

FIG. 26 illustrates an internal structure of a base station, according to an embodiment.

In FIG. 26, the base station includes a controller 2610 and a communication unit 2620. The controller 2610 controls a state and operation of all components constituting the base station. Specifically, the controller 2610 allocates a reference signal (CSI-RS, RS Mobility, Synchronization Signal, and so on) resource for channel estimation of the terminal to the terminal, and allocates a feedback resource and feedback timing to the terminal. For this reason, the controller 2610 may further include a resource allocation unit 2630. The controller 2610 may allocate feedback setting and feedback timing such that feedback from various terminals does not conflict, and receive and analyze feedback information set at the corresponding timing.

The communication unit 2620 transmits and receives data, a reference signal, and feedback information to the terminal, transmits a reference signal to the terminal through resources allocated under the control of the controller 2610, and receives feedback of the channel information from the terminal. In the foregoing description, the resource allocation unit 2630 is included in the controller 2610, but the present disclosure is not limited thereto.

The controller 2610 may control the communication unit 2620 to transmit setting information for each of at least one reference signal to the terminal or may generate the at least one reference signal, to transmit feedback configuration information for generating feedback information according to the measurement result to the terminal, and to transmit at least one reference signal to the terminal and to receive the feedback information transmitted from the terminal at feedback timing according to the feedback configuration information.

The controller 2610 may transmit feedback configuration information to the terminal, transmit a reference signal to the terminal, and receive feedback information generated based on the feedback configuration information and the reference signal information from the terminal. In this case, the controller 2610 may transmit additional feedback configuration information based on feedback configuration information corresponding to each antenna port of the base station and a relationship between antenna port groups. The controller 2610 may transmit a beamformed CSI-RS based on the feedback information to the terminal and receive feedback information generated based on the reference signal from the terminal.

Third Embodiment

In the description, terms for identifying an access node, indicating a network entity, indicating a message, indicating an interface between network entities, and indicating various identification information are provided for convenience of description. Therefore, the present disclosure is not limited to these terms and other terms indicating an object having the same technical meaning may be used.

Hereinafter, for convenience of description, terms and names defined in a 3rd generation partnership LTE (3GPP LTE) specification are used, but the present disclosure is not limited thereto, and names and may be equally applied to systems of other specifications.

Figure 27:
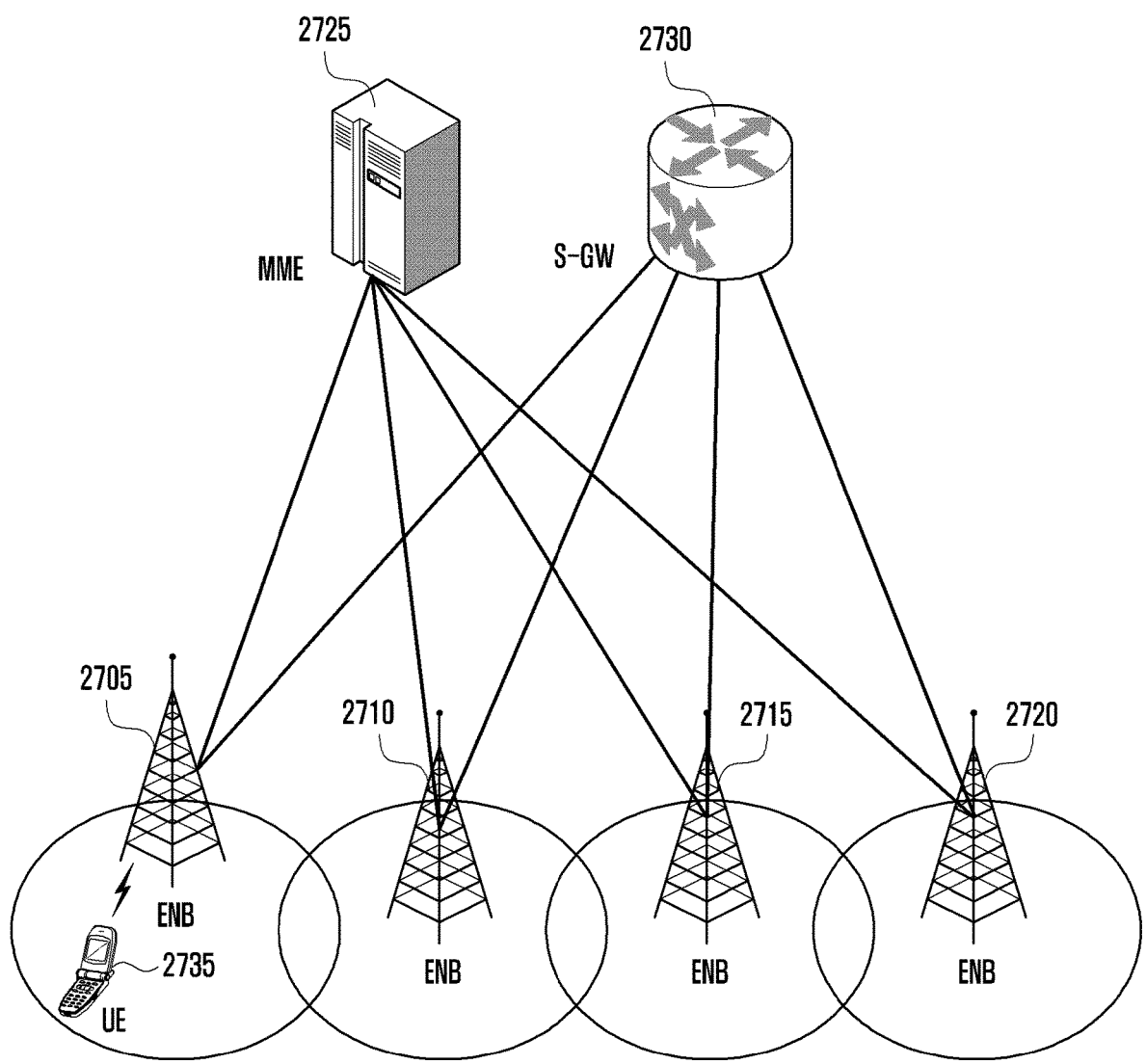
FIG. 27 illustrates a structure of a conventional LTE system.

FIG. 27 illustrates a structure of a conventional LTE system.

In FIG. 27, the wireless communication system includes several eNBs 2705, 2710, 2715, and 2720, mobility management entity (MME) 2725, and serving-gateway (S-GW) 2730. The user terminal (hereinafter, UE or terminal) 2735 is accessed to an external network through the eNBs 2705, 2710, 2715, and 2720 and the S-GW 2730.

The eNBs 2705, 2710, 2715, and 2720 are access nodes of a cellular network and provide radio access to terminals accessing to a network, and collect status information such as a buffer state, available transmission power state, and channel state of terminals in order to service traffic of users to perform scheduling, thereby supporting a connection between the terminals and a core network (CN).

The MME 2725 provides various control functions as well as a mobility management function of the terminal and is connected with a plurality of eNBs, and the S-GW 2730 provides a data bearer. The MME 2725 and the S-GW 2730 may further perform authentication and bearer management of a terminal accessed to the network and process a packet arrived from or to be transferred to the eNB 2705, 2710, 2715, and 2720.

One eNB may generally transmit and receive multiple carriers over several frequency bands. For example, when a carrier having a forward central frequency of f1 and a carrier having a forward central frequency of f2 from the eNB 2705 are transmitted, in the prior art, one terminal has transmitted and received data using one of two carriers. However, a terminal having a carrier integration capability may simultaneously send and receive data through several carriers. A transmission speed of the terminal can be increased as the eNBs 2705, 2710, 2715, and 2720 allocate more carriers to the terminal 2735 having a carrier integration capability according to a situation. As described above, CA refers to aggregation of a forward carrier and a backward carrier transmitted and received by one eNB. When one forward carrier transmitted by one eNB and one backward carrier received by the eNB constitute one cell, CA may be understood as a terminal that simultaneously transmits and receives data through several cells. Thereby, a maximum transmission rate increases in proportion to the number of integrated carriers.

Hereinafter, in the present specification, the terminal receiving data through any forward carrier or transmitting data through any backward carrier has the same meaning as that the terminal transmitting and receiving data using a center frequency characterizing the carrier and a control channel and a data channel providing in a cell corresponding to a frequency band. In the present embodiment, particularly, CA may be expressed as "a plurality of serving cells are set", and a serving cell may be referred to as a primary serving cell (hereinafter, PCell), a secondary serving cell (hereinafter, SCell), or an active serving cell.

The PCell and the SCell represent a type of the serving cell set to the terminal. There are some differences between the PCell and the Scell. For example, the PCell always maintains an activation state, but the SCell repeats an activation state and a deactivation state according to an instruction of the eNB. The mobility of the UE is controlled while giving the first consideration to the PCell, and the SCell may be understood as an additional serving cell for data transmission and reception. The PCell and the SCell in embodiments of the present disclosure are defined in LTE specifications 36.331 and 36.321, and the terms have meanings used in an LTE mobile communication system. In the present disclosure, terms such as a carrier, component carrier, and a serving cell is randomly used.

In CA within a common eNB, the terminal transmits HARQ feedback of the Pcell, CSI, and HARQ feedback and CSI of the SCell through a physical UL control channel (hereinafter, PUCCH) of the, to apply a CA operation even to a terminal in which UL synchronous transmission cannot be performed. In LTE Rel-13 enhanced CA (eCA), an additional SCell having a PUCCH is defined, and carriers of up to 32 may be integrated. The PUCCH SCell is limited to a serving cell belonging to a mast cell group (MCG), which indicates a set of serving cells controlled by a master eNB (MeNB) that controls the PCell, and the SCG indicates a set of serving cells controlled by an eNB other than the eNB that controls the Pcell, i.e., a secondary eNB (SeNB) that controls only secondary cells (SCell). The eNB notifies the terminal in a process of setting the serving cell whether a particular serving cell belongs to the MCG or the SCG, and notifies the terminal whether each SCell belongs to a PCell group or a PUCCH SCell group.

Figure 28:
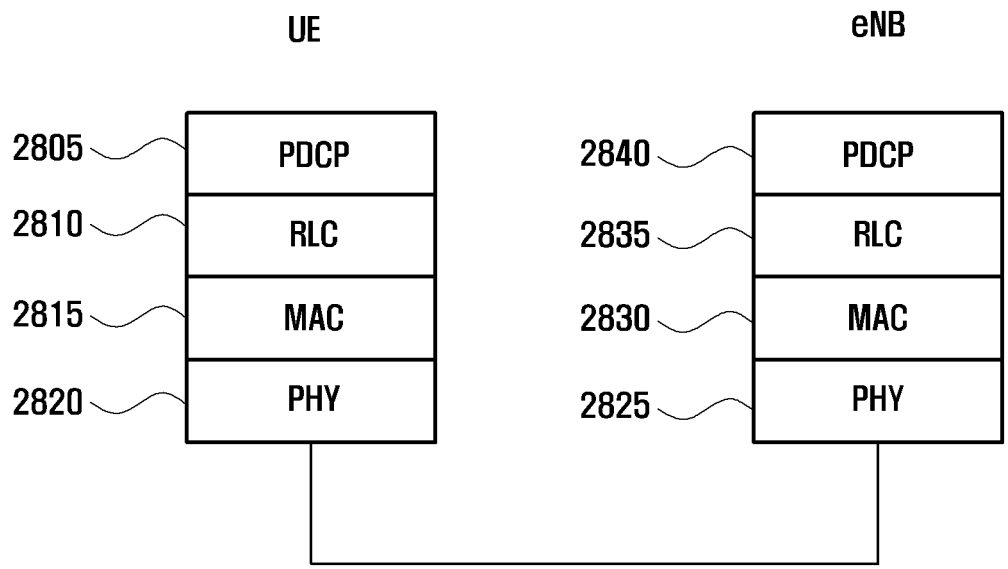
FIG. 28 illustrates a radio protocol architecture of the conventional LTE system.

FIG. 28 illustrates a radio protocol architecture of a conventional LTE system.

In FIG. 28, a radio protocol of the LTE system includes packet data convergence protocols (PDCP) 2805 and 2840, radio link controls (RLCs) 2810 and 2835, and MACs 2815 and 2830 in the UE and the eNB, respectively. The PDCPs 2805 and 2840 perform operations such as IP header compression/decompression and have the following main functions.

Header compression and decompression (ROHC only)
Transfer of user data
In-sequence transfer of upper layer PDUs at PDCP re-establishment procedure for radio link control acknowledged mode (RLC AM)
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in UL The RLCs 2810 and 2835 reconfigure the packet data unit (PDCP PDU) in a proper size to perform an ARQ operation, and perform the following main functions.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 2815 and 2830 are connected to several RLC layer devices configured in a terminal, perform multiplexing radio link control packet data units (RLC PDUs) to the MAC PDU and demultiplexing RLC PDUs from the MAC PDU, and have the following main functions.

Mapping between logical channels and transport channels
Multiplexing/demultiplexing of MAC SDUs belonging to one or different logical channels into/from TBs transferred to/from the physical layer on transport channels
Scheduling information reporting
Error correction through HARQ
Priority handling between logical channels of one UE
Priority handling between UEs by dynamic scheduling
MBMS service identification
Transport format selection
Padding The physical layers (PHY) 2820 and 2825 perform channel coding and modulation of higher layer data, generate the higher layer data into an OFDM symbol, transmit the OFDM symbol with a radio channel or demodulate an OFDM symbol received through a radio channel and perform channel decoding and transfer the OFDM symbol to a higher layer.

In an upper portion of PDCP layers of the UE and the eNB, an RRC layer exists, and may send and receive an access and measurement related setting control message for radio resource control.

Figure 29:
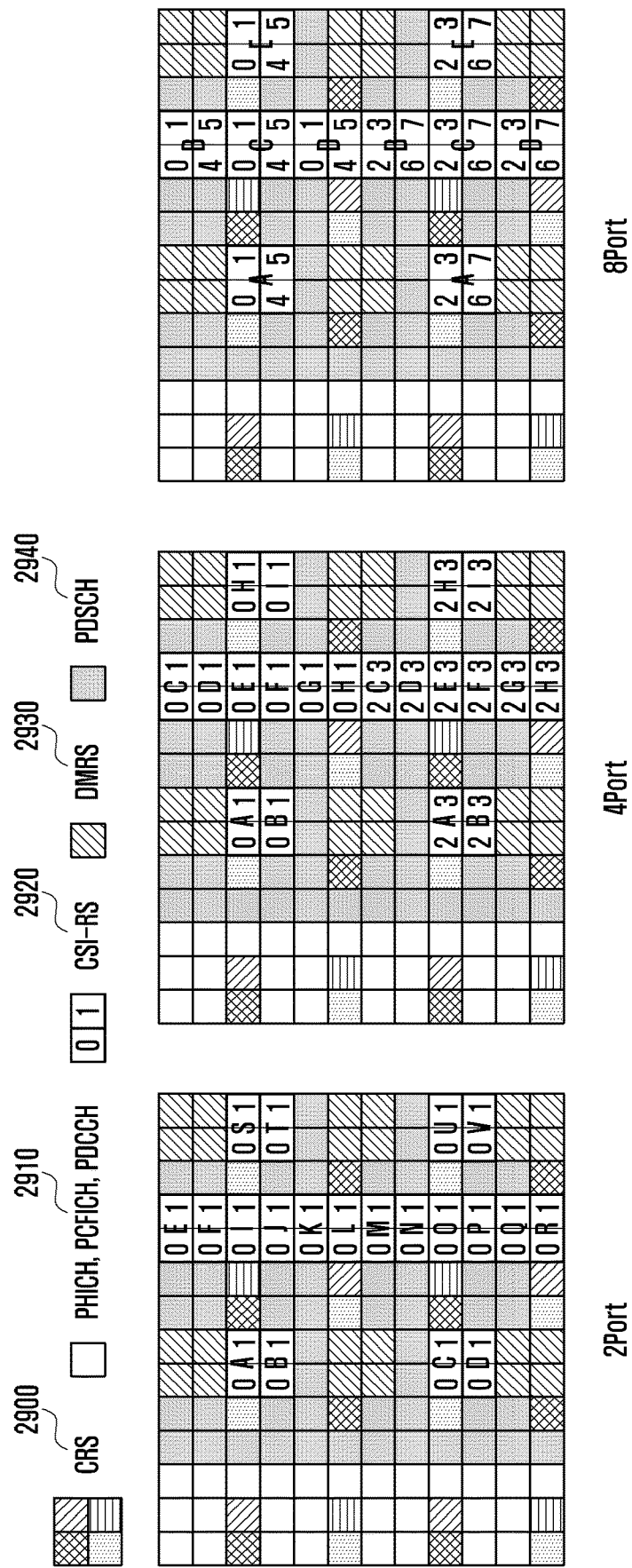
FIG. 29 illustrates CSI-RS transmission on 2, 4, and 8 antenna ports, to which the present disclosure is applied.

FIG. 29 illustrates CSI-RS transmission on 2, 4, and 8 antenna ports using radio resources of 1 subframe and 1 RB, which are minimum units that may be scheduled in a DL in a conventional LTE system.

A radio resource shown in FIG. 29 is configured with one subframe on a time axis and one RB on a frequency axis. The radio resource is configured with 12 subcarriers in a frequency domain and with 14 OFDM symbols in a time domain, and thus, has total 168 intrinsic frequencies and time positions, referred to as an RE in LTE and LTE-A.

In the radio resource of FIG. 29, a plurality of different types of signals may be transmitted as follows.

1. CRS 2900: a reference signal transmitted for all terminals belonging to a single cell.
2. DMRS 2930: a reference signal transmitted for a specific terminal and used for performing channel estimation for recovering information loaded in the PDSCH. The same precoding as a PDSCH layer connected to one DMRS port is applied and transmitted. A UE to receive a particular layer of the PDSCH receives a DMRS port connected to the layer, performs channel estimation, and restores information loaded in the layer using this.
3. PDSCH 2940: a data channel transmitted to a DL, used when the eNB transmits traffic to the terminal, and s transmitted using an RE in which a reference signal is not transmitted in a data region of FIG. 29.
4. CSI-RS 2920: a reference signal transmitted for terminals belonging to a single cell and is used for measuring a channel status. A plurality of CSI-RSs may be transmitted to one cell.
5. Zero Power CSI-RS (ZP-CSI-RS): an actual signal is not transmitted at a position in which a CSI-RS is transmitted.
6. Interference measurement resource (IMR): IMR corresponds to a position in which a CSI-RS is transmitted, and in FIG. 3C, one or the plurality of A, B, C, D, E, F, G, H, I, and J may be set to IMR. The UE assumes that all signals received from REs set to the IMR are interference and performs interference measurement.
7. Other control channels (PHICH, PCFICH, PDCCH 2910: other control channels provide control information necessary when the terminal receives a PDSCH or transmits ACK/NACK for operating a HARQ for data transmission of a UL.

The LTE-A system may set a zero power CSI-RS such that CSI-RSs transmitted by other eNBs may be received without interference to terminals of the cell. The zero power CSI-RS (muting) may be applied at a position in which the CSI-RS may be transmitted, and the terminal generally skips the wireless resource and receives a traffic signal. In the LTE-A system, zero power CSI-RS (muting) may also be referred to as muting, and is applied to a position of the CSI-RS in view of a characteristic because of the CSI-RS since transmission power is not transmitted.

In FIG. 29, the CSI-RS may be transmitted using a portion of positions represented with A, B, C, D, E, F, G, H, I, and J according to the number of antennas that transmit the CSI-RS, muting may be applied to a portion of these positions. In particular, the CSI-RS may be transmitted using two, four, and eight REs according to the number of transmitting antenna ports. When the number of antenna ports is 2, in FIG. 29, the CSI-RS is transmitted to a half of a specific pattern, when the number of antenna ports is 4, the CSI-RS is transmitted to an entire particular pattern, and when the number of antenna ports is 8, the CSI-RS is transmitted using two patterns. However, the muting is always formed in a single pattern unit. That is, muting may be applied to a plurality of patterns, but when a position of the muting is not overlapped with a position of the CSI-RS, muting cannot be applied to a portion of a single pattern.

However, only when a position of the CSI-RS and a position of the muting are overlapped, the muting may be applied only to a part of one pattern. The UE may receive allocation of a CSI-IM (or interference measurement resources (IMR)) together with a CSI-RS, and a CSI-IM resource has the same resource structure and position as the CSI-RS that supports 4 port. The CSI-IM enables the terminal that receives data from at least one eNB to accurately measure interference from adjacent eNBs. For example, when a neighboring eNB wants to measure an amount of interference when transmitting data and an amount of interference when not transmitting data, the base station configures a CSI-RS and two CSI-IM resources, and one CSI-IM enables the neighboring eNB to always transmit a signal and the other CSI-IM enables the neighboring eNB to infrequently transmit a signal. Thus, the base station can effectively measure an amount of interference of the neighboring eNB.

In the LTE-A system, the eNB may notify a CSI-RS configuration to the UE through higher layer signaling. The CSI-RS configuration includes a CSI-RS configuration index, the number of ports in which a CSI-RS includes, a transmission period of the CSI-RS, transmission offset, CSI-RS resource configuration, CSI-RS scrambling ID, and QCL information.

When a CSI-RS of two antenna ports is transmitted, a signal of each antenna port is transmitted in two REs connected in a time axis and a signal of each antenna port is distinguished by orthogonal codes to become CDM. When a CSI-RS of four antenna ports is transmitted, by additionally using two REs to the CSI-RS for two antenna ports, a signal of the remaining two antenna ports with the same method is transmitted even when a CSI-RS of eight antenna ports is transmitted.

When 12 and 16 CSI-RSs more than 8 CSI-RSs are transmitted, by combining a position in which existing 4 and 8 CSI-RSs are transmitted in RRC setting, the 12 and 16 CSI-RSs are transmitted. In other words, when 12 CSI-RSs are transmitted, by combining three 4 port CSI-RS transmission positions, one 12 port CSI-RS is transmitted and when 16 CSI-RSs are transmitted, by combining two 8 port CSI-RS transmission positions, one 16-port CSI-RS is transmitted. The 12 and 16 port CSI-RS transmission differs in CDM having a magnitude of 4, compared with existing port 8 or less CSI-RS transmission. A CSI-RS of existing 8 ports or less supports CDM2 and transmits by overlapping CSI-RS second port in two time symbols, and thus supports power boosting of maximum 6 dB based on 8 ports, whereby full power can be used in CSI-RS transmission. However, because full power cannot be used in CSI-RS transmission with a combination of CDM2 and 6 dB in the 12 or 16 port CSI-RS, the 12 or 16 port CSI-RS may assist to use full power by supporting CDM4 for this case.

Figure 30:
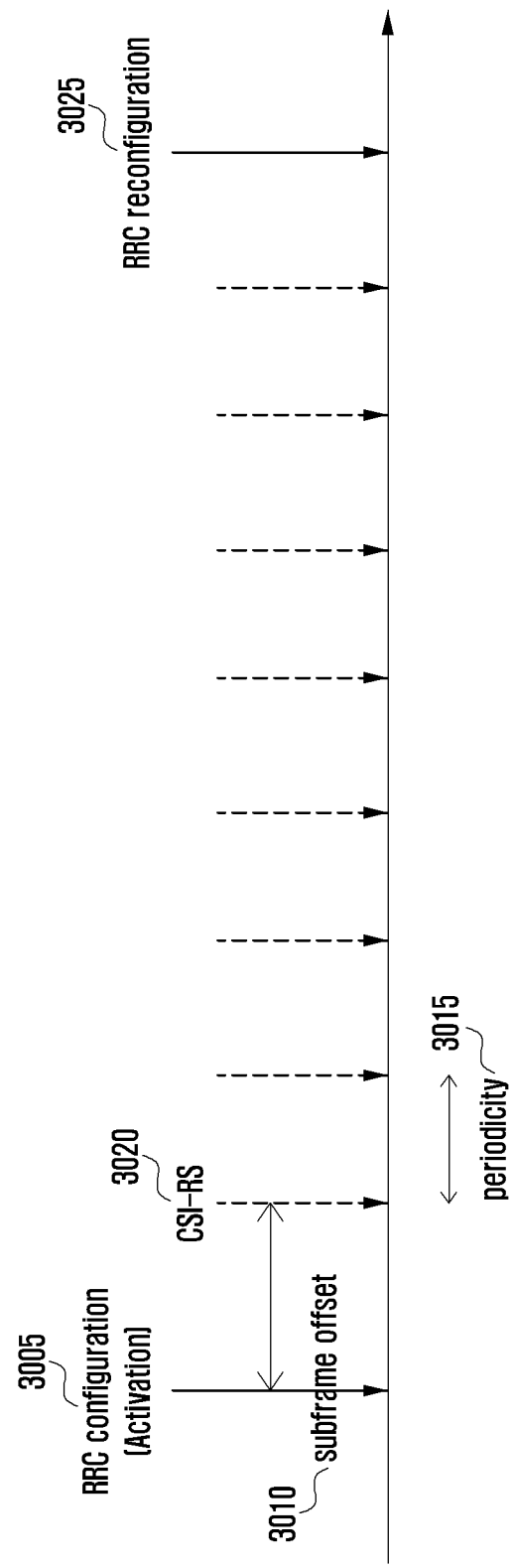
FIG. 30 illustrates periodic CSI-RS setting and operation in the conventional LTE system.

FIG. 30 illustrates periodic CSI-RS setting and operation in a conventional LTE system.

In FIG. 30, the eNB sets a periodic CSI-RS to the terminals through an RRC message at step 3005. The CSI-RS setting includes an index of CSI-RS setting information, the number of antenna ports in which the CSI-RS includes, a transmission period of the CSI-RS, transmission offset, CSI-RS resource configuration, CSI-RS scrambling ID, and quasi co-location (QCL) information. Because a conventional LTE terminal does not support aperiodic CSI-RS transmission, the terminal should report channel state information to the terminal by a periodic CSI-RS which is always transmitted.

Table 9 below illustrates RRC fields constituting a periodic CSI-RS configuration.

TABLE 9

| CSI-RS config | CSI-IM config | CQI report config | Etc |
|---|---|---|---|
| No. antenna ports | Resource config | Periodic | $P_C$ |
| Resource config | Time and frequency | Mode, resource, | Codebook subset |
| Time and frequency position in a subframe | position in a subframe | periodicity, offset . . . | restriction |
| Subframe config | Subframe config | Aperiodic | |
| Periodicity and subframe offset | Periodicity and subframe offset | Mode . . . | |
| Qcl-CRS-info (QCL Type B) | | PMI/RI report | |
| CRS information for CoMP | | RI reference CSI process | |
| | | SubframePattern | |

When several eNBs for supporting a coordinated multi-point (CoMP) exist, a CSI-RS process is required to transfer channel information of each eNB to the serving cell, and maximum four CSI-RS processes may be supported. Setting for a channel state report based on a periodic CSI-RS within the CSI process may be classified into four, as shown in Table 9. A CSI-RS config sets a frequency and time position of a CSI-RS RE. The number of ports of the corresponding CSI-RS is set through setting of the number of antennas. A resource config sets an RE position within the RB, and a Subframe config sets a period 3015 and an offset 3010 of the subframe.

The eNB transfers the CSI-RS 3020 through the resource according to a preset subframe config, and the UE receives a periodically transmitted CSI-RS. The terminal reports a value of a CSI-RS measured according to a CSI-RS report condition set to the eNB. A periodical or aperiodical report method may be used as the report method.

The process is continued until the eNB changes a setting value through RRC reconfiguration at step 3025.

As the number of antennas that the eNB supports in a mobile communication system increases and UE specific beamformed CSI-RS transmission is supported, CSI-RS resource setting on a terminal basis is required, which increases CSI-RS overhead. To cure this problem, periodical CSI-RS transmission may be introduced. In a 5G communication system, various techniques requiring a plurality of CSI-RS resources such as multi-transmission and reception point (TRP) transmission and multi-panel transmission will be additionally supported and thus a CSI-RS overhead will further increase. Because existing aperiodic CSI-RS transmission is designed in consideration of single-TRP and single-panel transmission, it is not suitable to support aperiodic transmissions of multiple CSI-RS resources. Thus, for an efficient system and CSI-RS operation, a method of reporting aperiodic CSI-RS transmission through a plurality of CSI-RS resources and related channel state information is required.

Embodiment 3-1

Figure 31A:
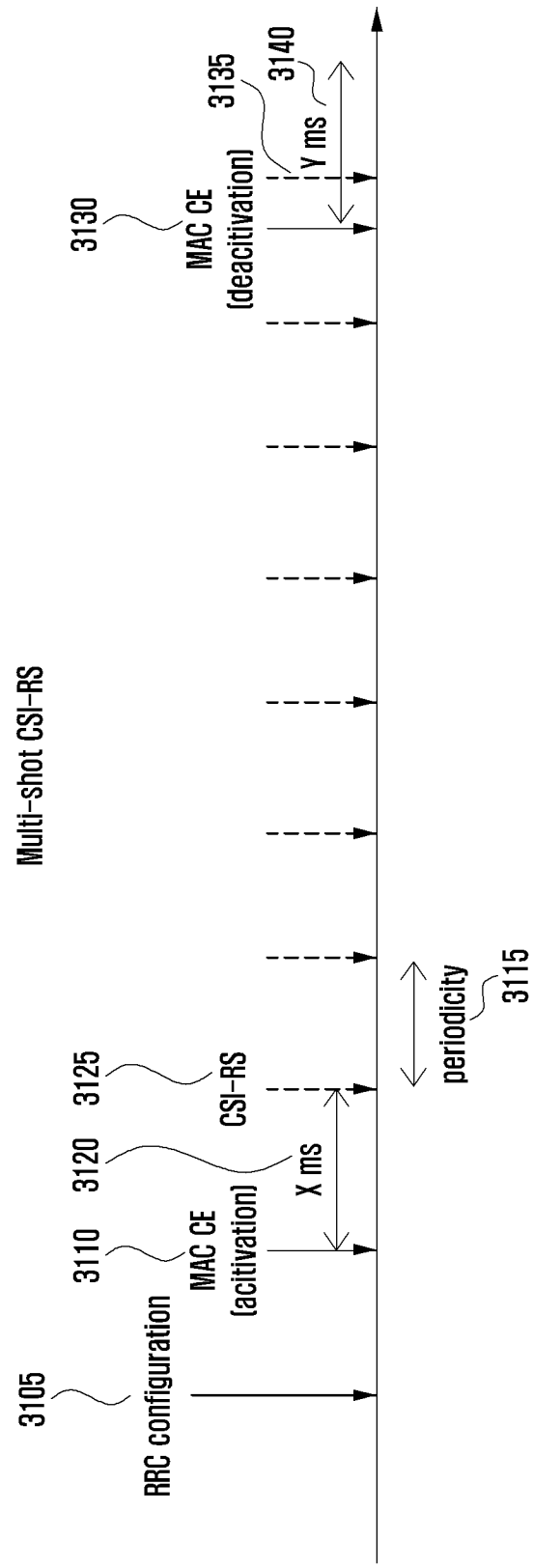
FIGS. 31A and 31B illustrate multiplex transmission CSI-RS and aperiodic CSI-RS setting and activation and deactivation operation according to an embodiment.
Figure 31B:
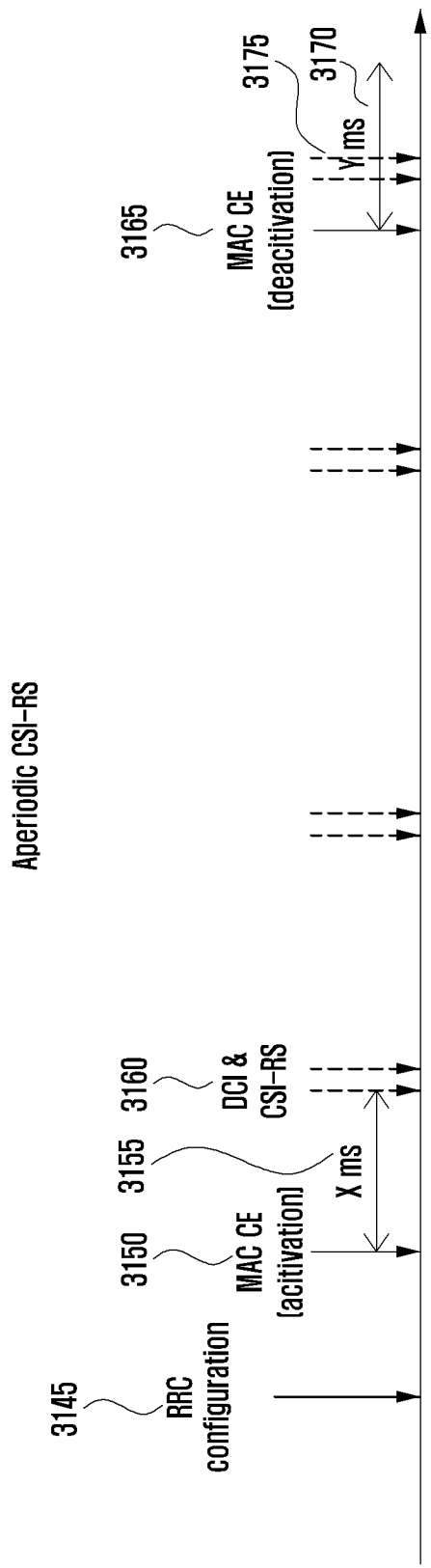

FIGS. 31A and 31B illustrate multiplex transmission CSI-RS and aperiodic CSI-RS setting and activation and deactivation operation according to an embodiment.

In multiple transmission CSI-RS (hereinafter, multi-shot CSI-RS) of FIG. 31A, the eNB sets a periodic CSI-RS to the terminal through an RRC message at step 3105. The CSI-RS setting includes an index of existing CSI-RS setting information, the number of antenna ports including CSI-RS, a transmission period of the CSI-RS, transmission offset, CSI-RS resource configuration, CSI-RS scrambling ID, and QCL information. The CSI-RS setting may include an indicator representing that the CSI-RS setting is for multi-shot CSI-RS.

The eNB represents actually activated resources among CSI-RS resources that set a MAC CE at step 3110. As described In FIG. 29, the CSI-RS may be transmitted using a portion of displayed positions of 1 to 8 according to the number of antennas that perform this transmission.

When the UE receives an instruction of a CSI-RS activation resource through the MAC CE, the UE performs a CSI-RS activation operation (CSI-RS reception) after X ms (e.g., 8 ms) 3015 at step 3120. Since the corresponding operation is performed after X ms when the MAC CE is successfully received, the MAC transfers time information (subframe number when receiving MAC CE) that receives the MAC CE to the physical layer. The UE receives and measures a CSI-RS according to period information set through the RRC, and reports a CSI-RS measurement value after according to a CSI-RS report method determined by the eNB to. The report method may include a periodical or aperiodical report.

Thereafter, the UE receives CSI-RS deactivation through the MAC CE at step 3130, and when Y ms (e.g., 8 ms) 3140 has elapsed after CSI-RS deactivation is received, the UE deactivates CSI-RS reception and CSI-RS report. When the CSI-RS is received for Y ms at step 3135, the information is effective.

In an aperiodic CSI-RS of FIG. 31B, the eNB sets an aperiodic CSI-RS to the terminals through an RRC message at step 3145. The CSI-RS setting may or may not include existing subframe config information, and an indicator representing that the CSI-RS setting is for aperiodic CSI-RS may be included. Thereafter, the eNB represents actually activated resources among CSI-RS resources that set the MAC CE at step 3150. As described in FIG. 29, the CSI-RS may be transmitted using a portion of displayed positions of 1 to 8 according to the number of antennas that transmit the CSI-RS.

When the UE receives an instruction of a CSI-RS activation resource through the MAC CE, the UE performs a CSI-RS activation operation (CSI-RS reception) after X ms (e.g., 8 ms) 3155 at step 3160. Since this operation is performed after X ms 3155 when the MAC CE is successfully received, the MAC transfers time point information (subframe number when receiving MAC CE) that receives the MAC CE to the physical layer. This operation is distinguished from a conventional CSI-RS receiving operation in that CSI-RS transmission from the eNB is transmitted together in a subframe in which DCI is aperiodically transmitted at step 3160. The UE receives the DCI and receives and measures a CSI-RS transmitted in the same subframe, and reports a CSI-RS measurement value according to a CSI-RS report method determined by the eNB. The report method may include an aperiodic report.

Thereafter, the UE receives CSI-RS deactivation through MAC CE at step 3165, and when Y ms (e.g., 8 ms) 3170 has elapsed after receiving the CSI-RS deactivation, the UE deactivates CSI-RS reception and CSI-RS report. When the CSI-RS is received for Y ms at step 3175, the information is effective.

In order to distinguish different settings, the following methods may be used for CSI-RS setting through the RRC message.

Method 1. Identification information that indicates a multi-shot CSI-RS and aperiodic CSI-RS may be included in a conventional CSI-RS config IE. When the aperiodic CSI-RS subframe is indicated, subframe config information set to the CSI-RS config IE is not used.

Method 2. Identification information that indicates a multi-shot CSI-RS is included in a conventional CSI-RS config IE, and a new aperiodic CSI-RS config IE for an aperiodic CSI-RS may be additionally introduced. Subframe config information is not included in the aperiodic CSI-RS config IE.

Method 3. A new CSI-RS config IE in addition to a conventional CSI-RS config IE may be introduced. In the new CSI-RS config IE, an identifier that distinguishes a multi-shot CSI-RS and an aperiodic CSI-RS config IE is included, and when the aperiodic CSI-RS subframe is indicated, subframe config information set to the CSI-RS config IE is not used.

When at least one aperiodic and/or multi-shot CSI-RS resource is set to the terminal, the eNB may use a newly defined MAC CE in order to instruct activation and deactivation of the CSI-RS resource more quickly and adaptively. A preset aperiodic and/or multi-shot CSI-RS resource may be initiated in a deactivated state after initial setting and handover.

The present disclosure teaches two design methods according to a signal structure of the MAC CE. In a first method of a MAC CE design, one MAC CE transmitted by the eNB includes activation and deactivation commands for all serving cells, and in a second method of a MAC CE design, one MAC CE includes only activation and deactivation commands for the serving cell.

Figure 32A:
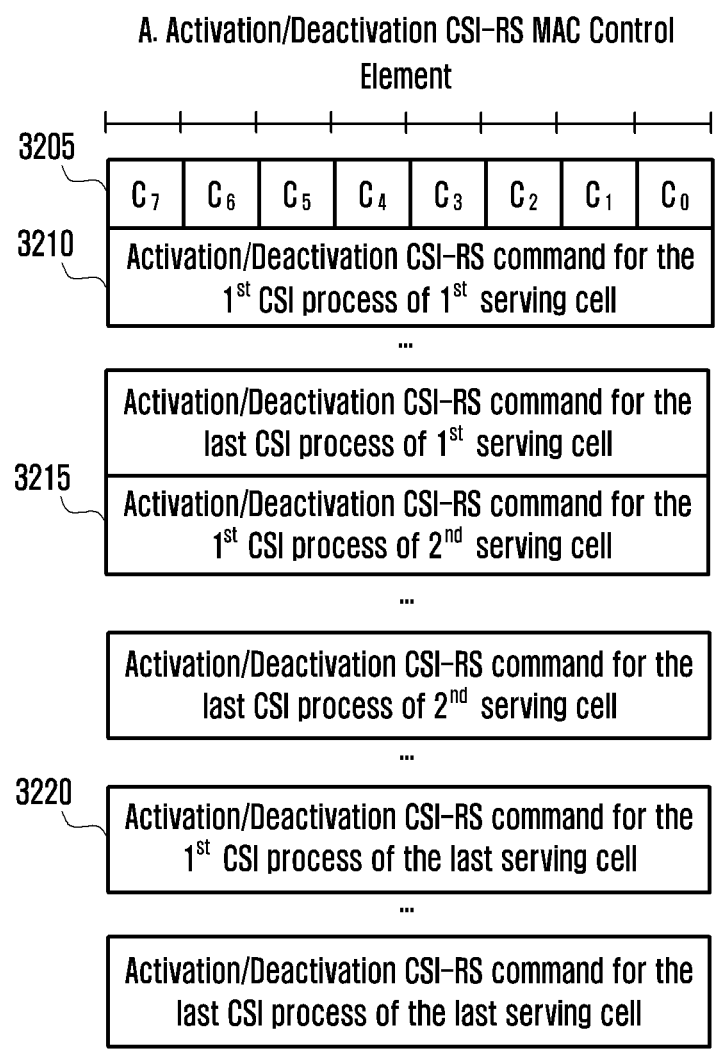
FIGS. 32A, 32B, and 32C illustrate a first method of a MAC control signal instructing activation and deactivation of a CSI-RS resource according to an embodiment.
Figure 32B:
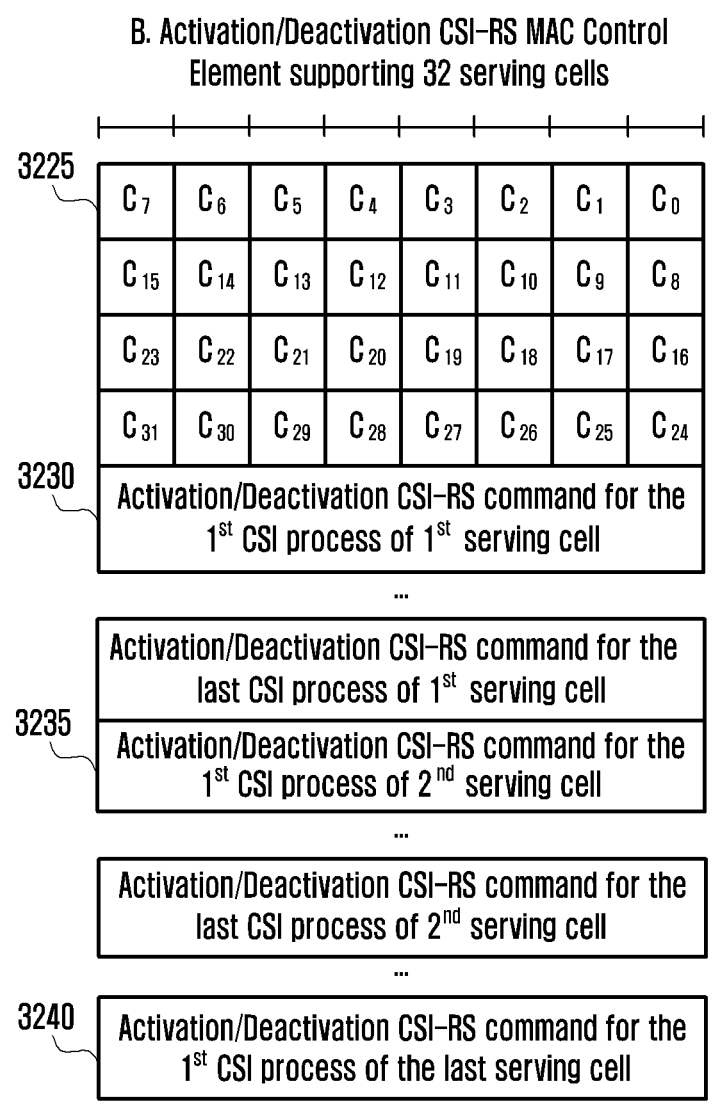
Figure 32C:
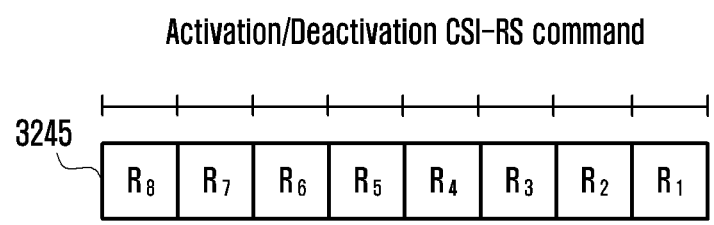

FIGS. 32A, 32B, and 32C illustrate a first method of a MAC control signal instructing activation and deactivation of a CSI-RS resource according to an embodiment.

As described above, in a first method of a MAC CE design, one MAC CE transmitted by the eNB includes activation and deactivation commands for all serving cells, and two models may be distinguished according to the number of the serving cells having a preset CSI-RS resource. A first model of FIG. 32A is when the number of serving cells (serving cell having a high index in a ServCellIndex) having a preset CSI-RS resource is 8 or less, and is indicated by a field C, 3205 of 1 byte. A second model of FIG. 32B is when the number of serving cells (serving cell having a high index in a ServCellIndex) having a preset CSI-RS resource is greater than 8, and is indicated by fields $C_i$ 3225 of 4 bytes to support maximum 32 serving cells. The design is significant in determining a format based on an index of a serving cell to which a CSI process is set or in which a CSI-RS resource is set.

Fields ($R_i$, 3210, 3215, 3220 of FIG. 32A, and 3230, 3235, 3240 of FIG. 32B) instructing a CSI resource activated and deactivated on each process basis of a serving cell are used. The CSI-RS resource command is instructed only to activated serving cells and is configured with fields $R_i$ of 1-byte, as in 3245 of FIG. 32C.

MAC CE for activation and deactivation of the CSI-RS may be defined as follows:

$C_i$: This field indicates the presence of activation/deactivation CSI-RS command(s) for the serving cell with ServCellIndex i. $C_i$ field set to "1" indicates that Activation/Deactivation CSI-RS command(s) for the serving cell with servcellindex i are included. $C_i$ field set to "0" indicates that no activation/deactivation CSI-RS command for the serving cell with ServCellIndex i is included. The number of activation/deactivation CSI-RS command for a serving cell is same as the number of configured CSI-RS processes for the serving cell;

$R_i$: This field indicates the activation/deactivation status of the CSI-RS resource associated with CSI-RS-ConfigNZPId i for the CSI-RS process.

In the foregoing description, $R_i$ corresponds to the CSI-RS-ConfigNZPId, and indicates that transmitting power allocated with the same frequency at the same CSI process is a CSI-RS resource instead of 0.

Figure 33:
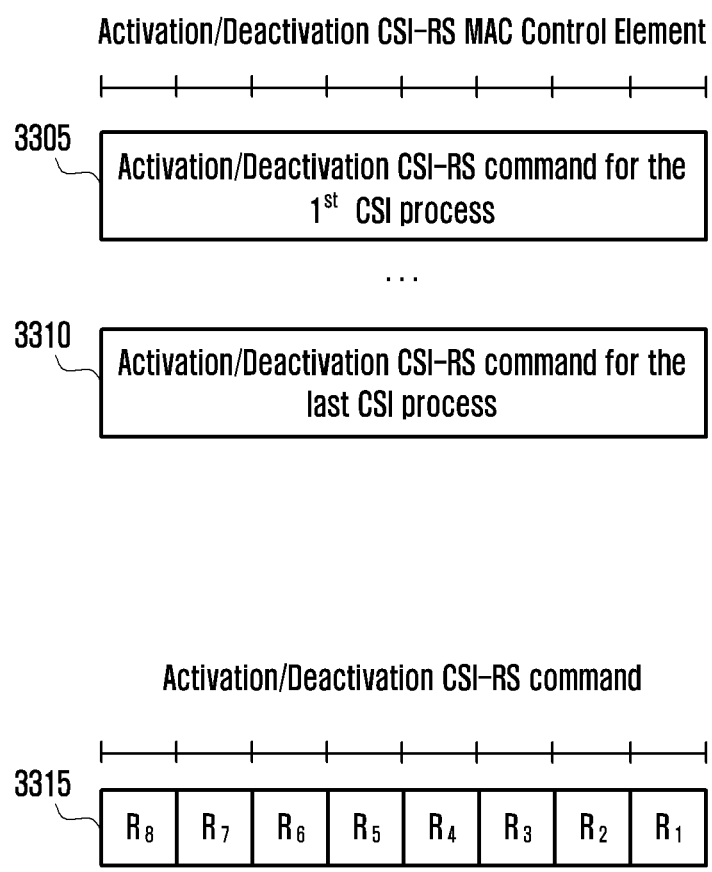
FIG. 33 illustrates a second method of a MAC control signal instructing activation and deactivation of a CSI-RS resource, according to an embodiment.

FIG. 33 illustrates a second method of a MAC control signal instructing activation and deactivation of a CSI-RS resource according to an embodiment.

In a second method of a MAC CE design, one MAC CE transmitted by the eNB is defined to serving cell specific and includes only activation and deactivation commands for the serving cell. In the design, only a command of a serving cell received by MAC CE for CSI-RS activation and deactivation is included. That is, because the second method of the MAC CE design is set to serving cell specific, it is unnecessary to instruct an index of the serving cell, and fields ($R_i$, 3305, 3310) that instruct a CSI-RS resource activated and deactivated on a process basis of the serving cell are used. The CSI-RS resource command is instructed only to the activated serving cells and is configured with fields $R_i$ of 1-byte, as in 3315.

The MAC CE for activation and deactivation of the CSI-RS may be defined as follows:

$R_i$: This field indicates the activation/deactivation status of the CSI-RS resource associated with CSI-RS-ConfigNZPId i for the CSI-RS process.

In the foregoing description, $R_i$ corresponds to CSI-RS-ConfigNZPId, and indicates that transmitting power allocated with the same frequency at the same CSI process is a CSI-RS resource instead of 0.

A second method of a MAC CE design may have an advantage of a simple structure if the MAC CE may be transmitted in a multi-cell. If the MAC CE may not be transmitted in a multi-cell, a first method of a MAC CE design is effective.

Figure 34:
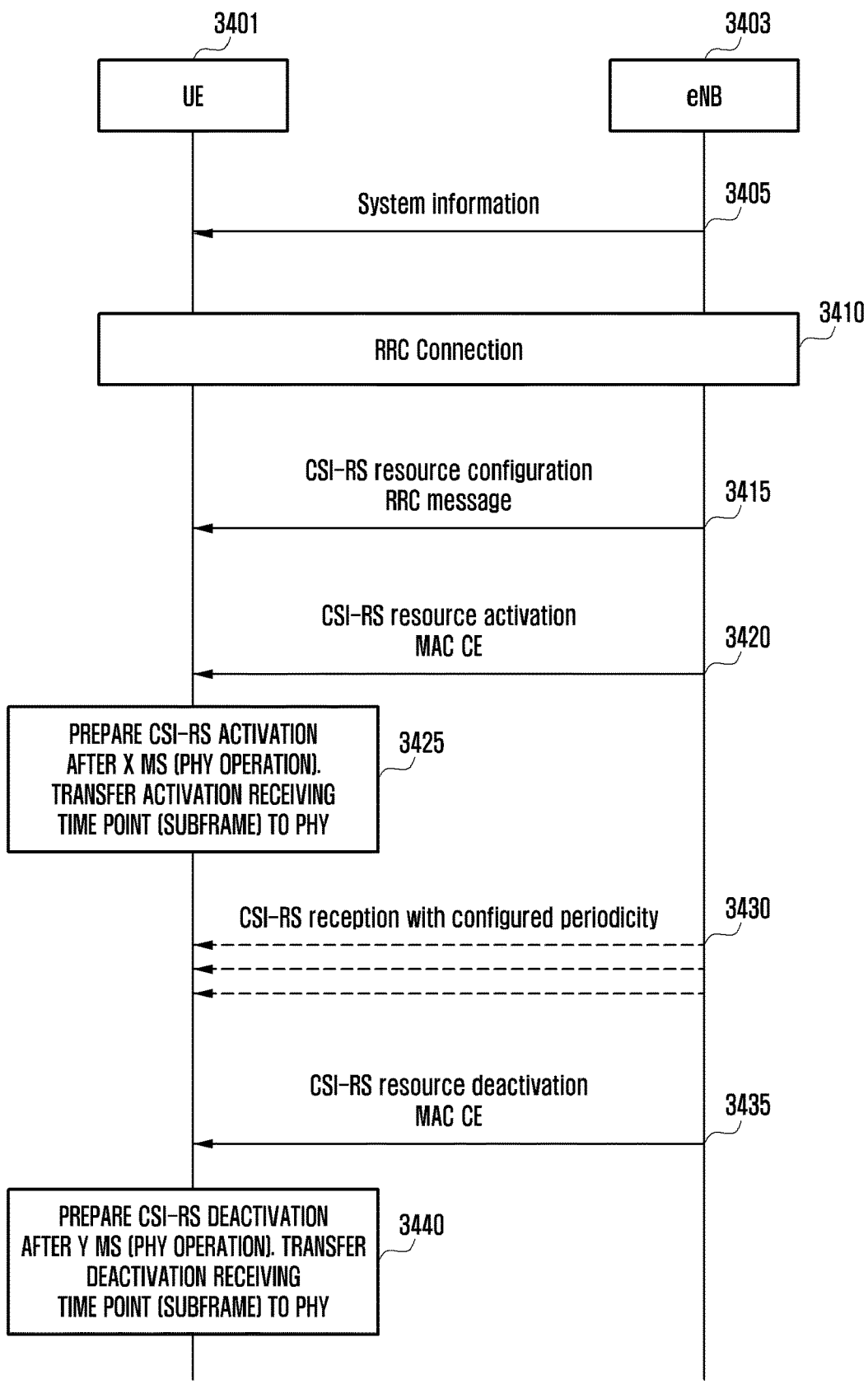
FIG. 34 illustrates an operation of a terminal and a base station in a multi-shot CSI-RS mode according to an embodiment.

FIG. 34 illustrates an operation of a terminal and an eNB in a multi-shot CSI-RS mode according to an embodiment.

A UE 3401 receives system information from an eNB 3403 at step 3405 and performs an RRC connection at step 3410. Thereafter, the terminal receives an RRC message for CSI-RS resource setting from the eNB at step 3415. The CSI-RS setting includes an index of existing CSI-RS setting information, the number of antenna ports in which CSI-RS includes, a transmission period of the CSI-RS, transmission offset, CSI-RS resource configuration, CSI-RS scrambling ID, QCL information, and an indicator representing setting for a multi-shot CSI-RS, and CSI-RS setting through the RRC message may use Method 1, 2 or, 3 in order to distinguish from another setting.

Thereafter, the eNB represents actually activated resources among CSI-RS resources set through the MAC CE at step 3420. As described in FIG. 29, the CSI-RS may be transmitted using a portion of displayed positions 1 to 8 according to the number of transmitting antennas. When the UE receives an instruction of a CSI-RS activation resource through the MAC CE, the UE performs a CSI-RS activation operation (CSI-RS reception) after X ms (e.g., 8 ms) at step 3425. Since this operation is performed after X ms from a time point in which the MAC CE is successfully received, the MAC transfers time point information (subframe number when receiving the MAC CE) that receives the MAC CE to the physical layer, prepares CSI-RS setting such as a preset antenna port and subframe setting, prepares interference measurement, and prepares to report a CSI-RSCSI-RS measurement value according to a CSI-RS report method determined by the eNB. The report method may include a periodical or aperiodical report.

The UE receives a CSI-RS from the eNB according to a preset period at step 3430, receives CSI-RS deactivation through the MAC CE at step 3435, and the MAC transfers time point information (subframe number when receiving the MAC CE) that receives the MAC CE to the physical layer. When Y ms (e.g., 8 ms) has elapsed after receiving the time point information, the MAC deactivates the CSI-RS reception and CSI-RS report at step 3440. When CSI-RS is received for Y ms, the information is effective.

Figure 35:
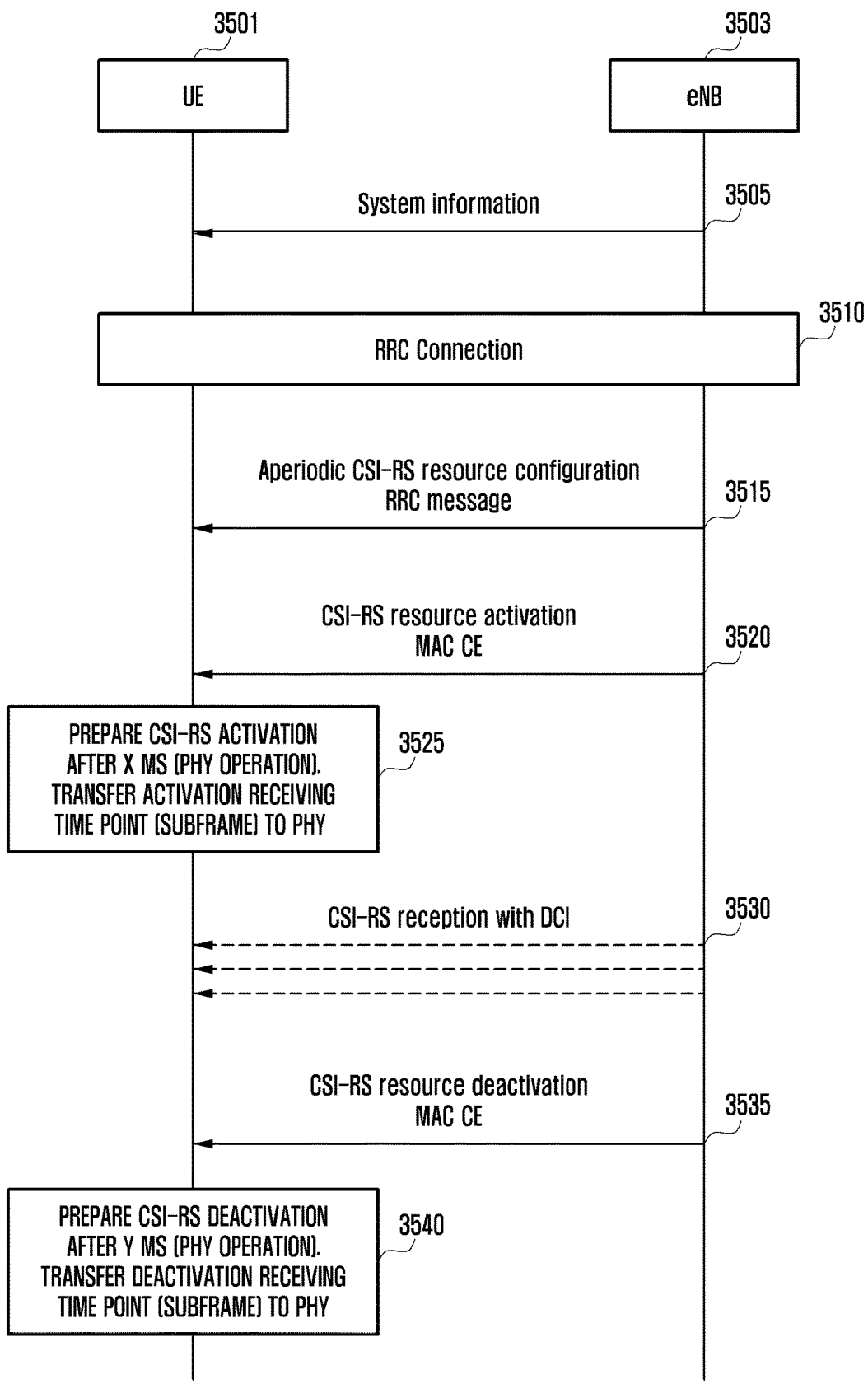
FIG. 35 illustrates an operation of a terminal and a base station in an aperiodic CSI-RS mode according to an embodiment.

FIG. 35 illustrates an operation of a terminal and an eNB in an aperiodic CSI-RS mode according to an embodiment.

A UE 3501 receives system information from the eNB 3503 at step 3505 and performs RRC connection at step 3510. Thereafter, the UE receives an RRC message for CSI-RS resource setting from the eNB at step 3515. The CSI-RS setting may or may not include existing config information and may include an indicator representing that the CSI-RS setting is for aperiodic CSI-RS. The CSI-RS setting may include an indicator representing setting for aperiodic CSI-RS, and CSI-RS setting through the RRC message may use Methods 1, 2, or 3 in order to distinguish from another setting.

Thereafter, the eNB indicates actually activated resources among CSI-RS resources set through the MAC CE at step 3520. As described in FIG. 29, CSI-RS may be transmitted using a part of displayed position of 1 to 8 according to the number of antennas that transmit the CSI-RS. When the UE receives an instruction of a CSI-RS activation resource through the MAC CE, the UE performs a CSI-RS activation operation (CSI-RS reception) after X ms (e.g., 8 ms) at step 3525. Since the operation is performed after X ms when the MAC CE is successful received, the MAC transfers time point information (subframe number when receiving the MAC CE) that receives the MAC CE to the physical layer, monitors CSI-RS reception in a subframe that receives DCI, and prepares interference measurement and prepares to report a CSI-RS measurement value according to a CSI-RS report method determined by the eNB. The report method may include an aperiodic report.

The UE receives a DCI and receives a CSI-RS transmitted in the same subframe at step 3530. Thereafter, the UE receives a CSI-RS deactivation through MAC CE (3535), and the MAC transfers time point information (subframe number upon receiving the MAC CE) that receives the MAC CE to the physical layer. When Y ms (e.g., 8 ms) has elapsed after receiving the physical layer, the UE deactivates CSI-RS reception and CSI-RS report at step 3540. When the CSI-RS is received for Y ms, the information is effective.

Figure 36:
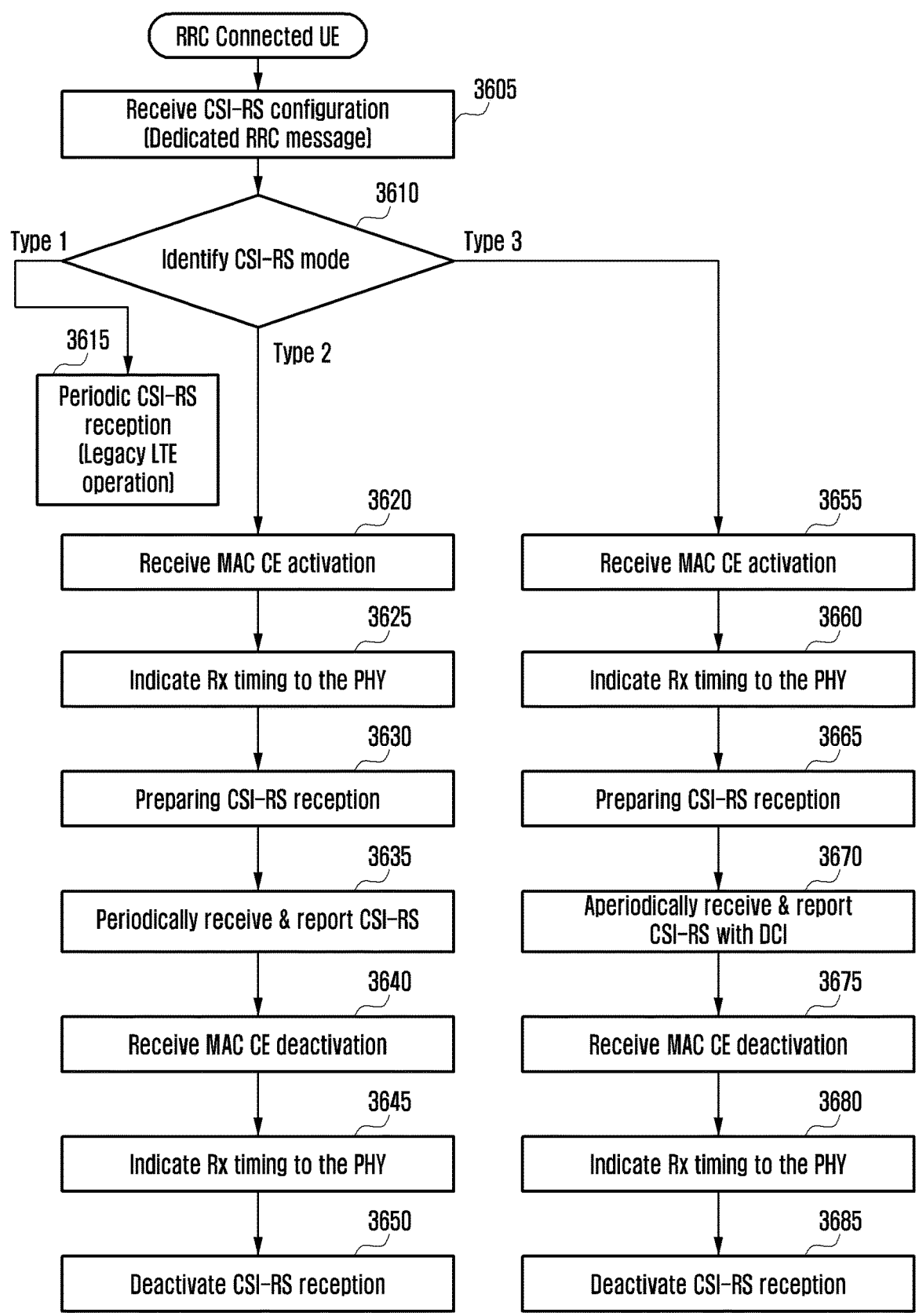
FIG. 36 illustrates an operation of a terminal CSI-RS activated and deactivated using a MAC CE, according to an embodiment.

FIG. 36 illustrates an operation of a terminal CSI-RS activated and deactivated using a MAC CE according to an embodiment.

A UE of an RRC connection state receives a CSI-RS configuration from an eNB at step 3605. CSI-RS is changed according to a type of a CSI-RS configuration, and the eNB differently performs a transmission operation and the terminal operation is changed. A preset aperiodic or multi-shot CSI-RS resource may be initiated in an inactivated state after initial setting and handover. In order to distinguish from another setting, the foregoing Methods 1, 2, or 3 may be used in CSI-RS setting through the RRC message.

The UE analyzes CSI-RS configuration information received from the eNB and determines a type thereof at step 3610. Type 1 is a conventional periodic CSI-RS receiving operation and may be distinguished based on the identification method according to the CSI-RS config method.

When the UE analyzes CSI-RS configuration information received from the eNB and determines to perform a Type 2 operation, the terminal performs an operation in a multi-shot CSI-RS mode at step 3610 by receiving an actually activated resource among the CSI-RS resources set through MAC CE at step 3620. Since a corresponding activation operation is performed after X ms when MAC CE is successfully received, the MAC transfers time point information (subframe number upon receiving the MAC CE) that receives MAC CE to the physical layer at step 3625, prepares CSI-RS setting such as a preset antenna port and subframe setting, prepares interference measurement and prepares to report a CSI-RS measurement value according to a CSI-RS report method determined from the eNB at step 3630.

The UE receives a CSI-RS from the eNB according to a preset period and reports a measurement value to the eNB at step 3635. The report method may include a periodical or aperiodical report. Thereafter, the UE receives CSI-RS deactivation through MAC CE at step 3640, and the MAC transfers time point information (subframe number upon receiving the MAC CE) that receives MAC CE to the physical layer at step 3645. When Y ms (e.g., 8 ms) has elapsed after receiving the time point information, the UE deactivates CSI-RS reception and CSI-RS report at step 3650. When the CSI-RS is received for Y ms, the information is effective.

When the UE analyzes CSI-RS configuration information received from the eNB to determine to perform a Type 3 operation at step 3610, the UE performs an operation in an aperiodic CSI-RS mode. That is, the UE determines an actually activated resource among CSI-RS resources set through MAC CE reception at step 3555. When the UE receives an instruction of a CSI-RS activation resource through the MAC CE, the UE perform a CSI-RS activation operation (CSI-RS reception) after X ms (e.g., 8 ms). Since a corresponding operation is performed after X ms when MAC CE is successfully received, the MAC transfers time point information (subframe number upon receiving the MAC CE) that receives the MAC CE to the physical layer at step 3660, prepares interference measurement, prepares to report a CSI-RS measurement value according to a CSI-RS report method determined by the eNB at step 3665, and monitors CSI-RS reception in a subframe that receives DCI at step 3670. The report method may include an aperiodic report.

Thereafter, the UE receives CSI-RS deactivation through the MAC CE at step 3675, and the MAC transfers time point information (subframe number upon receiving the MAC CE) that receives the MAC CE to the physical layer at step 3680. When Y ms (e.g., 8 ms) has elapsed after receiving the time point information, the UE deactivates CSI-RS reception and CSI-RS report at step 3685. When the CSI-RS is received for Y ms, the information is effective.

Figure 37:
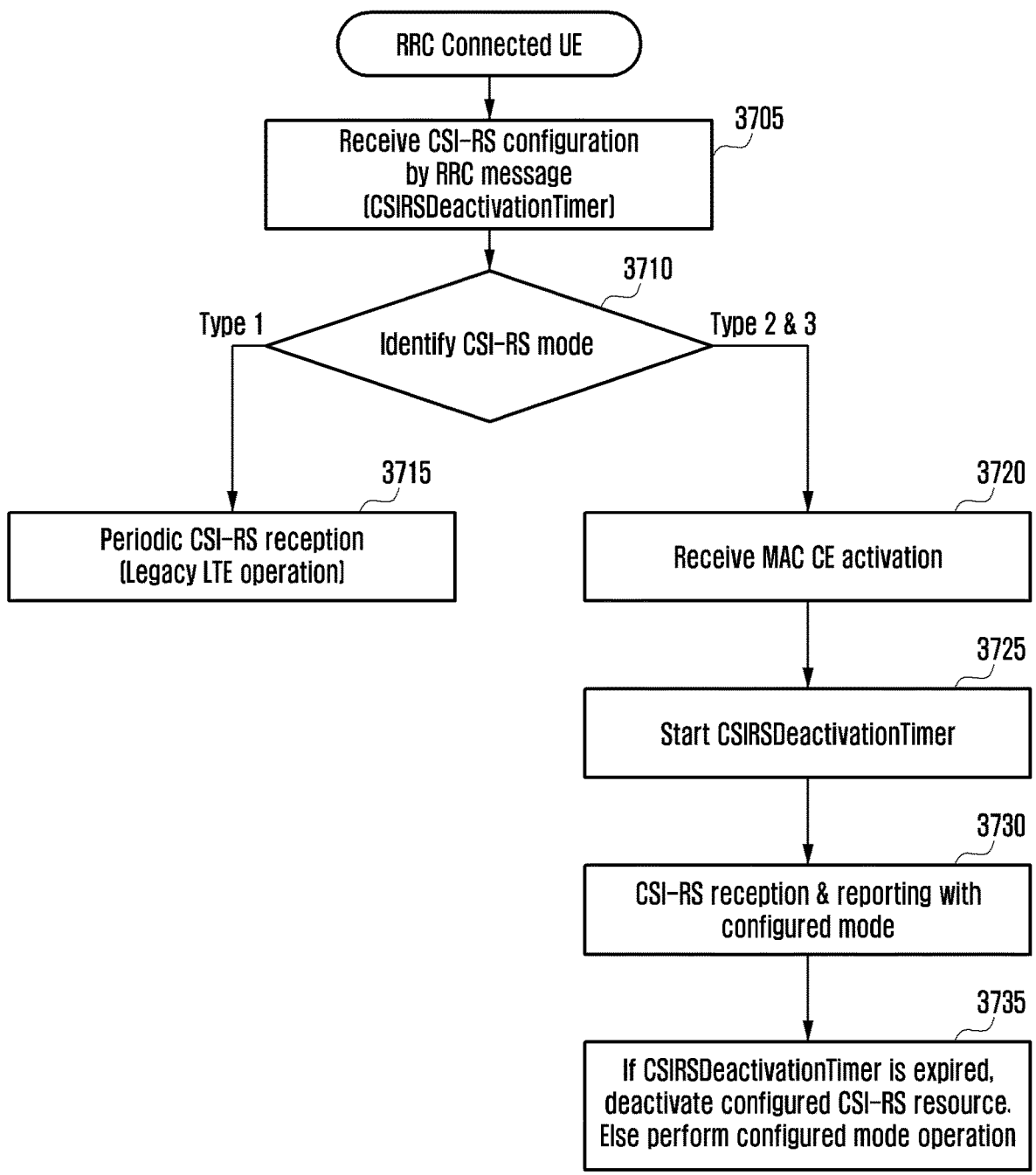
FIG. 37 illustrates a method of using a counter in a CSI-RS activation and deactivation operation using a MAC CE, according to an embodiment.

FIG. 37 illustrates a method of using a counter in a CSI-RS activation and deactivation operation using a MAC CE according to an embodiment.

An operation may be specified as another embodiment of execution of an entire operation of the terminal in FIG. 36, when a timer such as a sCellDeactivationTimer is introduced. The UE of an RRC connection state receives a CSI-RS configuration from the eNB at step 3705. A CSI-RS resource is changed according to a type of the CSI-RS configuration, and a terminal operation is changed since the eNB differently performs a transmission operation.

The UE analyzes CSI-RS configuration information received from the eNB to determine a CSI-RS type at step 3710. Type 1 is a conventional periodic CSI-RS receiving operation at step 3715 and may be distinguished based on an identification method according to the CSI-RS config method.

When it is determined to perform Type 2 or 3 through CSI-RS configuration information, the UE may receive MAC CE to determine the activated CSI-RS resource at step 3720. The UE starts a CSIRSdeactivationtimer when receiving the MAC CE. The CSIRSdeactivationtimer is driven on each cell basis in which a CSI-RS resource or a CSI process is set (or is driven in each CSI process), the start or restart of the timer is performed at a receiving time of the MAC CE that activates the resource, and the UE deactivates the resource when the timer is expired at step 3735. The UE may manage the timer on a CSI-RS resource basis.

Embodiment 3-2

Figure 38A:
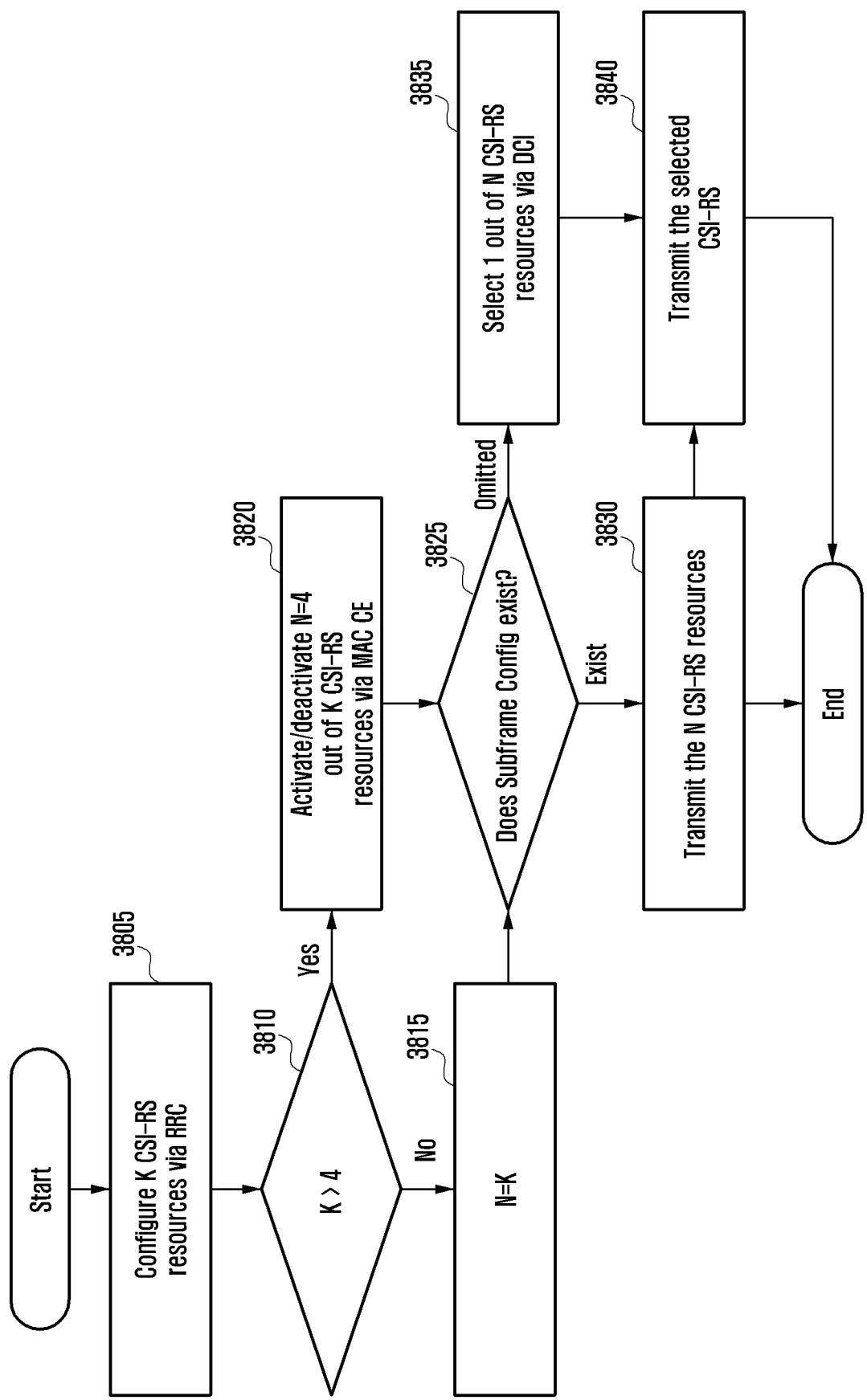
FIG. 38A illustrates an aperiodic CSI-RS and multi-shot CSI-RS transmission procedure according to an embodiment.

FIG. 38A illustrates an aperiodic CSI-RS and multi-shot CSI-RS transmission procedure according to an embodiment 3-1. The eNB may set the K number of CSI-RSs through RRC signaling at step 3805, on a CSI process basis in an LTE system or on CSI resource setting basis in an NR access network (or network 5G). Thereafter, the UE determines whether activation or deactivation is set in the N (<K) number of CSI-RS resources among the K number of CSI-RS resource. For this reason, the UE determines whether K, which is the number of CSI-RSs set through RRC signaling is less than or equal to 4 at step 3810.

If the preset K is less than or equal to 4, the UE regards that K number of CSI-RS resources are always activated at step 3815, and indicates that N=K. If K is greater than 4, the eNB signals activation or deactivation (message) of the N (=4) number of CSI-RS resources among the K number through the MAC CE by embodiment 3-1 at step 3820. Thereafter, the eNB determines whether subframeconfig information exists in CSI-RS IE set to an RRC at step 3825, and if subframeconfig information exists, the eNB and the UE ensure this to the multi-shot CSI-RS and perform CSI-transmission and reception of the N number of CSI-RS resources at step 3830.

If subframeconfig information does not exist in CSI-RS IE set to the RRC, the eNB and the UE promise this to aperiodic CSI-RS. The eNB may notify the UE through the DCI of one CSI-RS resource aperiodically transmitted among the N number of CSI-RS resources set to the MAC CE at step 3835. In this case, in aperiodic transmission and measurement of a single CSI-RS resource, one DCI code point may instruct a plurality of CSI-RS resources, but since each CSI-RS resource is connected to individual CSI reporting, only one aperiodic CSI-RS transmission may be performed per aperiodic CSI reporting. Thereafter, the eNB and the UE perform aperiodic transmission and reception of the selected CSI-RS resource at step 3840.

Figure 38B:
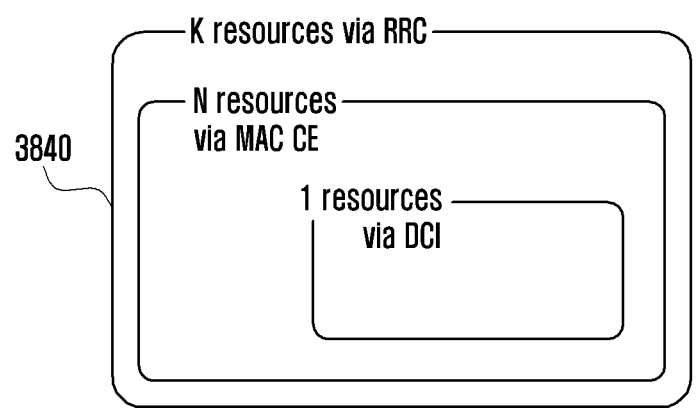
FIG. 38B illustrates an inclusion relationship of a CSI-RS of FIG. 38A.

FIG. 38B illustrates an inclusion relationship of a CSI-RS of FIG. 38A. The K number of CSI-RS resources 3840 set to RRC signaling include the N number of CSI-RS resources activated or deactivated using MAC CE, and the N number of CSI-RS resources may include one CSI-RS resource instructed through DCI.

Figure 39A:
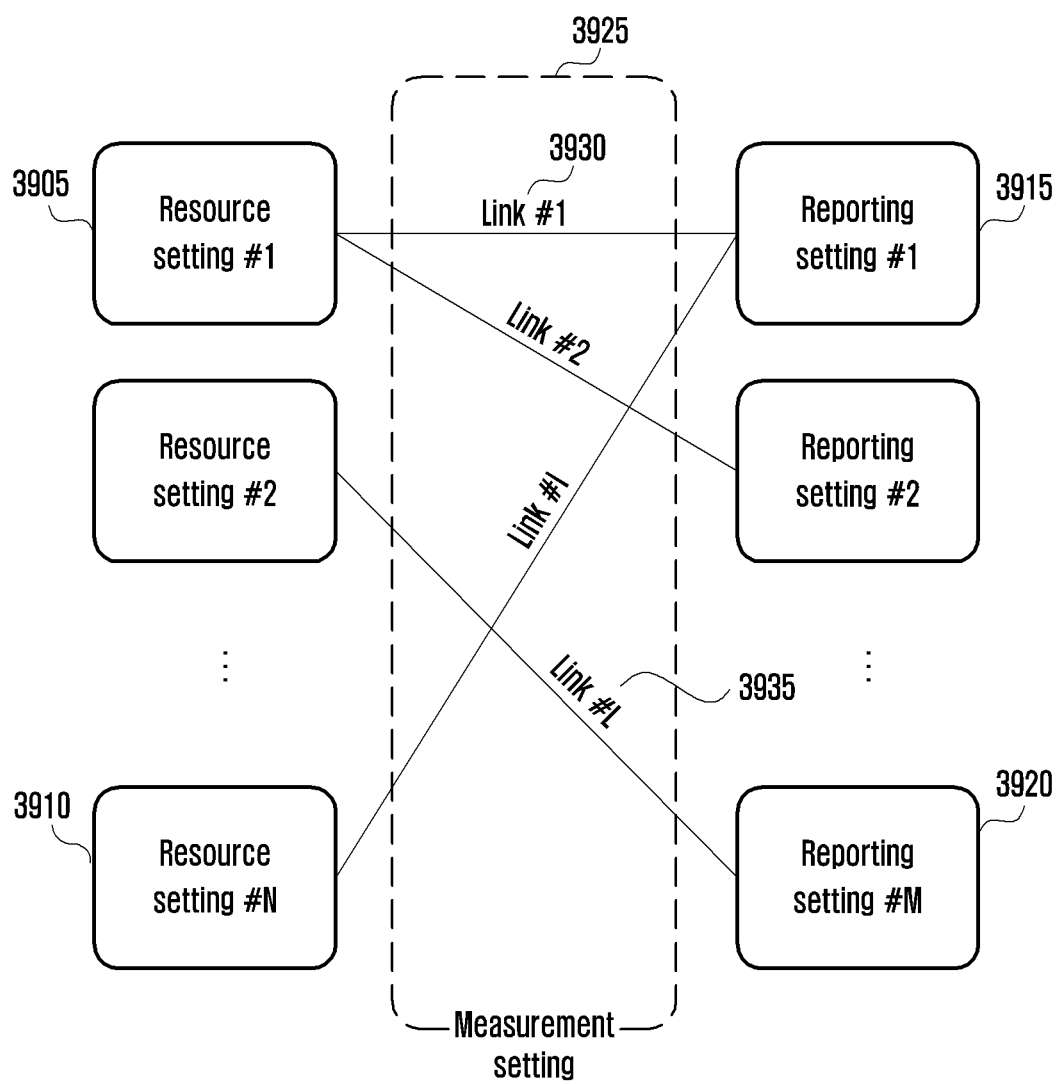
FIGS. 39A and 39B illustrate an example in which a CSI-RS and reporting are set in an NR system, according to an embodiment.
Figure 39B:
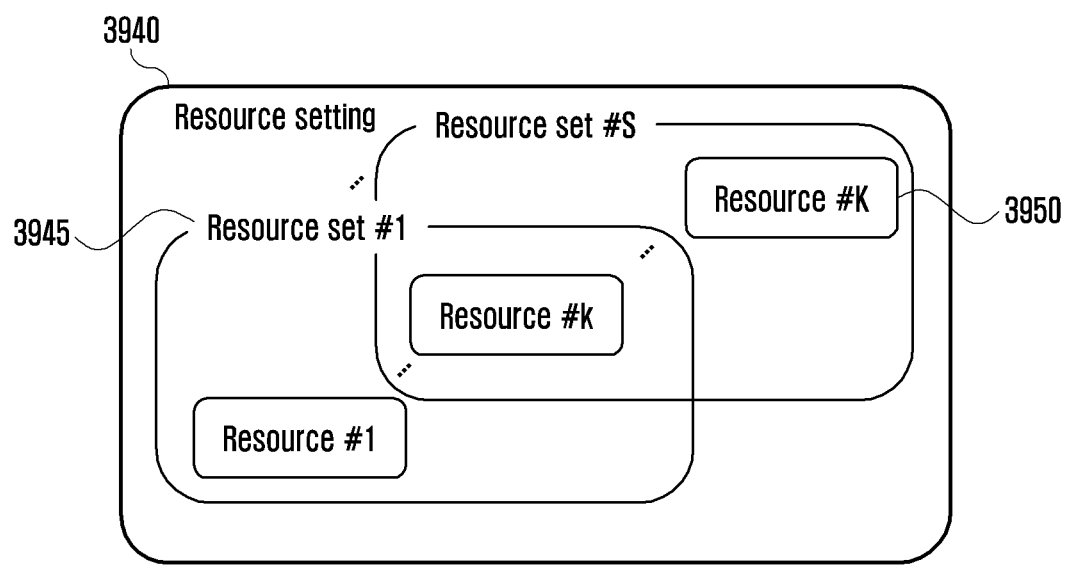

FIGS. 39A and 39B illustrate an example in which a CSI-RS and reporting are set in an NR system, according to an embodiment. In an LTE system, at least one CSI process is set and at least one CSI-RS resource setting information and CSI reporting information is included in each CSI process. The UE performs CSI generation and reporting based on the CSI reporting information. However, in an NR system, the UE may determine information about at least one CSI-RS resource through the N number of resource settings 3905 and 3910 and determines setting information about at least one CSI reporting through the M number of CSI reporting settings 3915 and 3920. In this case, as shown in FIG. 39B, one resource setting 3940 may include at least one CSI-RS resource set 3945 configured with at least one CSI-RS resource 3950.

The UE may determine information about the L number of links 3930 and 3935 for providing a relation between one resource setting and one report setting through the measurement setting 3925. In order to indicate a frequency and/or time resource for the aperiodic CSI-RS transmission, an indicator related to the resource setting may be used or an indicator related to a link of the measurement setting may be used. Therefore, in the following description, selection/instruction of a CSI-RS resource may be represented with selection or instruction of a resource setting index or a link index.

Embodiment 3-2 provides methods for extending aperiodic transmission and measurement of a single CSI-RS resource in embodiment 3-1 to aperiodic transmission and measurement of multi-CSI-RS resources. In order to support aperiodic transmission and measurement of multi-CSI-RS resources, designation of a plurality of aperiodically transmitted CSI-RS resources is required, and methods for reducing an overhead are required when an L1 signaling capability (or DCI payload) therefor is insufficient. In the following description, a portion of a multi-shot CSI-RS other than an aperiodic CSI-RS will be omitted for convenience of description.

A first method sets a subgroup configured with a plurality of aperiodic CSI-RS resources (e.g., transmitted within the same slot or transmission is designated by the same DCI) having the same transmission timing or the same L1 signaling timing through MAC CE signaling. The CSI-RS resource subgroup may be variously expressed according to a situation such as a resource and a link subgroup.

Figure 40A:
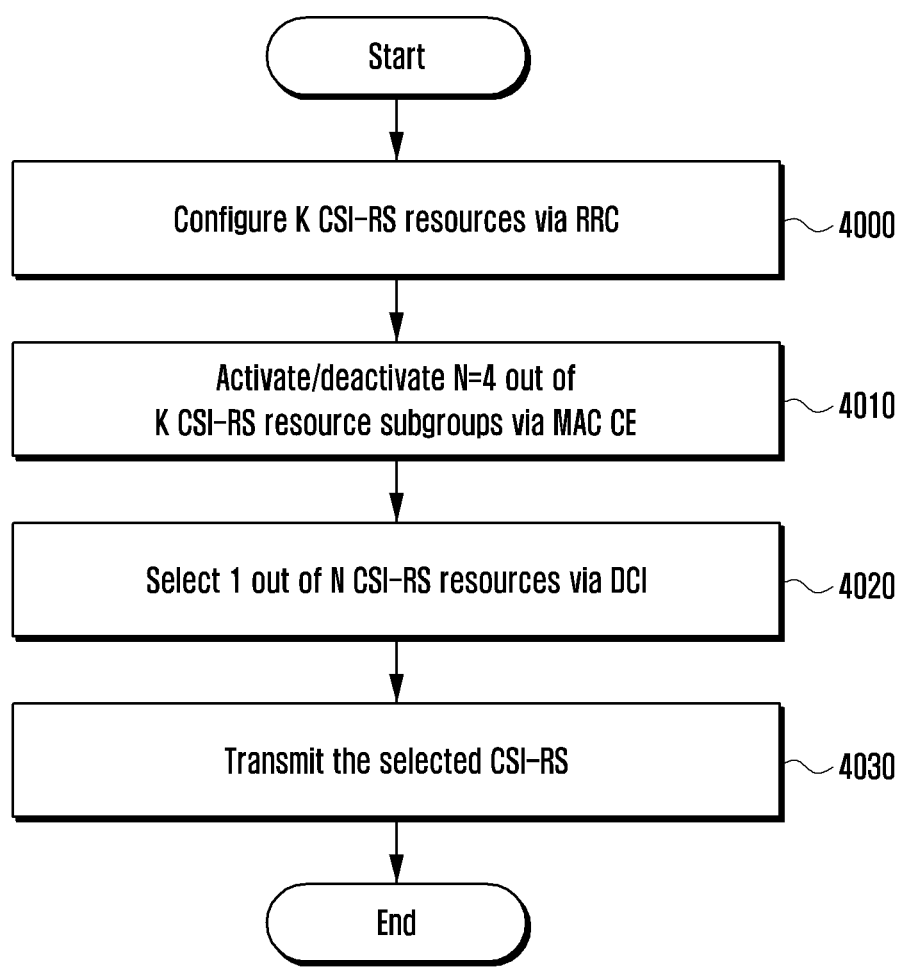
FIG. 40A illustrates a detailed procedure of a first method; according to an embodiment.

FIG. 40A illustrates a detailed procedure of a first method according to embodiment 3-2. The eNB may set the K number of CSI-RSs through RRC signaling at step 4000. If K is greater than a specific constant, the eNB signals activation or deactivation of the N number of CSI RS resource subgroups among the K number through MAC CE at step 4010. In one embodiment, N may be 4. In this case, each CSI-RS resource subgroup includes at least one CSI-RS resource of the K number of CSI-RS resources set to the RRC. Thereafter, the eNB may notify the terminal through DCI of one CSI-RS resource subgroup aperiodically transmitted among the N number of CSI-RS resource subgroups set to the MAC CE at step 4020. In this aperiodic transmission and measurement of a single-CSI-RS resource subgroup, one DCI code point may indicate a plurality of CSI-RS resource subgroups including a plurality of CSI-RS resources, but each CSI-RS resource subgroup is connected to individual CSI reporting. Thereafter, the eNB and the UE perform aperiodic transmission and reception of the CSI-RS resources included in the selected CSI-RS resource subgroup at step 4030.

Figure 40B:
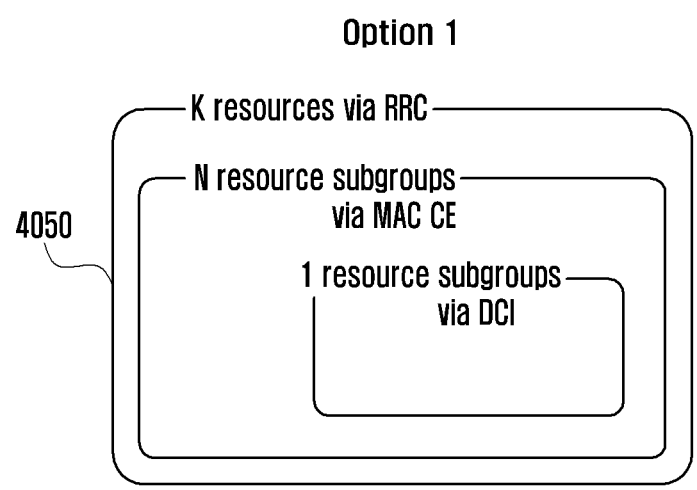
FIG. 40B illustrates an inclusion relationship of a CSI-RS resource according to a first method.

FIG. 40B illustrates an inclusion relationship of a CSI-RS resource according to the first method, in which the relationship of a resource by RRC, MAC CE, and DCI setting is shown in 4050. That is, the K number of CSI-RS resources set to RRC signaling may include the N number of CSI-RS resource subgroups set to the MAC CE, and DCI may instruct one CSI-RS resource subgroup among the subgroups.

In the first method, CSI-RS resource subgroup setting through MAC CE may be performed through the following options. Option 1a sets a two-dimensional bitmap of the subgroup number. For example, a first dimension of a bitmap may indicate selection of the K number of CSI-RS resources set to an RRC, as in embodiment 3-1, and a second dimension of a bitmap may indicate selection of the N number of CSI-RS resource subgroups activated or deactivated with the MAC CE. Option 1b designates a CSI-RS resource subgroup through a bitmap group or an alphabetical sequence. For example, when the K (=8) number of CSI-RS resources were set to an RRC, it is assumed that the N (=3) number of resource subgroups may be set through A, B, and C. In this case, the UE may recognize that the first and the second resources are included in a subgroup A and that the third and fourth resources are included in a subgroup B and that the fifth resource is included in a subgroup C and that six, seventh, and eighth resources are not activated through MAC CE setting such as [AABBC 0 0 0].

Figure 41A:
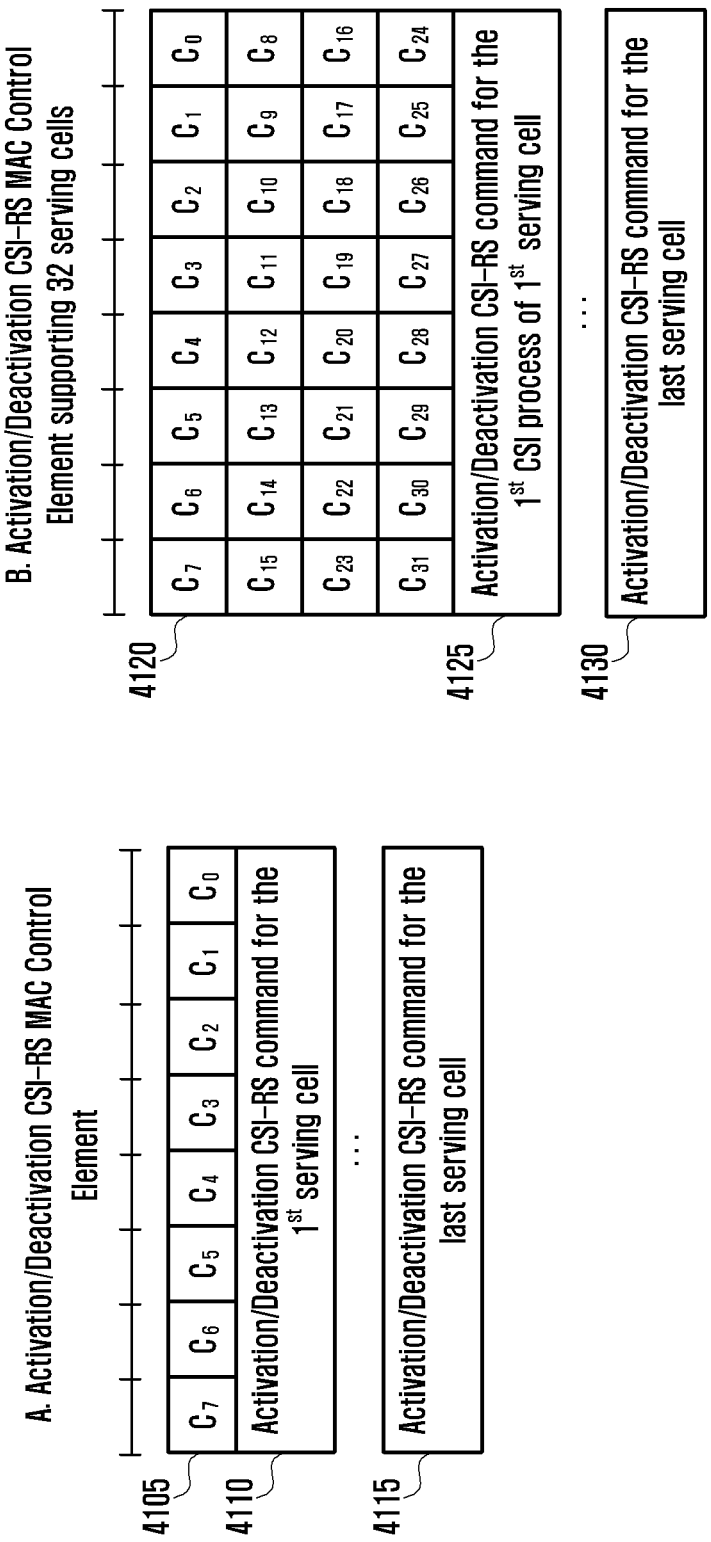
FIGS. 41A and 41B illustrate an example of signaling for activation and deactivation of a CSI-RS resource subgroup through MAC CE in the first method.
Figure 41B:
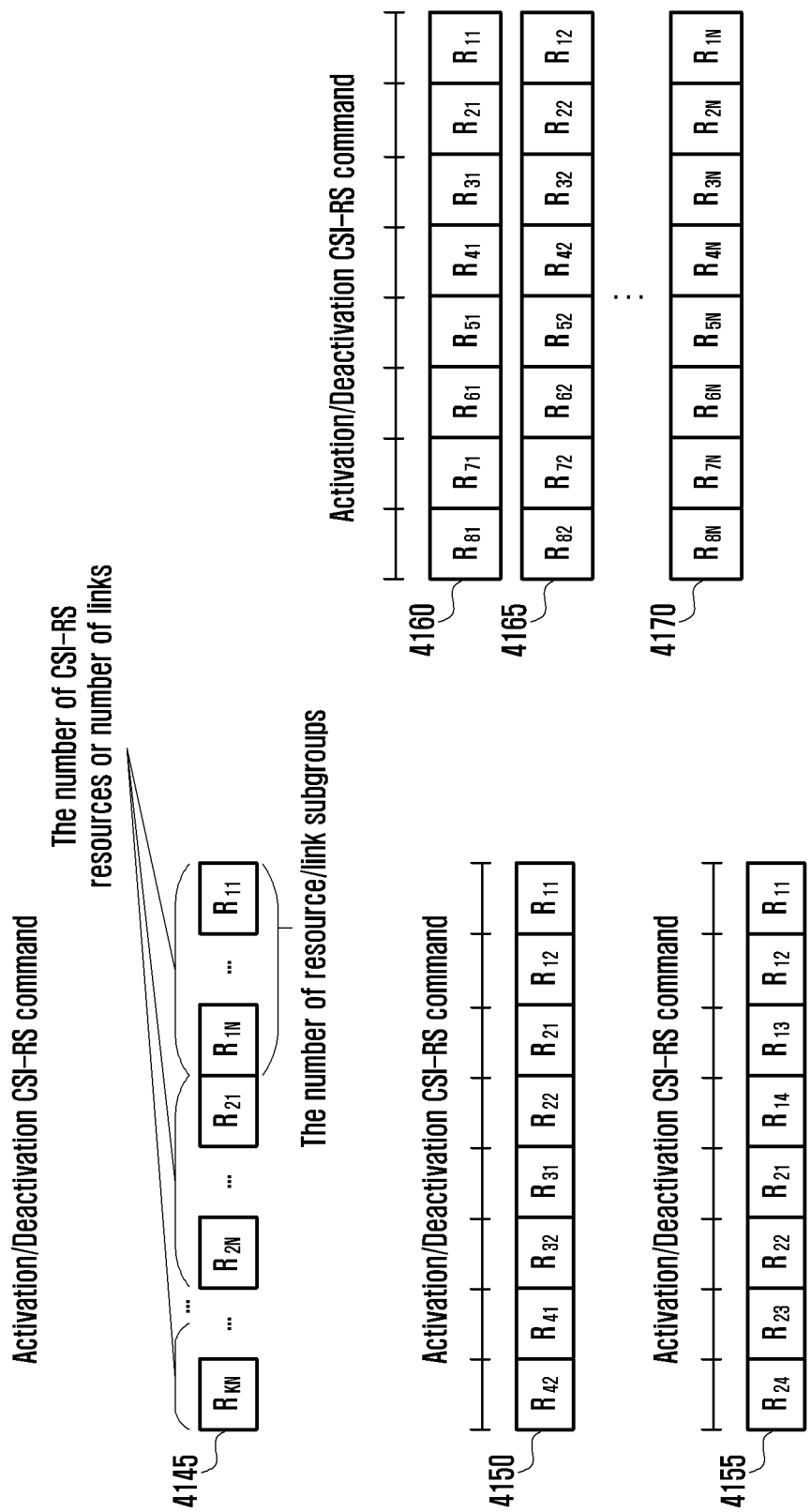

FIGS. 41A and 41B illustrate an example of signaling for activation and deactivation of a CSI-RS resource subgroup through MACE CE in the first method. In the method, one MAC CE transmitted by the eNB includes activation and deactivation commands for all serving cells and the method may be divided into two models according to the number of the serving cell having a CSI-RS resource set as shown in FIG. 41A. In the foregoing description, a first model (A of FIG. 41A) is when the number of serving cells (a serving cell having a high index in a servcellindex) having a preset CSI-RS resource is 8 or less, and in order to instruct this, a field ($C_i$, 4105) of 1-byte is used. In the foregoing description, a second model (B of FIG. 41A) is when the number of (a serving cell having a high index in a servcellindex) serving cells having a preset CSI-RS resource is greater than 8, which is indicated by using fields ($C_i$, 4120) of 4 bytes, to support maximum 32 serving cells. In the above design, a format is determined based on an index of a serving cell to which the CSI-RS resource is set.

Fields (Ri, 4110, 4115, 4125, and 4130) indicating a CSI-RS resource activated or deactivated on a serving cell basis are used. The CSI-RS resource subgroup command is instructed only to the activated serving cells, and may be configured with one-dimensional fields $R_{ij}$ such as 4145 of FIG. 41 or may be configured with two-dimensional fields $R_{ij}$ such as {4160, 4165, 4170}.

In 4145, a one-dimensional field may be configured with the total KN number of bits to represent whether the K number of CSI-RS resources are included in the N number of CSI-RS resource subgroups. For example, when the K number of CSI-RS resources are set to an RRC and when the N number of CSI-RS resource subgroups are configured based on this setting, in 4145, the i-th N number of bit groups {$R_{i1}, \ldots R_{ij}, R_{iN}$} may be used for representing activation or deactivation of an i-th CSI-RS resource. In this example, 4150 indicates a 1 byte MAC CE signaling example of a case {K=4, N=2}, and in this example, 4155 indicates a 1 byte MAC CE signaling example of a case {K=2, N=4}.

In {4160, 4165, 4170}, a two-dimensional field may be formed with the N number of bitmaps consisting of the K number of bits, to represent whether the K number of CSI-RS resources are included in the N number of CSI-RS resource subgroups. For example, when K=8, 1 byte signaling 4160, 4165, and 4170 may be used for representing activation or deactivation of a CSI-RS resource for the first, second, and the N-th CSI-RS subgroups, respectively.

MAC CE for activation and deactivation of the CSI-RS may be defined as follows:

$C_i$: This field indicates the presence of activation/deactivation CSI-RS command(s) for the serving cell with servcellindex i. The $C_i$ field set to "1" indicates that Activation/Deactivation CSI-RS command(s) for the serving cell with servcellindex i are included. The $C_i$ field set to "0" indicates that no Activation/Deactivation CSI-RS command for the serving cell with servcellindex i is included.

$R_i$: This field indicates the activation/deactivation status of the CSI-RS resource associated with CSI-RS-configNZPId i In the foregoing description, $R_i$ corresponds to CSI-RS-configNZPId. That is, transmission power allocated to a corresponding serving cell indicates a CSI-RS resource instead of 0.

When one MAC CE transmitted by the eNB is defined to serving cell specific, the MAC CE may include only activation and deactivation commands for the serving cell. The above design includes only a command for the serving cell in which MAC CE for CSI-RS activation and deactivation is received. In this case, as shown FIG. 41A, it is unnecessary to instruct an index of the serving cell (i.e. 4105 or 4120 is omitted), and only fields ($R_i$, 4110, 4115, 4125, 4130) instructing a CSI-RS resource activated and deactivated on a CSI process basis of the serving cell may be used.

A second method selects a CSI-RS resource subgroup for the aperiodic CSI-RS transmission through DCI by a rule previously determined by a specification or subgroup configuration information previously determined by an RRC.

Figure 42A:
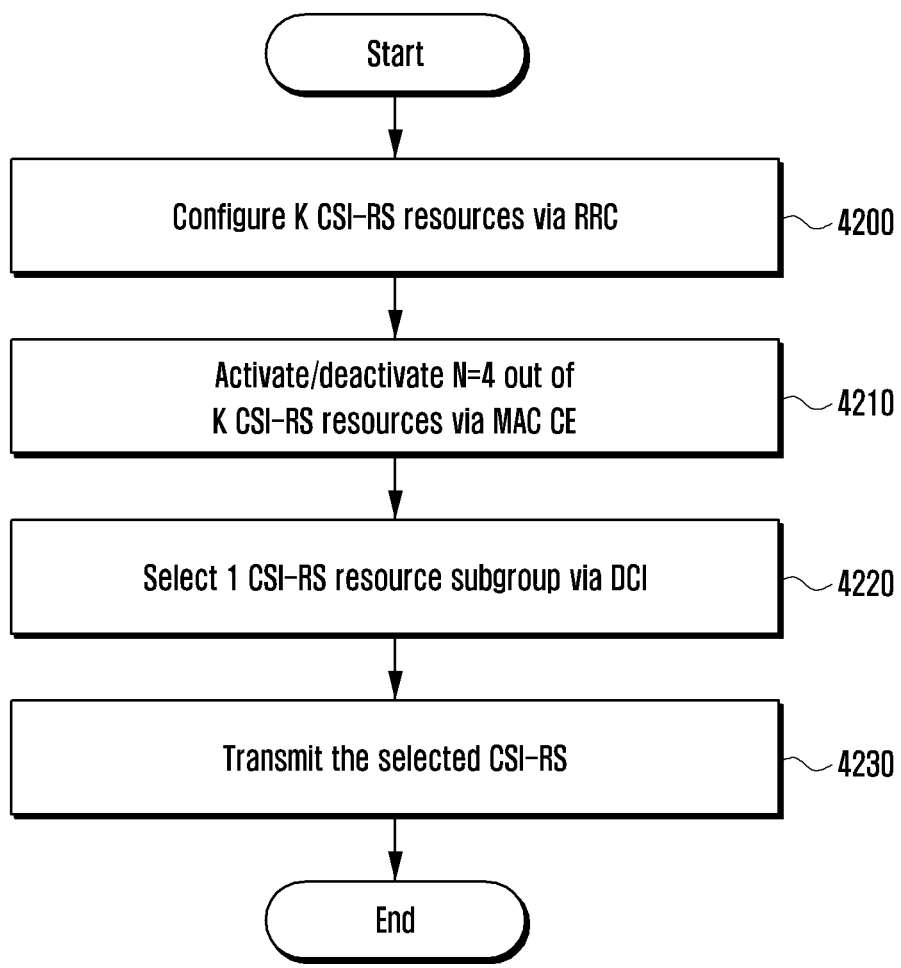
FIG. 42A illustrates a detailed procedure of the second method according to an embodiment.

FIG. 42A illustrates a detailed procedure of the second method according to embodiment 3-2. The eNB may set the K number of CSI-RSs through RRC signaling at step 4200. If K is greater than a specific constant, the eNB signals activation or deactivation (message) of the N number of CSI-RS resources of among the K number through MAC CE at step 4210. In one embodiment, N may be 4. Thereafter, the eNB may notify the UE through the DCI of one CSI-RS resource subgroup aperiodically transmitted among a plurality of CSI-RS resource subgroup including at least one CSI-RS resource among the N number of CSI-RS resources set to the MAC CE at step 4220. In this aperiodic transmission and measurement of the single-CSI-RS resource subgroup, one DCI code point may indicate a plurality of CSI-RS resource subgroups including a plurality of CSI-RS resources, but each CSI-RS resource subgroup is connected to individual CSI reporting. Thereafter, the eNB and the UE perform aperiodic transmission and reception of CSI-RS resources included in a selected CSI-RS resource subgroup at step 4230.

Figure 42B:
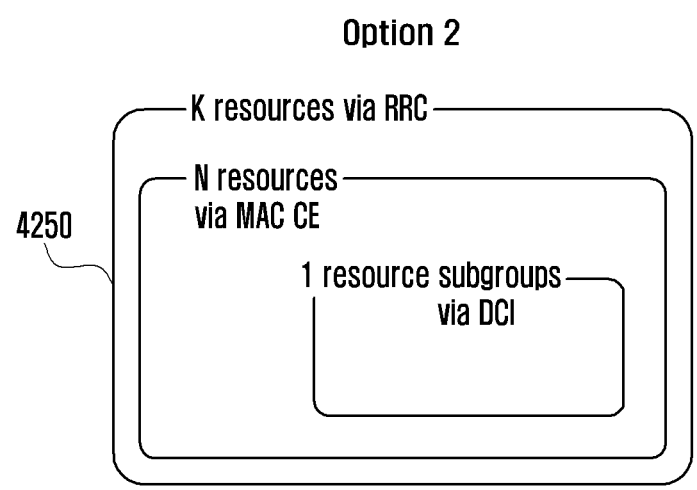
FIG. 42B illustrates an inclusion relationship of a CSI-RS resource according to the second method.

FIG. 42B illustrates a relationship between the CSI-RS contained resources according to the second method, in which the relationship of the resource by the RRC, MAC CE, and DCI setting is shown in 4250. That is, the K number of CSI-RS resources set to RRC signaling may include N number of CSI-RS resources set to the MAC CE, and the DCI may instruct to one CSI-RS resource subgroup among them.

In the second method, a CSI-RS resource subgroup configured with at least one CSI-RS resource of CSI-RS resources activated or deactivated through MAC CE may be set through the following options. Option 2a pre-designates a subgroup setting method by a specification. For example, when N=2, by designating a rule of Table 10 below, it is possible to instruct aperiodic CSI-RS transmission to a CSI-RS resource subgroup with 2-bit DCI. According to Table 10, a DCI code point '00' indicates that aperiodic CSI-RS transmission is not performed, a DCI code point '01' indicates that a first (having lowest RRC setting order or having a lowest CSI-RS or link ID) CSI-RS activated by MAC CE is aperiodically transmitted, a DCI code point '10' indicates that a second (having a second RRC setting order or having a second CSI-RS or link ID) CSI-RS activated by MAC CE is aperiodically transmitted, and a DCI code point '11' indicates that all CSI-RSs activated by MAC CE is aperiodically transmitted.

TABLE 10

| DCI bits for N = 2 | Contents |
| --- | --- |
| 00 | No aperiodic CSI-RS transmission |
| 01 | aperiodic CSI-RS in config #1 |
| 10 | aperiodic CSI-RS in config #2 |
| 11 | aperiodic CSI-RS in config #1 and #2 |

Option 2a may be extended according to a possible DCI payload, and DCI signaling method, and the number of activated or deactivated resources. For example, when an independent 3 bit DCI payload is available and when activated or deactivated CSI-RS/link number N=4, it is possible to instruct aperiodic CSI-RS transmission of a CSI-RS resource subgroup with 3 bit DCI by designating a rule as shown in Table 11 below. According to Table 11, a DCI code point '00' indicates that aperiodic CSI-RS transmission is not performed, and subsequent DCI code points may promise to select a CSI-RS resource aperiodically transmitted in RRC setting order or in ascending or descending order of a CSI-RS or link ID among CSI-RS resources activated by MAC CE.

TABLE 11

| DCI bits for N = 4 | Contents |
| --- | --- |
| 000 | No aperiodic CSI-RS transmission |
| 001 | aperiodic CSI-RS in config #1 |
| 010 | aperiodic CSI-RS in config #2 |
| 011 | aperiodic CSI-RS in config #3 |
| 100 | aperiodic CSI-RS in config #4 |
| 101 | aperiodic CSI-RS in config #1 and #2 |
| 110 | aperiodic CSI-RS in config #2 and #3 |
| 111 | aperiodic CSI-RS in config #3 and #4 |

Option 2b previously designates subgroup setting information through the RRC. For example, when N=2, by designating a rule of Table 12 below, it is possible to instruct aperiodic CSI-RS transmission of a CSI-RS resource subgroup with 2-bit DCI. According to Table 12, a DCI code point '00' indicates that aperiodic CSI-RS transmission is performed in a CSI-RS resource subgroup #1 set to the RRC, a DCI code point '01' indicates that aperiodic CSI-RS transmission is performed in a CSI-RS resource subgroup #2 set to the RRC, a DCI code point "10" indicates that aperiodic CSI-RS transmission is performed in a CSI-RS resource subgroup #3 set to the RRC, and a DCI code point '11' indicates that aperiodic CSI-RS transmission is performed in a CSI-RS resource subgroup #4 set to the RRC. Each CSI-RS resource subgroup information set to the RRC may be defined in relative setting order of the activated/deactivated CSI-RS resource to the MAC CE. It may be ensured that aperiodic CSI-RS transmission of a specific RRC setting value (e.g., such as 00 . . . 0") of the CSI-RS resource subgroup is not performed.

TABLE 12

| DCI bits for N = 2 | Contents |
| --- | --- |
| 00 | aperiodic CSI-RS in subgroup #1 |
| 01 | aperiodic CSI-RS in subgroup #2 |
| 10 | aperiodic CSI-RS in subgroup #3 |
| 11 | aperiodic CSI-RS in subgroup #4 |

Option 2b is extended according to a possible DCI payload, a DCI signaling method, and the number of resources that are activated or deactivated. According to Table 13 below, a DCI code point "000" indicates that aperiodic CSI-RS transmission for a CSI-RS resource subgroup #1 of first serving cells set to an RRC is performed, and '001' indicates that aperiodic CSI-RS transmission for a CSI-RS resource subgroup #2 of second serving cells set to an RRC is performed. A description of the remaining DCI code points is similar thereto and thus will be omitted. In this case, each CSI-RS resource subgroup information set to an RRC may be defined to relative setting order for CSI-RS resources activated or deactivated to a MAC CE.

TABLE 13

| DCI bits for N = 3 | Contents |
| --- | --- |
| 000 | aperiodic CSI-RS in subgroup #1 for a 1st set of serving cells configured by higher layers |
| 001 | aperiodic CSI-RS in subgroup #2 for a 2nd set of serving cells configured by higher layers |
| 010 | aperiodic CSI-RS in subgroup #3 for a 3rd set of serving cells configured by higher layers |
| 011 | aperiodic CSI-RS in subgroup #4 for a 4th set of serving cells configured by higher layers |
| 100 | aperiodic CSI-RS in subgroup #5 for a 5th set of serving cells configured by higher layers |
| 101 | aperiodic CSI-RS in subgroup #6 for a 6th set of serving cells configured by higher layers |
| 110 | aperiodic CSI-RS in subgroup #7 for a 7th set of serving cells configured by higher layers |
| 111 | aperiodic CSI-RS in subgroup #8 for a 8th set of serving cells configured by higher layers |

FIG. 43 illustrates an example of signaling CSI-RS subgroup setting through RRC signaling when applying the second method. In FIG. 43, the eNB may map available CSI-RS subgroup combinations through the total E number of RRC code points. The UE may determine a relation between an RRC signaled Ue and CSI-RS and link IDs through the mapping. FIG. 43 illustrates when code points of 4305 indicate one CSI-RS subgroup and in which code points of 4310 indicate two CSI-RS subgroups and in which code points of 4305 indicate the N number of CSI-RS subgroups.

The third method instructs aperiodic CSI-RS transmission by directly indicating two or more CSI-RS resources through DCI.

Figure 44A:
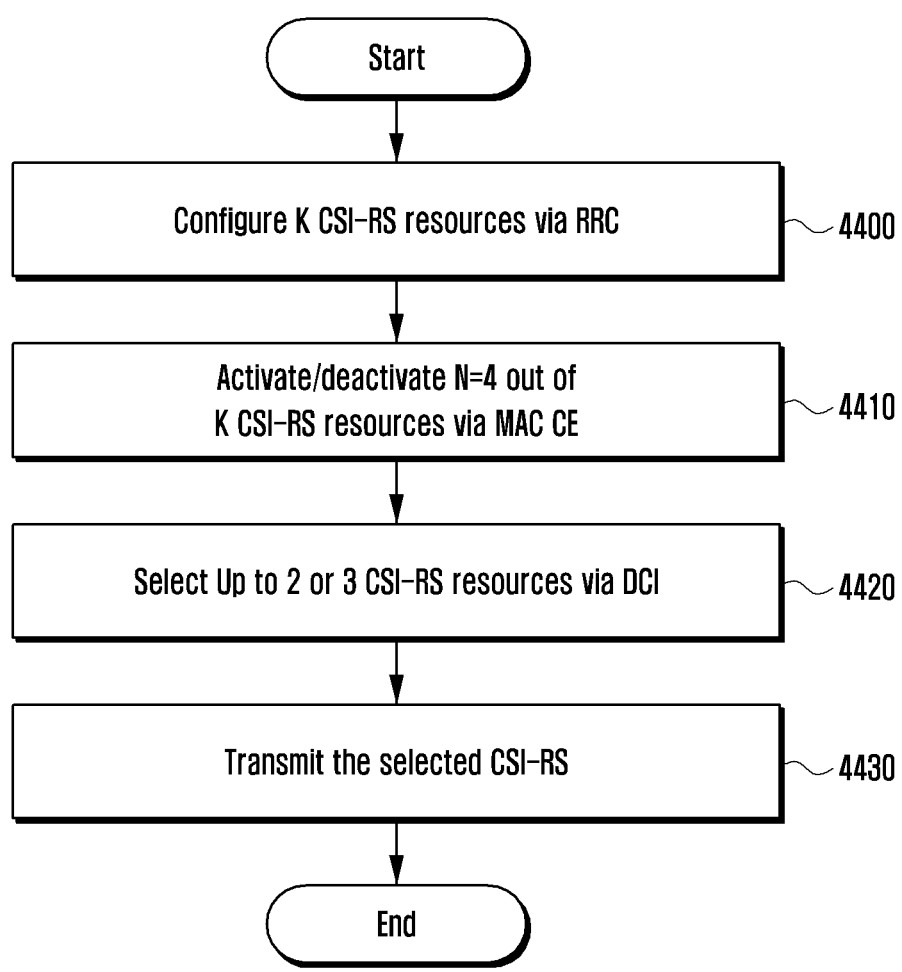
FIG. 44A illustrates a detailed procedure of a third method according to an embodiment.

FIG. 44A illustrates a detailed procedure of a third method of embodiment 3-2. The eNB may set the K number of CSI-RSs through RRC signaling at step 4400. When K is greater than a specific constant, the eNB signals activation or deactivation of the N number of CSI-RS resources among the K number through MAC CE at step 4410. In one embodiment, N may be 4. Thereafter, the eNB may notify the terminal through DCI whether a plurality of CSI-RS resources including the maximum K number (e.g., two or three) of CSI-RS resources among the N number of CSI-RS resources set to the MAC CE are aperiodically transmitted at step 4420. The eNB and the UE perform aperiodic transmission or reception of the CSI-RS resource included in the selected CSI-RS resource subgroup at step 4430.

In a third method, a large amount of DCI payloads may be required. For example, in N=6 and X=2, 4 bits may be required to represent the number of cases of $_6C_2=15$, which is burdensome on DCI transmission. Therefore, it is possible to ensure down-selection of some code points. Alternatively, when N=4 or less, the DCI signaling may ensure performance of aperiodic transmission of each CSI-RS resource activated or deactivated by the MAC CE with a bit map.

Figure 44B:
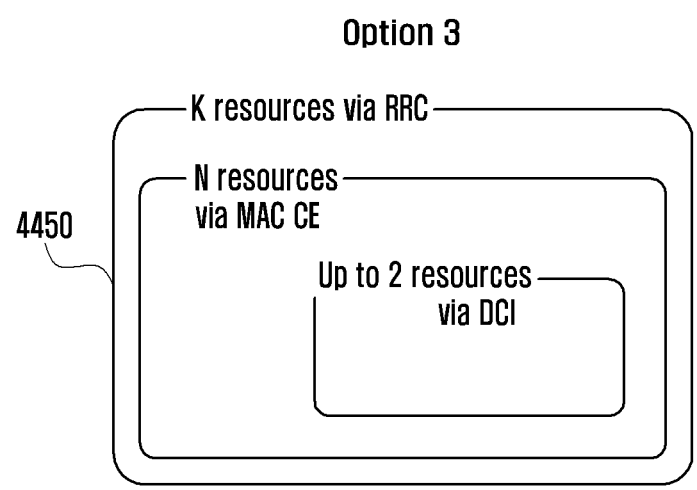
FIG. 44B illustrates an inclusion relation of a CSI-RS resource according to the third method.

FIG. 44B illustrates an inclusion relation of a CSI-RS resource according to the third method, in which a resource selection relationship by the RRC, MAC CE, and DCI setting is shown in 4450. That is, the K number of CSI-RS resources set by RRC signaling include the N number of CSI-RS resources set by the MAC CE, and DCI may instruct a plurality of CSI-RS resources among the N number of CSI-RS resources.

A fourth method is to support each of activation or deactivation and CSI-RS resource subgroup setting of an individual CSI-RS resource through the MAC CE. In the fourth method, the number N' of activated or deactivated CSI-RS resources and the number N of CSI-RS subgroups selected with DCI may be different.

Figure 45A:
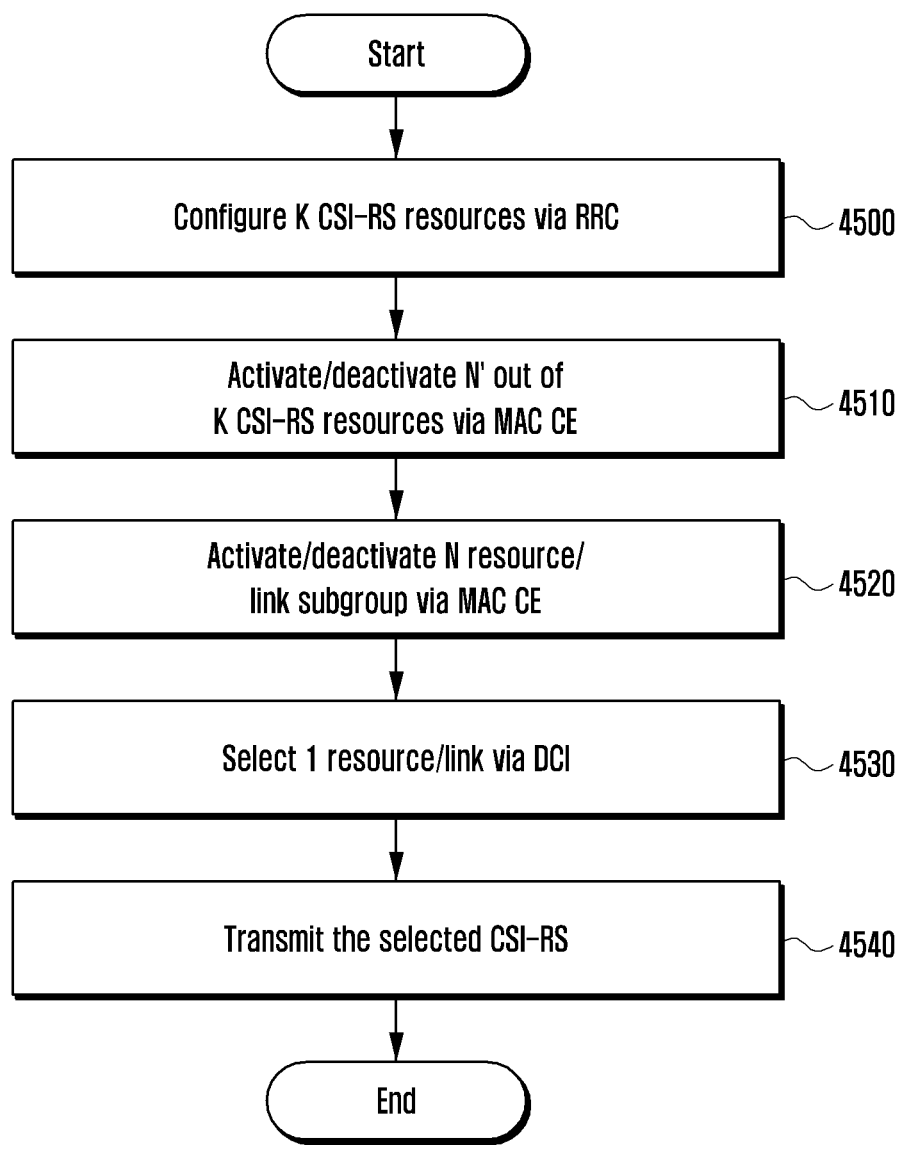
FIG. 45A illustrates a procedure of a fourth method according to an embodiment.

FIG. 45A illustrates a procedure of a fourth method according to embodiment 3-2. In FIG. 45A, the eNB may set the K number of CSI-RSs through RRC signaling at step 4500. When K is greater than a specific constant, the eNB signals activation or deactivation of the N' number of CSI-RS resources among the K number through MAC CE at step 4510. Thereafter, the eNB sets the N number of CSI-RS resource (or link) subgroups including at least one of the N' number of CSI-RS resources activated or deactivated with the MAC CE at step 4520. Thereafter, the eNB may notify the terminal through DCI one CSI-RS resource subgroup aperiodically transmitted among the N number of CSI-RS resource subgroups set to the MAC CE at step 4530. Thereafter, the eNB and the UE perform non-cyclic transmission/reception of the CSI-RS resources included in the selected CSI-RS resource subgroup at step 4540.

Figure 45B:
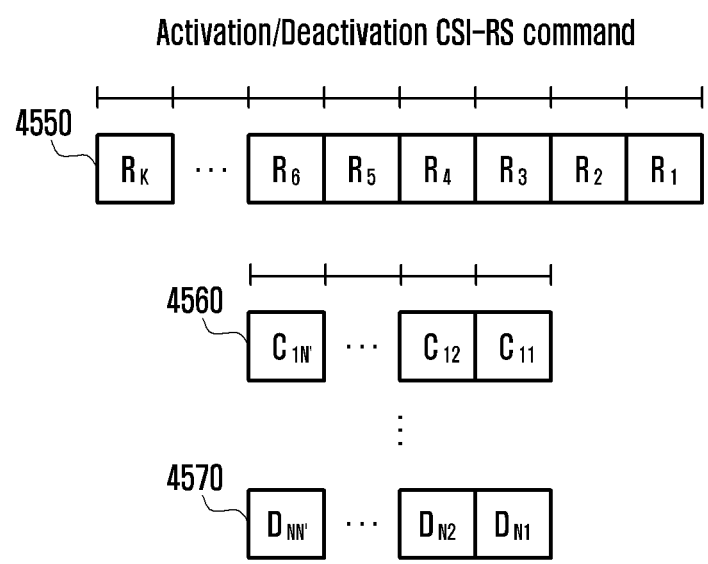
FIG. 45B illustrates an example of MAC CE signaling provided by a base station, according to an embodiment.

For the fourth method, the eNB may provide two types of MAC CE signaling. FIG. 45B illustrates an example of MAC CE signaling provided by the eNB according to an embodiment. First, the eNB provides activation or deactivation signaling of the K number of CSI-RS resources through a bit map consisting of the K number of bits at step 4550, such that the UE may know that the N' number of CSI-RS resources are activated or deactivated. The eNB sets the N number of CSI-RS subgroups including at least one of the N' number of activated CSI-RS resources based on this bitmap. For example, the eNB may notify the terminal of the N number of CSI-RS subgroup configuration information through one-dimensional bitmap configured with the N' number of bits $D_{ij}$ or the N number of two-dimensional bitmaps configured with the N' number of bits at steps 4560 and 4570. In this example, $D_{ij}$ represents whether a j-th activated CSI-RS is included in the CSI-RS subgroup of from i=1 to i=N. In this case, j may be understood as a relative value determined in an RRC setting order or in ascending or descending order of CSI-RS or link ID among CSI-RS resources activated by the MAC CE.

Figure 46:
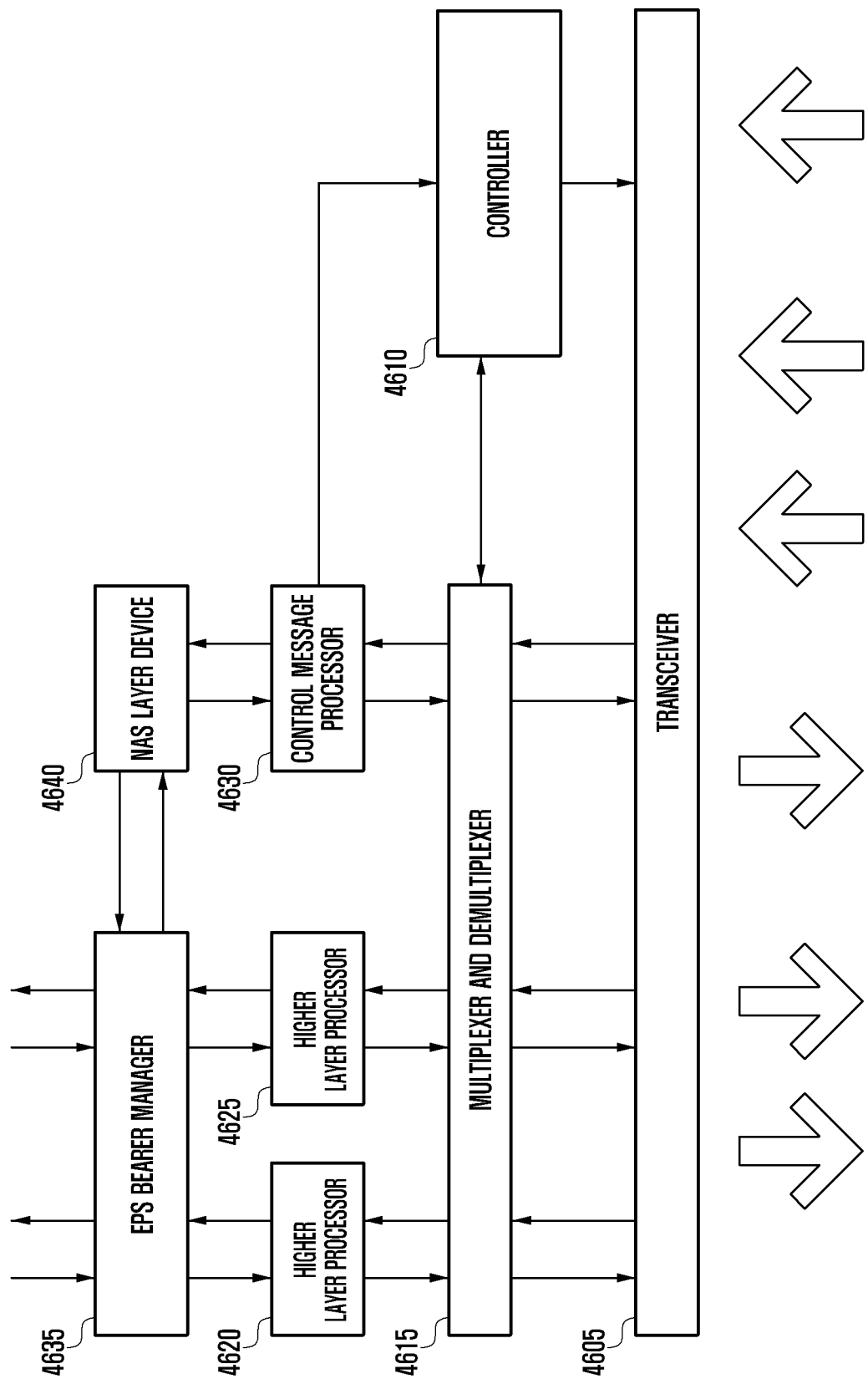
FIG. 46 illustrates a configuration of a terminal according to an embodiment.

FIG. 46 illustrates the configuration of a terminal according to an embodiment.

In FIG. 46, the terminal includes a transceiver 4605, controller 4610, multiplexer and demultiplexer 4615, control message processor 4630, various higher layer processors 4620 and 4625, evolved packet system (EPS) bearer manager 4635, and non access stratum (NAS) layer device 4640.

The transceiver 4605 receives data and a predetermined control signal with a forward channel of a serving cell and transmits data and a predetermined control signal with a backward channel. When a plurality of serving cells are set, the transceiver 4605 performs transmission and reception of data and transmission and reception of a control signal through the plurality of serving cells.

The multiplexer and demultiplexer 4615 multiplexes data generated in the higher layer processors 4620 and 4625 or the control message processor 4630 or demultiplexes data received from the transceiver 4605 to transfer the data to the appropriate higher layer processors 4620 and 4625 or the control message processor 4630.

The control message processor 4630 is an RRC layer device which processes a control message received from the eNB to perform a required operation. For example, when the control message processor 4630 receives an RRC CONNECTION SETUP message, the control message processor 4630 sets a temporary data radio bearer (DRB) with the signaling radio bearer (SRB).

The higher layer processors 4620 and 4625 indicate a DRB device that may be configured on a service basis. The higher layer processors 4620 and 4625 process data generated in a user service such as a file transfer protocol (FTP) or a voice over internet protocol (VoIP) to transfer the data to the multiplexer and demultiplexer 4615 or processes the data transferred from the multiplexer and demultiplexer 4615 to transfer the data to a higher layer service application. One service may be mapped to one to one to one evolved packet system (EPS) bearer and one higher layer processor.

The controller 4610 determines a scheduling command, such as a backward grant received through the transceiver 4605 to control the transceiver 4605 and the multiplexer and demultiplexer 4615 so that backward transmission is performed with an appropriate transmission resource at an appropriate time point. The controller 4610 may measure at least one reference signal received through the transceiver 4605, generate feedback information according to the feedback configuration information, control the transceiver 4605 to transmit the generated feedback information to the eNB at feedback timing according to the feedback configuration information, receive a CSI-RS from the eNB, generate feedback information based on the received CSI-RS, and transmit the generated feedback information to the eNB. In this case, the controller 4610 may select a precoding matrix on each antenna port group basis of the eNB and further select one additional precoding matrix based on the relationship between antenna port groups of the eNB.

The controller 4610 may receive a CSI-RS from the eNB, generate feedback information based on the received CSI-RS, and transmit the generated feedback information to the eNB. In this case, the controller 4610 may select one precoding matrix for all antenna port groups of the eNB. The controller 4610 may receive feedback configuration information from the eNB, generate a CSI-RS from the eNB, generate feedback information based on the received feedback configuration information and the received CSI-RS, and transmit the generated feedback information to the eNB.

Figure 47:
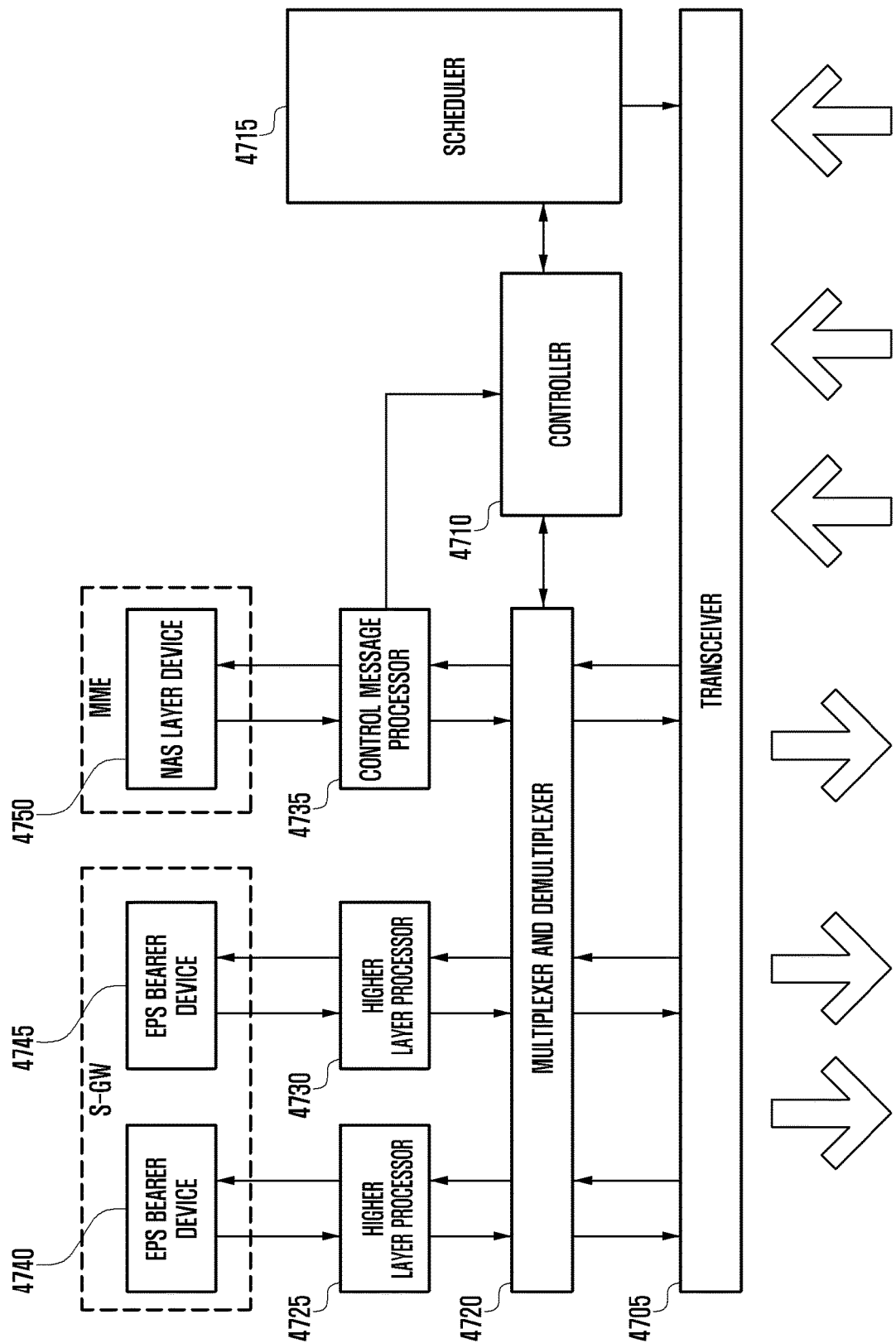
FIG. 47 illustrates a configuration of a base station, MME, and S-GW according to an embodiment.

FIG. 47 illustrates a configuration of a base station, MME, and S-GW according to an embodiment.

The base station apparatus of FIG. 47 includes a transceiver 4705, controller 4710, multiplexer and demultiplexer 4720, control message processor 4735, various higher layer processors 4725 and 4730, and scheduler 4715. The base station apparatus may further include EPS bearer devices 4740 and 4745 located in the S-GW and a NAS layer device 4750 located in the MME.

The transceiver 4705 transmits data and a predetermined control signal with a forward carrier and receives data and a predetermined control signal with a backward carrier. When a plurality of carriers are set, the transceiver 4705 performs transmission and reception of data and transmission and reception of a control signal with the plurality of carriers.

The multiplexer and demultiplexer 4720 multiplexes data generated in the higher layer processors 4725 and 4730 or the control message processor 4735 or an appropriate higher layer processor or demultiplexes data received from the transceiver 4705 to transfer the data to appropriate higher layer processors 4725 and 4730, the control message processor 4735, or the controller 4710. The control message processor 4735 processes the control message transmitted by the terminal to perform a necessary operation or generates a control message to transfer to the terminal and to a subordinate layer.

The higher layer processors 4725 and 4730 may be configured on each EPS bearer basis and may configure data transferred from the EPS bearer device 4740 and 4745 into a RLC PDU to transfer the data to the multiplexing and demultiplexer 4720 or may configure an RLC PDU transferred from the multiplexer and demultiplexer 4720 into a PDCP SDU to transfer the RLC PDU to the EPS bearer device 4740 and 4745.

The scheduler 4715 allocates a transmission resource at an appropriate time to the terminal in consideration of a buffer status and a channel state of the terminal and enables the transmitter to process a signal transmitted by the terminal or enable to transmit a signal to the terminal.

The EPS bearer device 4740 and 4745 is configured on EPS bearer basis and processes data transferred from a higher layer processor and transmits the data to a next network node.

The higher layer processor 4725 and 4730 and the EPS bearer devices 4740 and 4745 are interconnected by an S1-U bearer. The higher layer processor 4725 and 4730 corresponding to the common DRB is connected by common U S1-bearer and EPS bearer for the common DRB.

The NAS layer device 4750 processes an IP packet received in the NAS message and transfers the IP packet to the S-GW.

The controller 4710 controls a state and operation of all components constituting the eNB. Specifically, the controller 4710 allocates a CSI-RS resource for channel estimation of the terminal to the terminal and allocates a feedback resource and feedback timing to the terminal, and allocates feedback setting and feedback timing such that feedback from various terminals does not collide and receives and analyzes feedback information set at the corresponding timing. The transceiver 4705 transmits and receives data, a reference signal, and feedback information to the terminal, transmits aperiodic CSI-RS through an allocated resource under the control of the controller 4710 to the terminal, and receives feedback of channel information from the terminal.

The controller 4710 may control the transceiver 4705 to transmit setting information of at least one reference signal to the terminal or generate the at least one reference signal, to transmit feedback configuration information for generating feedback information according to the measurement result to the terminal, and to transmit at least one reference signal to the terminal and to receive feedback information transmitted from the terminal at feedback timing according to the feedback configuration information.

The controller 4710 may transmit feedback configuration information to the terminal, transmit aperiodic CSI-RS to the terminal, and receive the feedback configuration information and feedback information generated based on the CSI-RS from the terminal. In this case, the controller 4710 may transmit feedback configuration information corresponding to each antenna port of the base station and additional feedback configuration information based on a relationship between antenna port groups, may transmit beamformed CSI-RS based on feedback information to the terminal, and receive feedback information generated based on the CSI-RS from the terminal.

By performing UL signal transmission by applying subband precoding according to an embodiment of the present disclosure, a terminal can efficiently use a radio resource. When a base station and a terminal support analog, digital, or hybrid beamforming, the terminal can effectively transmit a measurement unavailable condition to the base station in such a measurement unavailable condition and thus the terminal and the base station can effectively transmit and receive channel state information. In addition, aperiodic CSI-RS transmission based on an effective multi-CSI-RS resource and thus channel state information generation and report as well as aperiodic CSI-RS transmission based on a single CSI-RS resource and thus channel state information generation and report can be supported.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method of a terminal for a communication system, the method comprising:
    receiving sounding reference signal (SRS) configuration information from a base station, the SRS configuration information configuring a plurality of semi-persistent SRS resources for semi-persistent SRS transmission;
    receiving activation information which indicates an activation of at least one semi-persistent SRS resource of the plurality of semi-persistent SRS resources, the activation information being included in a medium access control (MAC) control element;
    periodically transmitting SRSs corresponding to the at least one activated semi-persistent SRS resource based on the activation information from a first timing, the first timing being determined as a timing after a predetermined period has elapsed since the activation information was received;
    receiving deactivation information which indicates a deactivation of at least one semi-persistent SRS resource of the plurality of semi-persistent SRS resources, the deactivation information being included in a MAC control element; and
    stopping SRS transmissions corresponding to the at least one deactivated semi-persistent SRS resource based on the deactivation information from a second timing, the second timing being determined as a timing after a predetermined period has elapsed since the deactivation information was received.

2. The method of claim 1, further comprising:
    identifying uplink precoding information for transmitting data based on the SRS configuration information.

3. The method of claim 1, wherein the SRS configuration information includes information on an SRS transmission bandwidth, a number of antenna ports, information on a transmission comb, and a cyclic shift.

4. The method of claim 1, wherein the SRS configuration information includes information on a channel state information reference signal (CSI-RS) resource corresponding to each semi-persistent SRS resource.

5. A method of a base station for a communication system, the method comprising:
    transmitting sounding reference signal (SRS) configuration information to a terminal, the SRS configuration information configuring a plurality of semi-persistent SRS resources for semi-persistent SRS transmission;
    transmitting activation information which indicates an activation of at least one semi-persistent SRS resource of the plurality of semi-persistent SRS resources, the activation information being included in a medium access control (MAC) control element;

periodically receiving SRSs corresponding to the at least one activated semi-persistent SRS resource from first timing, the first time being determined as a timing after a predetermined period has elapsed since the activation information was transmitted; and transmitting deactivation information which indicates a deactivation of at least one semi-persistent SRS resource of the plurality of semi-persistent SRS resources, the deactivation information being included in a MAC control element, wherein SRS receptions corresponding to the at least one deactivated semi-persistent SRS resource is not performed from second timing, the second timing being determined as a timing after a predetermined period has elapsed since the deactivation information was transmitted.

6. The method of claim 5, wherein uplink precoding information for receiving data is identified based on the SRS configuration information.

7. The method of claim 5, wherein the SRS configuration information includes information on an SRS transmission bandwidth, a number of antenna ports, information on a transmission comb, and a cyclic shift.

8. The method of claim 5, wherein the SRS configuration information includes information on a channel state information reference signal (CSI-RS) resource corresponding to each semi-persistent SRS resource.

9. A terminal for a communication system, the terminal comprising:

a transceiver; and a processor coupled with the transceiver and configured to control to:

receive, from a base station via the transceiver, sounding reference signal (SRS) configuration information, the SRS configuration information configuring a plurality of semi-persistent SRS resources for semi-persistent transmission, receive, from the base station, activation information which indicates an activation of at least one semi-persistent SRS resource of the plurality of semi-persistent SRS resources, the activation information being included in a medium access control (MAC) control element, periodically transmit SRSs corresponding to the at least one activated semi-persistent SRS resource based on the activation information from a first timing, the first timing being determined as a timing after a predetermined period has elapsed since the activation information was received, receive, from the base station, deactivation information which indicates a deactivation of at least one semi-persistent SRS resource of the plurality of semi-persistent SRS resources, the deactivation information being included in a MAC control element, and stop SRS transmissions corresponding to the at least one deactivated semi-persistent SRS resource based on the deactivation information from a second timing, the second timing being determined as a timing after a predetermined period has elapsed since the deactivation information was received.

10. The terminal of claim 9, wherein the processor is further configured to control to identify uplink precoding information for transmitting data based on the SRS configuration information.

11. The terminal of claim 9, wherein the SRS configuration information includes information on an SRS transmission bandwidth, a number of antenna ports, information on a transmission comb, and a cyclic shift.

12. The terminal of claim 9, wherein the SRS configuration information includes information on a channel state information reference signal (CSI-RS) resource corresponding to each semi-persistent SRS resource.

13. A base station for a communication system, the base station comprising:

a transceiver; and a processor coupled with the transceiver and configured to control to:

transmit, to a terminal via the transceiver, sounding reference signal (SRS) configuration information to a terminal, the SRS configuration information configuring a plurality of semi-persistent SRS resources for semi-persistent SRS transmission, transmit, to the terminal, activation information which indicates an activation of at least one semi-persistent SRS resource of the plurality of semi-persistent SRS resources, the activation information being included in a medium access control (MAC) control element, periodically receive SRSs corresponding to the at least one activated semi-persistent SRS resource from a first timing, the first timing being determined as a timing after a predetermined period has elapsed since the activation information was transmitted, and transmit, to the terminal, deactivation information which indicates a deactivation of at least one semi-persistent SRS resource of the plurality of semi-persistent SRS resources, the deactivation information being included in a MAC control element, wherein SRS receptions corresponding to the at least one deactivated semi-persistent SRS resource is not performed from a second timing, the second timing being determined as a timing after a predetermined period has elapsed since the deactivation information was transmitted.

14. The base station of claim 13, wherein uplink precoding information for receiving data is identified based on the SRS configuration information.

15. The base station of claim 13, wherein the SRS configuration information includes information on an SRS transmission bandwidth, a number of antenna ports, information on a transmission comb, and a cyclic shift.

16. The base station of claim 13, wherein the SRS configuration information includes information on a channel state information reference signal (CSI-RS) resource corresponding to each semi-persistent SRS resource.

* * * * *